US 9,288,507 B2

(12) United States Patent
Zhang et al.

(10) Patent No.: US 9,288,507 B2
(45) Date of Patent: Mar. 15, 2016

(54) MORE ACCURATE ADVANCED RESIDUAL PREDICTION (ARP) FOR TEXTURE CODING

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/309,711

(22) Filed: Jun. 19, 2014

(65) Prior Publication Data

US 2014/0376633 A1    Dec. 25, 2014

Related U.S. Application Data

(60) Provisional application No. 61/838,208, filed on Jun. 21, 2013, provisional application No. 61/846,036, filed on Jul. 14, 2013.

(51) Int. Cl.
| | |
|---|---|
| *H04N 19/51* | (2014.01) |
| *H04N 19/583* | (2014.01) |
| *H04N 19/597* | (2014.01) |
| *H04N 19/513* | (2014.01) |
| *H04N 19/105* | (2014.01) |
| *H04N 19/176* | (2014.01) |
| *H04N 19/70* | (2014.01) |

(52) U.S. Cl.
CPC ........... *H04N 19/597* (2014.11); *H04N 19/105* (2014.11); *H04N 19/176* (2014.11); *H04N 19/513* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 9,154,786 | B2 * | 10/2015 | Kim | ................ H04N 19/00569 |
| 2009/0290643 | A1 * | 11/2009 | Yang | ................ H04N 19/00769 |
| | | | | 375/240.16 |
| 2010/0215095 | A1 * | 8/2010 | Hayase | ................ H04N 19/105 |
| | | | | 375/240.02 |
| 2013/0114699 | A1 * | 5/2013 | Kim | ................ H04N 19/00569 |
| | | | | 375/240.03 |
| 2013/0121602 | A1 * | 5/2013 | Azukizawa | ............. G06T 9/001 |
| | | | | 382/233 |

(Continued)

FOREIGN PATENT DOCUMENTS

WO    2014075615 A1    5/2014

OTHER PUBLICATIONS

Tian et al., "View Synthesis Prediction Using Skip and Merge Candidates for HEVC-based 3D Video Coding", IEEE International Symposium on Circuits and Systems (ISCAS), May 2013.*

(Continued)

*Primary Examiner* — Tracy Li
*Assistant Examiner* — Mohammad J Rahman
(74) *Attorney, Agent, or Firm* — Shumaker & Sieffert, P.A.

(57) ABSTRACT

Techniques for advanced residual prediction (ARP) for coding video data may include inter-view ARP. Inter-view ARP may include identifying a disparity motion vector (DMV) for a current video block. The DMV is used for inter-view prediction of the current video block based on an inter-view reference video block. The techniques for inter-view ARP may also include identifying temporal reference video blocks in the current and reference views based on a temporal motion vector (TMV) of the inter-view reference video block, and determining a residual predictor block based on a difference between the temporal reference video blocks.

30 Claims, 23 Drawing Sheets

(56) References Cited

U.S. PATENT DOCUMENTS

| | | | | |
|---|---|---|---|---|
| 2013/0271567 | A1* | 10/2013 | Lee | H04N 13/0048 348/43 |
| 2013/0287093 | A1* | 10/2013 | Hannuksela | H04N 19/00769 375/240.02 |
| 2013/0322540 | A1* | 12/2013 | Yamori | H04N 19/597 375/240.16 |
| 2014/0092208 | A1* | 4/2014 | Zou | H04N 19/597 348/43 |
| 2014/0098883 | A1* | 4/2014 | Hannuksela | H04N 19/597 375/240.16 |
| 2014/0205015 | A1* | 7/2014 | Rusert | H04N 19/00769 375/240.16 |
| 2014/0301463 | A1* | 10/2014 | Rusanovskyy | H04N 19/52 375/240.14 |
| 2014/0314147 | A1* | 10/2014 | Rusanovskyy | H04N 19/597 375/240.12 |
| 2014/0341291 | A1* | 11/2014 | Schwarz | H04N 19/597 375/240.16 |
| 2014/0348242 | A1* | 11/2014 | Ohtsu | H04N 13/0048 375/240.16 |
| 2015/0098509 | A1* | 4/2015 | Sung | H04N 19/597 375/240.16 |
| 2015/0146103 | A1* | 5/2015 | Koo | H04N 19/597 348/607 |
| 2015/0181230 | A1* | 6/2015 | Son | H04N 19/597 375/240.15 |
| 2015/0208083 | A1* | 7/2015 | Koo | H04N 19/52 375/240.16 |
| 2015/0245049 | A1* | 8/2015 | Lee | H04N 19/52 375/240.16 |
| 2015/0245065 | A1* | 8/2015 | Lee | H04N 19/597 375/240.16 |
| 2015/0296222 | A1* | 10/2015 | Llin | H04N 19/597 375/240.16 |

OTHER PUBLICATIONS

Park et al., "Selective Inter-layer Residual Prediction for SVC-based Video Streaming", IEEE Transactions on Consumer Electronics, vol. 55, No. 1, Feb. 2009.*

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.261 (Mar. 1993), "Video CODEC for Audiovisual Services at p × 64 kbit/s", Line Transmission of Non-telephone Signals, Nr:H. 261, Mar. 1993, 28 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pp.

ITU-T H.263, "Video Coding for Low Bit Rate Communication", Series H: Audiovisual and Multimedia Systems, Infrastructure of audiovisual services—Coding of moving video, Jan. 2005, 226 pp.

An, et al., "3D-CE3.h related: Advanced temporal residual prediction," MediaTek Inc., Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013, JCT3V-E0185, 3 pp.

"Test Model under Consideration for HEVC based 3D video coding", 99. MPEG Meeting; San Jose, CA; (Motion Picture Expert Group or ISO/IEC JTC1/SC29/WG11), No. N12559, Feb. 11, 2012, XP030019033, 45 pp.

Chen, et al., "SHVC Draft Text 1", Joint Collaborative Team on Video Coding (JCT-VC) of ITU-T SG16 WP3 and ISO/IEC JTC1/SC29/WG11, 12th Meeting: Geneva, CH, JCTVC-L1008, Jan. 14-23, 2013; 34 pp.

Internationa Search Report and Written Opinion from International Application No. PCT/US2014/043403, dated Sep. 23, 2014, 14 pp.

Kang, et al., "3D-CE5.h related: Improvements for disparity vector derivation", JCT-3V Meeting; MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/, No. JCT3V-B0047, 4 pp.

Kang, et al., "CE2.h related: CU-based Disparity Vector Derivation in 3D-HEVC," Qualcomm Incorporated, JCT3V-D0181, Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, 4 pp.

Liu, et al., "Restricted Inter-View Residual Prediction", 100. MPEG Meeting; Apr. 30, 2012-May 4, 2012; Geneva; (Motion Picture Expert Group or ISO/IEC JTC1/SC29/WG11), No. m24766, XP030053109, 5 pp.

Sung, et al., "3D-CE5.h: Simplification of disparity vector derivation for HEVC-based 3D video coding", JCT-3V Meeting; MPEG Meeting; Jul. 16, 2012-Jul. 20, 2012; Stockholm; (The Joint Collaborative Team on 3D Video Coding Extension Development of ISO/IECJTC1/SC29/WG11 and ITU-T SG.16); URL: http://phenix.int-evry.fr/jct2/, No. JCT3V-A0126, 4 pp.

Tech, et al., "3D-HEVC Test Model 4", JCT/3V Meeting; Incheon; (The Joint Collaborative Team on 3D Video Coding Extension Development of ISO/IEC JTC1/SC29/WG11 and ITU-T SG.16), No. JCT3V-D1005, Jun. 17, 2013, 88 pp.

Tech, et al., "MV-HEVC Draft Text 3 (ISO/IEC 23008-2:201x/PDAM2)", Joint Collaborative Team on 3D Video Coding Extension Development of ITU-T SG 16 WP 3 and ISO/IEC JTC 1/SC 29/WG 11, 3rd Meeting: Geneva, CH, JCT3V-C1004_d3, Jan. 17-23, 2013; 34 pp.

Tian, et al., "CE1.h: Backward View Synthesis Prediction using Neighbouring Blocks", JCT-3V Meeting; MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C0152, XP0301130568, 5 pp.

Zhang, et al., "3D-CE4: Advanced residual prediction for multiview coding," Joint Collaborative Team on 3D Video Coding Extension Development of ITU-T-SG 16 WP 3 and ISO/IEC JTC 1/SC 29/WG 11, JCT3V-C0049, 3rd Meeting: Geneva, CH, Jan. 17-23, 2013, 5 pp.

Zhang, et al., "CE4: Advanced residual prediction for multiview coding", JCT-3V Meeting; Apr. 20, 2013-Apr. 26, 2013; Incheon; (The Joint Collaborative Team on 3D Video Coding Extension Devel-

(56) References Cited

OTHER PUBLICATIONS opment of ISO/IEC JTC1/SC29/WG11 and ITU-T SG.16 ); URL: http://phenix.int-evry.fr/jct2/, No. JCT3V-D0177, XP030130841, 10 pp.

Zhang, et al., "CE5.h: Disparity vector generation results", JCT2-A0097, JCT-3V Meeting; MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, XP030130096, 5 pp.

Zhang, et al., "Further improvements on advanced residual prediction", JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0124, XP030131138, 6 pp.

Schwarz, et al. Description of 3D Video Technology Proposal by Fraunhofer HHI (HEVC compatible; configuration A), Nov. 2011, ISO/IEC JTC1/SC29/WG11 MPEG2011/M22570, 46 pp.

Schwarz, et al. Description of 3D Video Technology Proposal by Fraunhofer HHI (HEVC compatible; configuration B), Nov. 2011, ISO/IEC JTC1/SC29/WG11 MPEG2011/M22571, 46 pp.

International Preliminary Report on Patentability from corresponding PCT Application Serial No. PCT/US2014/043403 dated Dec. 30, 2015 (10 pages).

\* cited by examiner

MORE ACCURATE ADVANCED RESIDUAL PREDICTION (ARP) FOR TEXTURE CODING

This application claims the benefit of U.S. Provisional Application No. 61/838,208, filed Jun. 21, 2013, and U.S. Provisional Application No. 61/846,036, filed Jul. 14, 2013, the entire contents of each of which is hereby incorporated by reference in their entirety.

TECHNICAL FIELD

This disclosure is related to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes accurate advanced residual prediction (ARP) techniques for texture coding, which may provide improved accuracy relative to other ARP techniques. More particularly, this disclosure describes ARP techniques that include identifying a DMV from the current view to a reference view, and determining a residual predictor block for ARP of the current video block based on the identification of the DMV.

In some examples, the DMV is a DMV of the current video block, and the techniques include determining an inter-view residual predictor block for inter-view ARP of the current video block. The DMV is used for inter-view prediction of the current video block based on an inter-view reference video block. The techniques for inter-view ARP may also include identifying temporal reference video blocks in the current and reference views based on a temporal motion vector (TMV) of the inter-view reference video block, and determining a residual predictor block based on a difference between the temporal reference video blocks. In such examples, ARP is not limited to temporal ARP for coding temporally-predicted video blocks, and instead may include inter-view ARP for coding inter-view predicted video blocks.

In some examples, the current video block is temporally-predicted, and a DMV of the reference video block for the current video block replaces a disparity vector derived for the current video block, e.g., according to Neighboring Block Based Disparity Vector Derivation (NBDV), for temporal ARP of the current video block. In such examples, the DMV, which is typically chosen by rate distortion optimization, may be more accurate than the derived disparity vector, which may lead to more accurate temporal ARP of the current video block. In some examples, the current video block is temporally-predicted, and a disparity vector derived through a co-located depth block of the temporal reference video block for the current video block replaces a disparity vector derived for the current video block, e.g., according to Neighboring Block Based Disparity Vector Derivation (NBDV), for temporal ARP of the current video block. Such examples may provide more accurate temporal ARP when the co-located depth block is available during texture coding.

In one example, a method of inter-view advanced residual prediction for decoding video data comprises decoding an encoded video bitstream that encodes the video data to identify a disparity motion vector (DMV) and a residual block for a current video block. The current video block is in a current view, and the DMV is used for inter-view prediction of the current video block based on an inter-view reference video block in a reference view and in the same access unit as the current video block. The method further comprises identifying a temporal motion vector (TMV) and associated reference picture of the inter-view reference video block, identifying a temporal reference video block in the associated reference picture in the reference view based on the TMV of the inter-view reference video block, and identifying a temporal reference video block in the current view based on the TMV of the interview reference video block in the reference view. The temporal reference video block in the current view and the temporal reference video block in the reference view are located in the same access unit. The method further comprises determining a residual predictor block for the current video block based on a difference between the temporal reference video block in the current view and the temporal reference video block in the reference view. The method further comprises applying the residual predictor block and the residual block identified from the encoded video bitstream to the inter-view reference video block to reconstruct the current video block.

In another example, a method of inter-view advanced residual prediction for encoding video data comprises identifying a disparity motion vector (DMV) for a current video block, wherein the current video block is in a current view, and wherein the DMV is used for inter-view prediction of the current video block based on an inter-view reference video block in a reference view and the same access unit as the current video block. The method further comprises identifying a temporal motion vector (TMV) and associated reference picture of the inter-view reference video block, identifying a temporal reference video block in the associated reference picture in the reference view based on the TMV of the inter-view reference video block, and identifying a temporal reference video block in the current view based on the TMV of the interview reference video block in the reference view. The temporal reference video block in the current view and the temporal reference video block in the reference view are located in the same access unit. The method further comprises determining a residual predictor block for the current video block based on a difference between the temporal reference video block in the current view and the temporal reference video block in the reference view. The method further comprises encoding an encoded video bitstream that encodes the video data to identify the DMV and a residual block for the current video block. The residual block identified by the encoded video bitstream comprises a difference between the inter-view reference video block and the residual predictor block for the current video block.

In another example, an apparatus comprises a video coder configured to perform inter-view advanced residual prediction for coding video data. The video coder comprises a memory configured to store an encoded video bitstream that encodes the video data, and one or more processors. The one or more processors are configured to identify a disparity motion vector (DMV) for a current video block, wherein the current video block is in a current view, and wherein the DMV is used for inter-view prediction of the current video block based on an inter-view reference video block in a reference view and in the same access unit as the current video block. The one or more processors are further configured to identify a temporal motion vector (TMV) and associated reference picture of the inter-view reference video block, identify a temporal reference video block in the associated reference picture in the reference view based on the TMV of the inter-view reference video block, and identify a temporal reference video block in the current view based on the TMV of the interview reference video block in the reference view. The temporal reference video block in the current view and the temporal reference video block in the reference view are located in the same access unit. The one or more processors are further configured to determine a residual predictor block for the current video block based on a difference between the temporal reference video block in the current view and the temporal reference video block in the reference view. The one or more processors are further configured to code the encoded video bitstream to identify the DMV and a residual block for the current video block. The residual block identified by coding the encoded video bitstream comprises a difference between the inter-view reference video block and the residual predictor block for the current video block.

In another example, a computer-readable storage medium has instructions stored thereon that when executed cause one or more processors of a video coder to identify a disparity motion vector (DMV) for a current video block, wherein the current video block is in a current view, and wherein the DMV is used for inter-view prediction of the current video block based on an inter-view reference video block in a reference view and in the same access unit as the current video block. The instructions further cause the one or more processors to identify a temporal motion vector (TMV) and associated reference picture of the inter-view reference video block, identify a temporal reference video block in the associated reference picture in the reference view based on the TMV of the interview reference video block, and identify a temporal reference video block in the current view based on the TMV of the interview reference video block in the reference view. The temporal reference video block in the current view and the temporal reference video block in the reference view are located in the same access unit. The instructions further cause the one or more processors to determine a residual predictor block for the current video block based on a difference between the temporal reference video block in the current view and the temporal reference video block in the reference view. The instructions further cause the one or more processors to code the encoded video bitstream to identify the DMV and a residual block for the current video block. The residual block identified by coding the encoded video bitstream comprises a difference between the inter-view reference video block and the residual predictor block for the current video block.

In other examples, methods of inter-view advanced residual prediction for encoding video data comprise identifying a disparity motion vector (DMV) for a current video block, wherein the current video block is in a current view, and wherein the DMV is used for inter-view prediction of the current video block based on an inter-view reference video block in a reference view and the same access unit as the current video block. The methods further comprise identifying a temporal motion vector (TMV) and an associated reference picture. In some examples, the DMV may be from a first reference picture list of the current video block, and the TMV and associated reference picture may be from a second reference picture list of the current video block. In other examples, the TMV and associated reference picture are derived from spatial or temporal neighboring blocks of the current video block. In either case, the methods may further comprise identifying a temporal reference video block in the reference view based on the TMV, and identifying a temporal reference video block in the current view based on the TMV. The methods further comprise determining a residual predictor block for the current video block based on a difference between the temporal reference video block in the current view and the temporal reference video block in the reference view. The methods further comprise encoding an encoded video bitstream that encodes the video data to identify the DMV and a residual block for the current video block. The residual block identified by the encoded video bitstream comprises a difference between the inter-view reference video block and the residual predictor block for the current video block.

In another example, a method of temporal advanced residual prediction for coding video data comprises identifying a temporal motion vector (TMV) for a current video block, wherein the current video block is in a current view, and wherein the TMV is used for prediction of the current video block based on an temporal reference video block in the current view and in a different access unit than the current video block. The method further comprises identifying a disparity motion vector (DMV) of the temporal reference video block used for inter-view prediction of the temporal reference video block. The method further comprises determining, based on the DMV, at least one of an inter-view reference video block in the reference view and in the same access unit as the current video block, or a temporal reference video block in the reference view and the in the different access unit. The method further comprises determining a residual predictor block for the current video block based on a difference between the inter-view reference video block in the reference view and in the same access unit as the current video block and the temporal reference video block in the reference view and the in the different access unit. The method further comprises coding an encoded video bitstream that encodes the video data to identify the TMV and a residual block for the current video block. The residual block identified by the encoded video bitstream comprises a difference between the temporal reference video block and the residual predictor block for the current video block. Some examples of this method further comprise scaling the TMV of the current video block to a target reference picture in a target access unit for advanced residual prediction of the current video block, wherein the scaled TMV identifies the temporal reference video block in the current view. In some examples of this method the temporal reference video block in the current view identified by the scaled TMV comprises a first temporal reference video block, and the method further comprises determining that the first temporal reference video block in the current view identified by the scaled TMV is not associated with a DMV, and identifying a second temporal reference video block in the current view based on the TMV absent scaling. In such examples, identifying the DMV comprises identifying a DMV of the second temporal reference video block in the current view identified by the TMV absent scaling. In some examples of this method the temporal reference video block in the current view and in a different access unit than the current video block comprises a plurality of prediction units, and identifying the DMV of the temporal reference video block comprises identifying a DMV associated with one of the plurality of PUs that contains a center position of the temporal reference video block. In some examples of this method, identifying the DMV comprises identifying a DMV from a prediction mode other than Backward Video Synthesis Prediction (BVSP). In some examples of this method, the inter-view reference video block contains a first set of motion information corresponding to a first reference picture list and a second set of motion information corresponding to a second reference picture list, and identifying the TMV of the inter-view reference video block comprises selecting the TMV from the first set of motion information if the first set of motion information includes a TMV, and selecting the TMV from the second set of motion information if the first set of motion information does not include a TMV. In some examples of this method, the first reference picture list comprises RefPicList0. In some examples of this method, an order for considering the first and second sets of motion information is independent of which of the first and second sets of motion information includes the TMV. In some examples of this method, coding the encoded video bitstream comprises decoding the encoded video bitstream with a video decoder to identify the TMV and the residual block for the current video block, and applying the residual predictor block and the residual block identified from the encoded video bitstream to the temporal reference video block to reconstruct the current video block. In some examples of this method, coding the encoded video bitstream comprises encoding the encoded video bitstream with a video encoder to indicate the TMV and the residual block for the current video block to a video decoder.

In another example, a method of temporal advanced residual prediction for coding video data comprises identifying a temporal motion vector (TMV) for a current video block, wherein the current video block is in a current view, and wherein the TMV is used for prediction of the current video block based on an temporal reference video block in the current view and in a different access unit than the current video block. The method further comprises deriving a disparity vector (DV) through a co-located depth block of the temporal reference video block. The method further comprises determining, based on the DV, at least one of an inter-view reference video block in the reference view and in the same access unit as the current video block, or a temporal reference video block in the reference view and the in the different access unit. The method further comprises determining a residual predictor block for the current video block based on a difference between the inter-view reference video block in the reference view and in the same access unit as the current video block and the temporal reference video block in the reference view and the in the different access unit. The method further comprises coding an encoded video bitstream that encodes the video data to identify the TMV and a residual block for the current video block. The residual block identified by the encoded video bitstream comprises a difference between the temporal reference video block and the residual predictor block for the current video block. Some examples of this method further comprise scaling the TMV of the current video block to a target reference picture in a target access unit for advanced residual prediction of the current video block, wherein the scaled TMV identifies the temporal reference video block in the current view. In some examples of this method the temporal reference video block in the current view identified by the scaled TMV comprises a first temporal reference video block, and the method further comprises determining that the first temporal reference video block in the current view identified by the scaled TMV is not associated with a DMV, and identifying a second temporal reference video block in the current view based on the TMV absent scaling. In such examples, identifying the DMV comprises identifying a DMV of the second temporal reference video block in the current view identified by the TMV absent scaling. In some examples of this method, deriving the DV comprises converting a depth value of one sample within the co-located depth block to the DV. In some examples, the one sample is located at (W/2, H/2) relative to the top-left sample of the co-located depth block, wherein a size of the co-located depth block is W×H. In some examples of this method, deriving the DV comprises determining a representative depth value based on depth values of a plurality of samples within the co-located depth block, and converting the representative depth value to the DV. In some examples, the plurality of samples are four corner samples. In some examples, the plurality of samples are selected based on neighboring samples of the depth block. In some examples, determining the representative depth value based on depth values of a plurality of samples within the co-located depth block comprises determining the representative depth value based on all depth values of a plurality of samples within the co-located depth block. In some examples of this method, coding the encoded video bitstream comprises decoding the encoded video bitstream with a video decoder to identify the TMV and the residual block for the current video block, and applying the residual predictor block and the residual block identified from the encoded video bitstream to the temporal reference video block to reconstruct the current video block. In some examples of this method, coding the encoded video bitstream comprises encoding the encoded video bitstream with a video encoder to indicate the TMV and the residual block for the current video block to a video decoder.

The details of one or more examples of the disclosure are set forth in the accompanying drawings and the description below. Other features, objects, and advantages will be apparent from the description, drawings, and claims.

DETAILED DESCRIPTION

Figure 1:
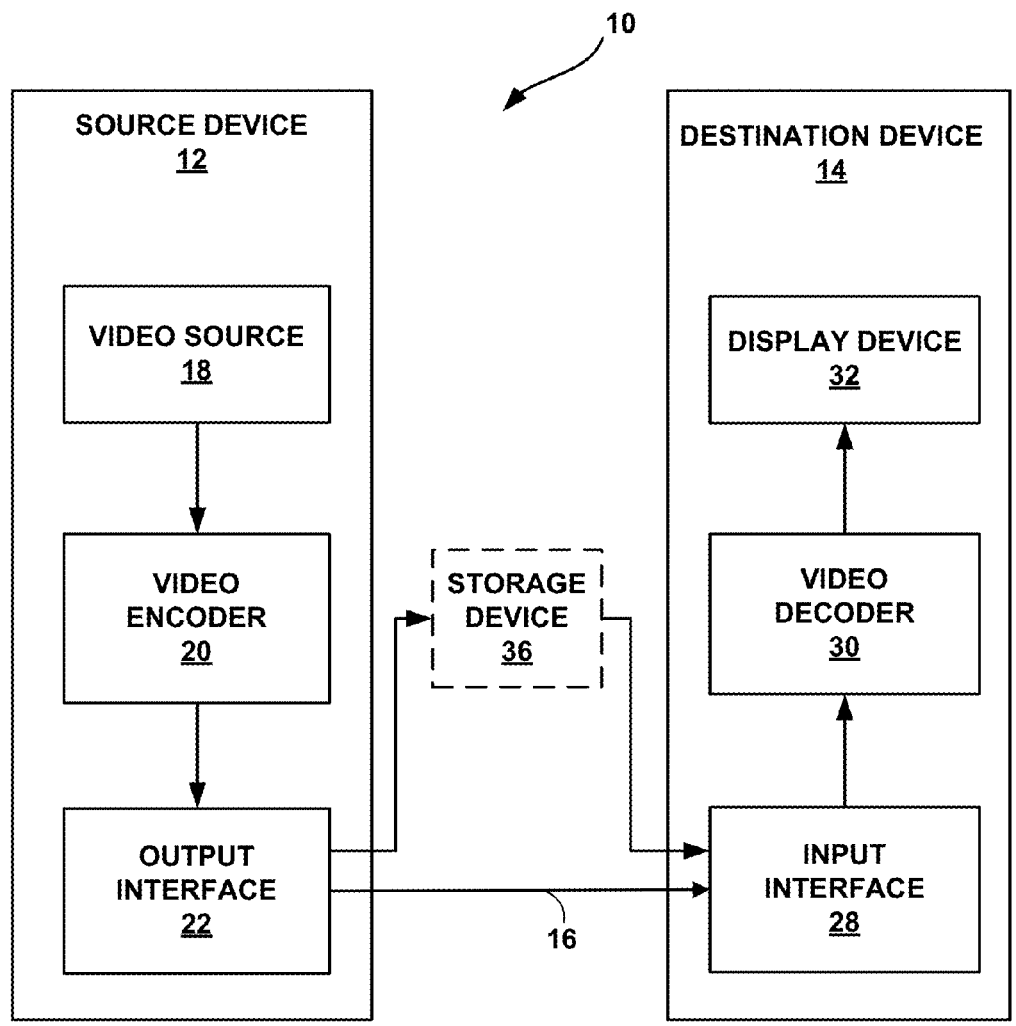
FIG. 1 is a block diagram illustrating an example video encoding and decoding system that may utilize the techniques described in this disclosure.

In general, this disclosure is related to multiview video coding, in which the coded video data includes two or more views. In some examples, the multiview video coding includes a multiview-plus-depth video coding process. In some examples, the multiview coding may include coding of three-dimensional, or 3D, video, and may be referred to as 3D video coding. Some disclosed techniques may also be applied to video coding other than multiview or 3D video coding, e.g., scalable video coding, or video coding according to a base specification of a video coding standard, e.g., in which the video data does not include multiple views or layers.

This disclosure also relates to prediction of the residual signal of a video block, e.g., Advanced Residual Prediction (ARP). More particularly, this disclosure describes techniques for more accurate ARP of the texture components of multiview video data in a non-base view. The techniques for more accurate ARP may include identifying a disparity motion vector (DMV) from the current view of a current video block to a reference view. The DMV is a motion vector used for inter-view prediction of video data in the current view, e.g., of the current video block or a reference video block, based video data in the reference view. The techniques may further include using the identified DMV to identify reference video blocks for ARP, and determining a residual predictor block for the current video block based on the identified reference video blocks. A coded residual block for the current block identified in an encoded video bitstream may be a difference between a normal residual block, which is the difference between the current block and a reference video block for the current video block, and the residual predictor block after potential scaling based on the coded weighting factor index. In this disclosure, the term "current" is generally used to identify a view, picture, or block currently being coded. Thus, a current block generally represents a block of video data being coded, as opposed to an already coded video block or as opposed to a yet to be coded video block.

In some examples, the DMV may be a DMV of the current video block, in which case the video coder may use the DMV to identify a reference block in the reference view. In such examples, the techniques may include determining an inter-view residual predictor block for inter-view ARP of the current video block based on the identified DMV. In such examples. ARP is not limited to temporal ARP for coding temporally-predicted video blocks, and instead may include inter-view ARP for coding inter-view predicted video blocks. Inter-view ARP may allow the video coder to more accurately calculate an inter-view residual predictor in a different access unit to predict the residual of the current video block.

In some examples, the current video block is temporally-predicted, and the DMV may be a DMV of a temporal reference block in the same view as the current video block. In such examples, the video coder may use the DMV instead of a disparity vector (DV) derived for the current video block to identify one or both of an inter-view reference block of the current video block in the reference view, or a temporal reference block in the reference view for temporal ARP of the current video block. The video coder may use the block(s) identified based on the DMV to more accurately calculate a temporal residual predictor (calculated in a reference view) to predict the residual of the current video block. In such examples, the DMV, which is typically chosen by rate distortion optimization, may be more accurate than the derived disparity vector, which may lead to more accurate temporal ARP of the current video block.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, referred to as HEVC WD10 hereinafter, is available from: http://phenix.int-evry.fr/jet/doc_end_user/documents/12_Genevaiwg 1/JCTVC-L1003-v34.zip. The full citation of HEVC WD10 is Bross et al., "High Efficiency Video Coding (HEVC) text specification draft 10 (for FDIS & Last Call)." JCTVC-L1003_v34, Joint Collaborative Team on Video Coding (JCT-VC) of ITU-T SG 16 WP 3 and ISO/IEC JTC 1/SC 29/WG 11, 12$^{th}$ Meeting: Geneva, CH, 14-23 Jan. 2013. HEVC WD 10 is incorporated herein by reference in its entirety.

The multiview extension to HEVC, namely MV-HEVC, is also being developed by the JCT-3V. A recent Working Draft (WD) of MV-HEVC, referred to as MV-HEVC WD3 hereinafter, is available from: http://phenix.it-sudparis.eu/jct2/doc_end_user/documents/3_Geneva/wg11/JCT3V-C1004-v4.zip. The full citation of MV-HEVC WD3 is: Tech et al., "MV-HEVC Draft Text 3 (ISO/IEC 23008-2:201x/PDAM2)," JCT3V-C1004_d3, Joint Collaborative Team on 3D Video Coding Extension Development of ITU-T SG 16 WP 3 and ISO/IEC JTC 1/SC 29/WG 11, 3$^{rd}$ Meeting: Geneva. CH, 17-23 Jan. 2013. MV-HEVC WD3 is incorporated herein by reference in its entirety.

The scalable extension to HEVC, named SHVC, is also being developed by the JCT-VC. A recent Working Draft (WD) of SHVC, referred to as SHVC WD1 hereinafter, is available from: http://phenix.int-evry.fr/jct/doc_end_user/documents/12_Geneva/wg11/JCTVC-L1008-v1.zip. The full citation of SHVC WD1 is: Chen et al., "SHVC Draft Text 1," JCTVC-L1008, Joint Collaborative Team on Video Coding (JCT-VC) of ITU-T SG 16 WP 3 and ISO/IEC JTC 1/SC 29/WG 11, 12$^{th}$ Meeting: Geneva, CH, 14-23 Jan. 2013. SHVC WD1 is incorporated herein by reference in its entirety.

Currently, a Joint Collaboration Team on 3D Video Coding (JCT-3C) of VCEG and MPEG is developing a 3DV standard based on HEVC, for which part of the standardization efforts includes the standardization of MV-HEVC, and another part of the standardization efforts includes the standardization of 3D Video coding (3DV) based on HEVC (3D-HEVC). For 3D-HEVC, new coding tools, including those in coding unit/prediction unit level, for both texture and depth views may be included and supported. A recent reference software test model for 3D-HEVC (3D-HTM-7.0) can be downloaded from the following link: https://hevc.hhi.fraunhofer.de/svn/svn_3DVCSoftware/tags/HTM-7.0/.

A full citation for a recent reference software description as well as the working draft of 3D-HEVC is as follows: Tech et al., "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4th Meeting: Incheon, KR, 20-26 Apr. 2013. This reference software description and working draft of 3D-HEVC may be downloaded from the following link: http://phenix.it-sudparis.eu/jet2/doc_end_user/documents/4_Incheon/wg11/JCT3V-D1005-v1.zip. 3D-HTM-7.0 and 3D-HEVC Test Model 4 are incorporated herein by reference in their respective entireties.

Each of the preceding references is incorporated herein by reference in their respective entireties. The techniques described in this disclosure may be implemented by a video coder operating according to, for example, the MV-HEVC or 3D-HEVC extensions of HEVC, or the MVC extension of H.264. However, the techniques described in this disclosure are not limited to those standards, and may be extended to other video coding standards described herein, or other video coding standards not mentioned herein, including standards that provide for residual prediction in video coding.

FIG. 1 is a block diagram illustrating an example video encoding and decoding system in accordance with one or more examples described in this disclosure. For example, system 10 includes source device 12 and destination device 14. Source device 12 and destination device 14 are configured to implement the techniques described in this disclosure. In some examples, system 10 may be configured to support encoding, transmission, storage, decoding, and/or presentation of encoded video data, such as video data encoded according to the HEVC standard, e.g., as described in WD10, and its extensions, such as, for example, the extensions described in MV-HEVC WD3, SHVC WD1, 3D-HEVC Test Model 4, or the like. However, the techniques described in this disclosure may be applicable to other video coding standards or other extensions.

As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device 36. Similarly, encoded data may be accessed from storage device 34 by input interface 28. Storage device 36 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 36 may correspond to a file server or another intermediate storage device that may hold the encoded video generated by source device 12. Destination device 14 may access stored video data from storage device 36 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not limited, of course, to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 12. The encoded video data may also (or alternatively) be stored onto storage device 36 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 36, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the HEVC standard presently under development, as well as extensions of the HEVC standard, e.g., MV-HEVC, SHVC and 3D-HEVC. The techniques of this disclosure, however, are not limited to any particular coding standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 each may operate, in general, in conformance with HEVC WD10, MV-HEVC WD3, SHVC WD1, and/or 3D-HEVC Test Model 4, as described above, or with other similar standards or extensions in which the techniques described in this disclosure may be useful. The HEVC standard specifies several additional capabilities of video coding devices relative to existing devices according to, e.g., ITU-T H.264/AVC. For example, whereas H.264 provides nine intra-prediction encoding modes, the HEVC standard may provide as many as thirty-three intra-prediction encoding modes.

In general, a video frame or picture may be divided into a sequence of treeblocks or largest coding units (LCU) that include both luma and chroma samples. A treeblock in the HEVC coding process has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList0 (L0) or RefPicList 1 (L1)) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

For example, for video coding according to the HEVC standard, a video frame may be partitioned into coding units (CUs), prediction units (PUs), and transform units (TUs). A CU generally refers to an image region that serves as a basic unit to which various coding tools are applied for video compression. A CU typically has a square geometry, and may be considered to be similar to a so-called "macroblock" under other video coding standards, such as, for example, ITU-T H.264.

To achieve better coding efficiency, a CU may have a variable size depending on the video data it contains. That is, a CU may be partitioned, or "split" into smaller blocks, or sub-CUs, each of which may also be referred to as a CU. In addition, each CU that is not split into sub-CUs may be further partitioned into one or more PUs and TUs for purposes of prediction and transform of the CU, respectively.

PUs may be considered to be similar to so-called partitions of a block under other video coding standards, such as H.264. PUs are the basis on which prediction for the block is performed to produce "residual" coefficients. Residual coefficients of a CU represent a difference between video data of the CU and predicted data for the CU determined using one or more PUs of the CU. Specifically, the one or more PUs specify how the CU is partitioned for the purpose of prediction, and which prediction mode is used to predict the video data contained within each partition of the CU.

One or more TUs of a CU specify partitions of a block of residual coefficients of the CU on the basis of which a transform is applied to the block to produce a block of residual transform coefficients for the CU. The one or more TUs may also be associated with the type of transform that is applied. The transform converts the residual coefficients from a pixel, or spatial domain to a transform domain, such as a frequency domain. In addition, the one or more TUs may specify parameters on the basis of which quantization is applied to the resulting block of residual transform coefficients to produce a block of quantized residual transform coefficients. The residual transform coefficients may be quantized to possibly reduce the amount of data used to represent the coefficients.

A CU generally includes one luminance component, denoted as Y, and two chrominance components, denoted as U and V. In other words, a given CU that is not further split into sub-CUs may include Y, U, and V components, each of which may be further partitioned into one or more PUs and TUs for purposes of prediction and transform of the CU, as previously described. For example, depending on the video sampling format, the size of the U and V components, in terms of a number of samples, may be the same as or different than the size of the Y component. As such, the techniques described above with reference to prediction, transform, and quantization may be performed for each of the Y, U, and V components of a given CU.

To encode a CU, one or more predictors for the CU are first derived based on one or more PUs of the CU. A predictor is a reference block that contains predicted data for the CU, and is derived on the basis of a corresponding PU for the CU, as previously described. For example, the PU indicates a partition of the CU for which predicted data is to be determined, and a prediction mode used to determine the predicted data. The predictor can be derived either through intra- (I) prediction (i.e., spatial prediction) or inter- (P or B) prediction (i.e., temporal prediction) modes. Hence, some CUs may be intra-coded (I) using spatial prediction with respect to neighboring reference blocks, or CUs, in the same frame, while other CUs may be inter-coded (P or B) with respect to reference blocks, or CUs, in other frames.

Upon identification of the one or more predictors based on the one or more PUs of the CU, a difference between the original video data of the CU corresponding to the one or more PUs and the predicted data for the CU contained in the one or more predictors is calculated. This difference, also referred to as a prediction residual, comprises residual coefficients, and refers to pixel differences between portions of the CU specified by the one or more PUs and the one or more predictors, as previously described. The residual coefficients are generally arranged in a two-dimensional (2-D) array that corresponds to the one or more PUs o the CU.

To achieve further compression, the prediction residual is generally transformed, e.g., using a discrete cosine transform (DCT), integer transform, Karhunen-Loeve (K-L) transform, or another transform. The transform converts the prediction residual, i.e., the residual coefficients, in the spatial domain to residual transform coefficients in the transform domain, e.g., a frequency domain, as also previously described. The transform coefficients are also generally arranged in a 2-D array that corresponds to the one or more TUs of the CU. For further compression, the residual transform coefficients may be quantized to possibly reduce the amount of data used to represent the coefficients, as also previously described.

To achieve still further compression, an entropy coder subsequently encodes the resulting residual transform coefficients, using Context Adaptive Binary Arithmetic Coding (CABAC), Context Adaptive Variable Length Coding (CAVLC), Probability Interval Partitioning Entropy Coding (PIPE), or another entropy coding methodology. Entropy coding may achieve this further compression by reducing or removing statistical redundancy inherent in the video data of the CU, represented by the coefficients, relative to other CUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N. HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left." or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In addition, video encoder 20 may decode or reconstruct encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded or reconstructed pictures for use in inter-picture prediction.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference blocks (intra-prediction) or reference blocks from another picture (inter-prediction) to produce the video block for eventual display. Video decoder 30 may be configured, instructed controlled or directed to perform the inverse of the various processes performed by video encoder 20 based on the syntax elements provided by video encoder 20 with the encoded video data in the bitstream received by video decoder 30. As used herein, the term "video coder" may refer to either a video encoder, such as video encoder 20, or a video decoder, such as video decoder 30. Furthermore, the terms "video coding" or "coding" may refer to either or both of encoding, e.g., by a video encoder, or decoding, e.g., by a video decoder.

In some examples, video encoder 20 and video decoder 30 (FIG. 1) may employ techniques for multiview video coding, e.g., coding of video data including two or more views. In such examples, video encoder 20 may encode a bitstream that includes encoded video data for two or more views, and video decoder 30 may decode the encoded video data to provide the two or more views. e.g. to display device 32. In some examples, video decoder 30 may provide the multiple views of video data to enable display device 32 to display 3D video. In some examples, video encoder 20 and video decoder 30 may conform to a 3D-HEVC extension of the HEVC standard, e.g., in which multiview coding or multiview plus depth coding processes are used. Multiview or 3D video coding may involve coding of two or more texture views and/or views including texture and depth components. In some examples, the video data encoded by video encoder 20 and decoded by video decoder 30 includes two or more pictures at any given time instance, i.e., within an "access unit," or data from which two or more pictures at any given time instance can be derived.

In some examples, a device, e.g., video source 18, may generate the two or more pictures by, for example, using two or more spatially offset cameras, or other video capture devices, to capture a common scene. Two pictures of the same scene captured simultaneously, or nearly simultaneously, from slightly different horizontal positions can be used to produce a three-dimensional effect. In some examples, video source 18 (or another component of source device 12) may use depth information or disparity information to generate a second (or other additional) picture of a second (or other additional) view at a given time instance from a first picture of a first view at the given time instance. In this case, a view within an access unit may include a texture component corresponding to a first view and a depth component that can be used, with the texture component, to generate a second view. The depth or disparity information may be determined by a video capture device capturing the first view, e.g., based camera parameters or other information known regarding the configuration of the video capture device and the capturing of the video data for the first view. The depth or disparity information may additionally or alternatively be calculated, e.g., by video source 18 or another component of source device 12, from camera parameters and/or video data in the first view.

To present 3D video, display device 32 may simultaneously, or nearly simultaneously, display two pictures associated with different views of a common scene, which were captured simultaneously or nearly simultaneously. In some examples, a user of destination device 14 may wear active glasses to rapidly and alternatively shutter left and right lenses, and display device 32 may rapidly switch between a left view and a right view in synchronization with the active glasses. In other examples, display device 32 may display the two views simultaneously, and the user may wear passive glasses, e.g., with polarized lenses, which filter the views to cause the proper views to pass through to the user's eyes. In other examples, display device 32 may comprise an autostereoscopic display, which does not require glasses for the user to perceive the 3D effect.

Multiview video coding refers to the manner in which a plurality of views are coded. In the case of 3D video coding, the plurality of views may, for example, correspond to a left-eye view and a right-eye view. Each view of the plurality of views includes a plurality of pictures. The viewer's perception of a 3D scene is due to the horizontal disparity between objects in the pictures of the different views.

A disparity vector (DV) for a current block of a current picture is a vector that points to a corresponding block in a corresponding picture that is in a different view than the current picture. Thus, using a DV, a video coder can locate, in a corresponding picture, the block of that corresponds to a current block of a current picture. In this case, the corresponding picture is a picture that is of the same temporal instance as the current picture but is in a different view. The corresponding block in the corresponding picture and the current block in the current picture may include similar video content; however, there is at least a horizontal disparity between the location of the current block in the current picture and the location of the corresponding block in the corresponding picture. The DV of the current block provides a measure of this horizontal disparity between the block in the corresponding picture and the current block in the current picture.

In some instances, there may also be vertical disparity between the location of the block within the corresponding picture and the location of the current block within the current picture. The DV of the current block may also provide a measure of this vertical disparity between the block in the corresponding picture and the current block in the current picture. A DV contains two components (an x-component and a y-component), although in many instances the vertical component will be equal to zero. The time when the current picture of the current view and the corresponding picture of the different view are displayed may be the same, which is to say the current picture and the corresponding pictures are pictures of the same temporal instance.

In video coding, there are generally two types of prediction, commonly referred to as intra-prediction and inter prediction. In intra-prediction, a video coder predicts a block of video in a picture based on an already-coded block in the same picture. In inter prediction, a video coder predicts a block of video in a picture based on an already-coded block of a different picture (i.e. a reference picture). A reference picture, as used in this disclosure, generally refers to any picture that contains samples that may be used for inter prediction in the decoding process of subsequent pictures in decoding order. When coding multiview content. e.g., according to 3D-HEVC, relative to a current picture, reference pictures may be either of the same temporal instance but in a different view or may be in the same view but of a different temporal instance. In the case of multiview coding, e.g., in 3D-HEVC, inter-picture prediction may include prediction of the current video block, e.g., current coding node of a CU, from another video block in a temporally-different picture, i.e., from a different access unit as the current picture, as well as prediction from a different picture in the same access unit as the current picture, but associated with a different view than the current picture.

In the latter case of the inter prediction, it can be referred to as inter-view coding or inter-view prediction. In multiview coding, inter-view prediction is performed among pictures captured in the different views of the same access unit (i.e., with the same time instance) to remove correlation between views. When coding a picture of a non-base view, e.g., a dependent view, a picture from the same access unit but a different view, e.g., from a reference view, such as the base view, may be added into a reference picture list. An inter-view reference picture can be put into any position of a reference picture list, as is the case with any inter prediction (e.g., temporal or inter-view) reference picture.

The block of the reference picture used for predicting the block of the current picture is identified by a motion vector. In multiview coding, there are at least two kinds of motion vectors. A temporal motion vector (TMV) is a motion vector pointing to a block in a temporal reference picture that is in the same view as the block being coded, but a different time instance or access unit than the block being coded, and the corresponding inter prediction is referred to as motion-compensated prediction (MCP). Another type of motion vector is a disparity motion vector (DMV), which points to a block in a picture in the same access unit current picture, but of a different view. With a DMV, the corresponding inter prediction is referred to as disparity-compensated prediction (DCP) or inter-view prediction.

Figure 2:
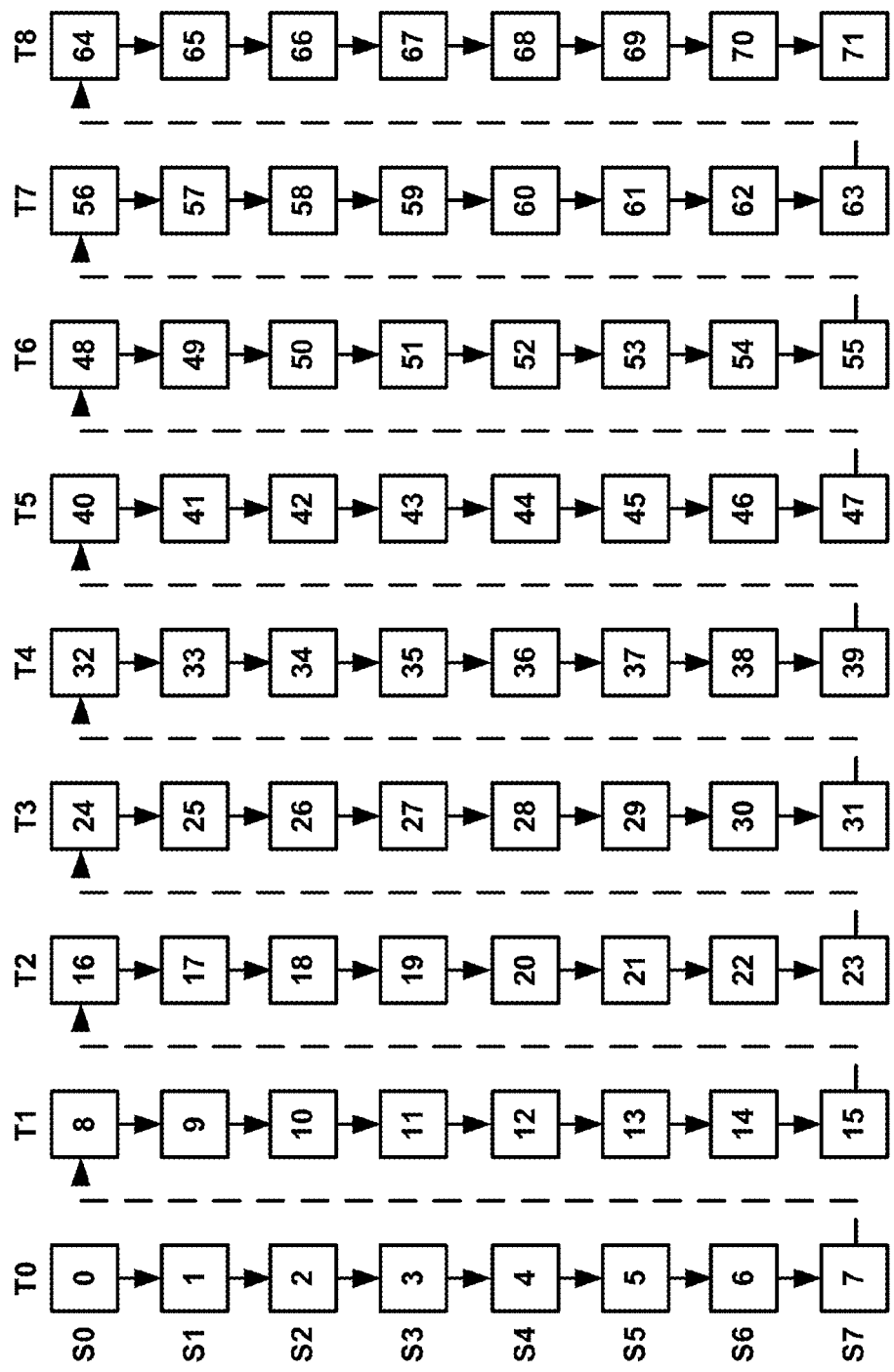
FIG. 2 is a graphical diagram illustrating an example multiview encoding or decoding order.

FIG. 2 is a graphical diagram illustrating an example multiview encoding or decoding order. The decoding order arrangement illustrated in FIG. 2 may be referred to as time-first coding. In general, a multiview or 3D video sequence may include, for each access unit (i.e. with the same time instance), two or more pictures for each of two or more views, respectively. In FIG. 2, S0-S7 each refers to different views of the multiview video. T0-T8 each represents one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e. pictures 8-15), and so forth. In this examples, pictures 0-7 are at a same time instance (i.e., time instance T0), pictures 8-15 at a same time instance (i.e. time instance T1). Pictures with the same time instance are generally displayed at the same time, and it is the horizontal disparity, and possibly some vertical disparity, between the objects within the pictures of the same time instance that cause the viewer to perceive an image that encompasses a 3D volume.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view can be considered as corresponding to the depth view component within the set of the pictures of the view, and vice-versa (i.e., the depth view component corresponds to its texture view component in the set, and vice-versa). As used in this disclosure, a texture view component and a depth view component that correspond may be considered to be part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component may be similar to a gray scale image that includes only luma values. In other words, the depth view component may not convey any image content, but rather provide a measure of the relative depths of the pixels in the texture view component.

For example, a pixel value corresponding to a purely white pixel in the depth view component may indicate that its corresponding pixel or pixels in the corresponding texture view component is closer from the perspective of the viewer, and a pixel value corresponding to a purely black pixel in the depth view component may indicate that its corresponding pixel or pixels in the corresponding texture view component is further away from the perspective of the viewer. The pixel values corresponding to the various shades of gray in between black and white indicate different depth levels. For instance, a very gray pixel in the depth view component indicates that its corresponding pixel in the texture view component is further away than a slightly gray pixel in the depth view component. Because only one pixel value, similar to gray scale, is needed to identify the depth of pixels, the depth view component may include only one pixel value. Thus, values analogous to chroma components are not needed.

The depth view component using only luma values (e.g., intensity values) to identify depth is provided for illustration purposes and should not be considered limiting. In other examples, any technique may be utilized to indicate relative depths of the pixels in the texture view component.

In accordance with multiview coding, the texture view components are inter-predicted from texture view components in the same view or from texture view components in one or more different views. The texture view components may be coded in blocks of video data, which are referred to as "video blocks" and commonly called macroblocks in the H.264 context, or treeblocks or coding units (CUs) in the HEVC context.

The pictures of any similar time instance may include similar content. However, the video content of different pictures in a similar time instance may be slightly displaced in the horizontal direction relative to one another. For example, if a block is located at (x, y) in picture 0 of view S0, a block located at (x+x', y) in picture 1 of view S1 includes similar video content as the block located at (x, y) in picture 0 of view S0. In this example, the block located at (x, y) in picture 0 of view S0 and the block located at (x+x', y) in picture 1 of view S1 are considered as corresponding blocks. In some examples, a DV for the block located at (x+x', y) in picture 1 of view S1 refers to the location of its corresponding block. For example, the DV for the block located at (x+x', y) is (−x', 0).

In some examples, video encoder 20 or video decoder 30 may utilize the DV of a block in a picture of a first view to identify the corresponding block in a picture of a second view. Video encoder 20 and video decoder 20 may, for example, utilize the DV when performing inter-view prediction. Video encoder 20 and video decoder 30 may, for example, perform inter-view prediction by using information of a reference block of a reference picture in a reference view determined by the DV of the current block.

Figure 3:
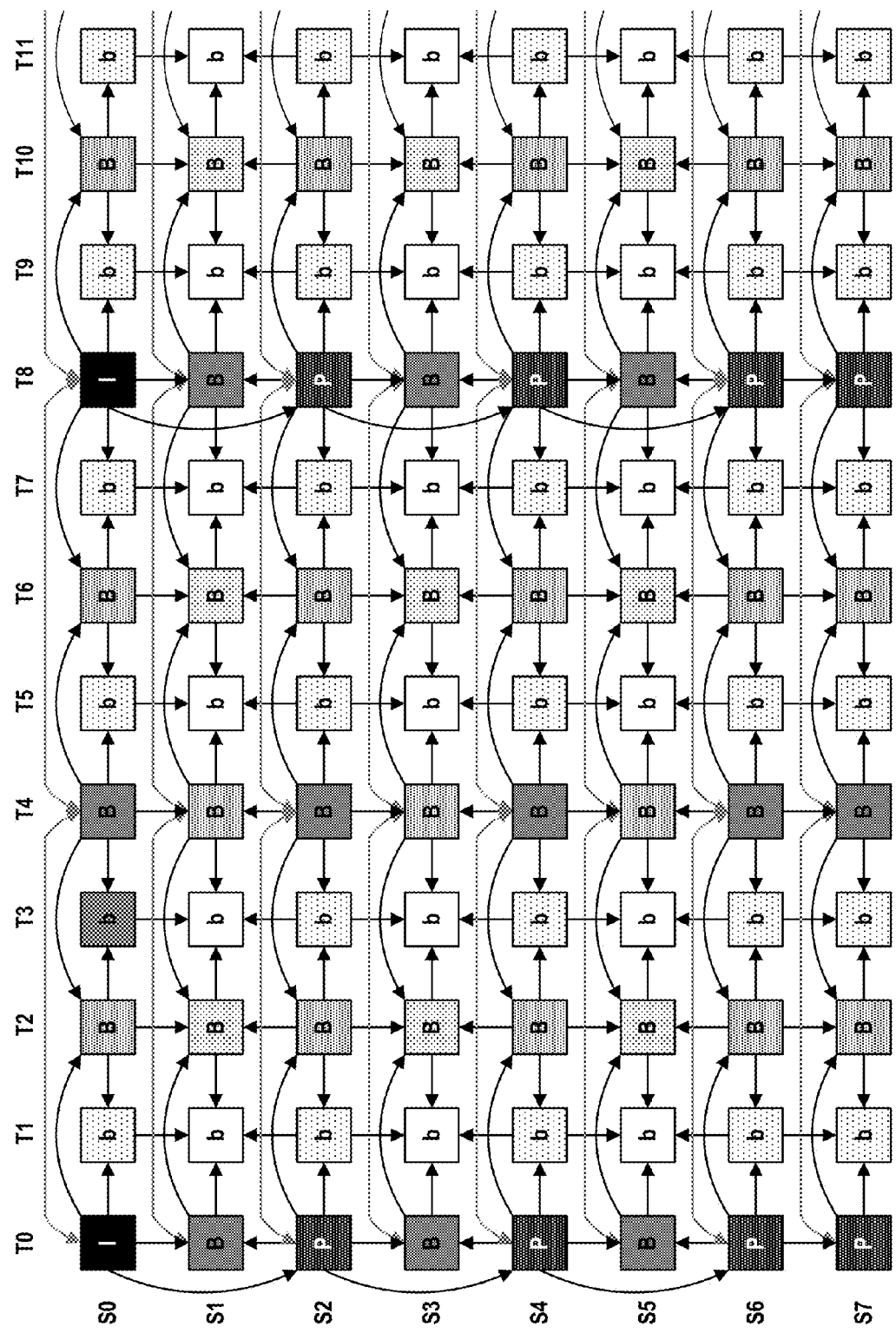
FIG. 3 is a conceptual diagram illustrating an example temporal and inter-view prediction pattern for multiview video coding.

FIG. 3 is a conceptual diagram illustrating an example temporal and inter-view prediction pattern for multiview video coding. Similar to the example of FIG. 2, in the example of FIG. 3, eight views (having view IDs "S0" through "S7")

are illustrated, and twelve temporal locations or access units ("T0" through "T11") are illustrated for each view. That is, each row in FIG. 3 corresponds to a view, while each column indicates a temporal location or access unit. Objects (which may be pictures, or example video blocks in different pictures) are indicated at the intersection of each row and each column in FIG. 3. The H.264/AVC standard with MVC extensions may use the term frame to represent a portion of the video, while HEVC standard may use the term picture to represent a portion of the video. This disclosure uses the term picture and frame interchangeably.

In FIG. 3, view S0 may be considered as a base view, and views S1-S7 may be considered as dependent views. A base view includes pictures that are not inter-view predicted. Pictures in a base view can be inter-predicted with respect to other pictures in the same view. For instance, none of the pictures in view S0 can be inter-predicted with respect to a picture in any of views S1-S7, but some of the pictures in view S0 can be inter-predicted with respect to other pictures in view S0.

Additionally, access units T0 and T8 are random access units or random access points for the video sequence of the example prediction structure of FIG. 3. As illustrated by the blocks labeled "I" in the example prediction structure of FIG. 3, at each random access point (T0 and T8), the video blocks of the base view picture (S0) are intra-picture predicted. The video blocks of other non-base view pictures in the random access points, or of base and non-base view pictures in non-random access points, may be inter-picture predicted, either via temporal inter prediction or inter-view prediction, as illustrated by the various blocks labeled "I," "B," "P," or "b" in the example prediction structure of FIG. 3. The predictions in the example prediction structure of FIG. 3 are indicated by arrows, with the pointed-to object using the pointed-from object for prediction reference.

A dependent view includes pictures that are inter-view predicted. For example, each one of views S1-S7 includes at least one picture that is inter-predicted with respect to a picture in another view. Pictures in a dependent view may be inter-predicted with respect to pictures in the base view, or may be inter-predicted with respect to pictures in other dependent views. In the example of FIG. 3, capital "B" and lowercase "b" are used to indicate different hierarchical relationships between pictures, rather than different coding methodologies. In general, capital "B" pictures are relatively higher in the prediction hierarchy than lowercase "b" frames.

A video stream that includes both a base view and one or more dependent views may be decodable by different types of video decoders. For example, one basic type of video decoder may be configured to decode only the base view. In addition, another type of video decoder may be configured to decode each of views S0-S7. A decoder that is configured to decode both the base view and the dependent views may be referred to as a decoder that supports multiview coding.

The pictures (or other objects) in FIG. 3 are illustrated using a shaded block including a letter, designating whether the corresponding picture is intra-coded (that is, an I-picture), inter-coded in one direction (that is, as a P-picture), or inter-coded in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multiview video coding video sequence may be predictively encoded with respect to pictures at different temporal locations. For example, the B-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component (e.g., a texture view component) can use the view components in other views for reference. In multiview coding, for example, inter-view prediction is realized as if the view component in another view is an inter-prediction reference. The potential inter-view references may be signaled, and can be modified by the reference picture list construction process, which enables flexible ordering of the inter-prediction or inter-view prediction references.

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the B-picture of view S1 at temporal location T1 is predicted from each of the B-pictures of view S1 at temporal locations T0 and T2, as well as the B-pictures of views S0 and S2 at temporal location T1.

FIG. 3 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 3 are illustrated with full shading, while P-pictures have a somewhat lighter shading, and B-pictures (and lowercase b-pictures) have various levels of shading relative to each other, but always lighter than the shading of the P-pictures and the I-pictures.

In general, the prediction hierarchy may be related to view order indexes, in that pictures relatively higher in the prediction hierarchy should be decoded before decoding pictures that are relatively lower in the hierarchy. Those pictures relatively higher in the hierarchy can be used as reference pictures during decoding of the pictures relatively lower in the hierarchy. A view order index is an index that indicates the decoding order of view components in an access unit. The decoding of the view components may follow the ascending order of the view order index. If all the views are presented, then the set of view order indexes may comprise a consecutively ordered set from zero to one less than the full number of views.

For certain pictures at equal levels of the hierarchy, the decoding order may not matter relative to each other. For example, the I-picture of view S0 at temporal location T0 may be used as a reference picture for the P-picture of view S2 at temporal location T0, which, in turn, may be used as a reference picture for the P-picture of view S4 at temporal location T0. Accordingly, the I-picture of view S0 at temporal location T0 should be decoded before the P-picture of view S2 at temporal location T0, which in turn, should be decoded before the P-picture of view S4 at temporal location T0. However, between views S1 and S3, a decoding order does not matter, because views S1 and S3 do not rely on each other for prediction. Instead views S1 and S3 are predicted only from other views that are higher in the prediction hierarchy. Moreover, view S1 may be decoded before view S4, so long as view S1 is decoded after views S0 and S2.

As described above, in 3D-HEVC, video encoder 20 and video decoder 30 may inter-predict a current block within a current picture of a first view with reference to a reference block within a reference picture of a second view. Such inter-prediction is referred to as inter-view prediction. The time instance of the current picture and the reference picture may be the same in respective views. In such examples, video encoder 20 or video decoder 30 perform inter-view prediction across pictures in a same access unit, where pictures in the same access unit are at the same time instance.

To perform inter-view prediction on the current block, video encoder 20 or video decoder 30 construct reference picture lists that identify reference pictures that can be used for inter-prediction, including pictures that can be used for inter-view prediction. Inter-prediction refers to predicting a current block in a current picture with respect to a reference block in a reference picture. Inter-view prediction is a subset of inter-prediction in that in inter-view prediction, the reference picture is in a view different than the view of the current picture. Accordingly, for inter-view prediction, video encoder 20 and video decoder 30 add the reference picture in the other view in one or both of the constructed reference picture lists. The reference picture in the other view can be identified at any location within the constructed reference picture lists. As used in this disclosure, when video encoder 20 is performing inter-prediction (e.g., inter-predicting) on a block, video encoder 20 may be considered as inter-prediction encoding a block. When video decoder 30 is performing inter-prediction (e.g., inter-predicting) on a block, video decoder 30 may be considered as inter-prediction decoding a block. In inter-view prediction, a DMV for the current video block identifies a location of the block in a reference picture in a view other than the view in which the picture that includes the video block to be predicted that is to be used as the reference block for inter-predicting the current block, and a reference index into one or both of the constructed reference picture lists identifies the reference picture in the other view.

This disclosure describes techniques for performing ARP that include identifying a DMV of the current video block or of a reference video block, and determining a residual predictor block for the current video block based on the identified DMV. A DMV of the current video block, or of a reference video block in the same view as the current video block, may be considered a DMV from the current view of a current video block to a reference view that is used for inter-view prediction of video data in the current view based on video data in the reference view. The techniques of this disclosure may be implemented by one or both of video encoder 20 and video decoder 30. These techniques may, for example, be used in conjunction with HEVC-based multiview video coding and/or HEVC-based 3D video coding.

As discussed above, the data defining a TMV or DMV for a block of video data may include horizontal and vertical components of the vector, as well as a resolution for the vector. Motion information for a video block may include a motion vector, as well as a prediction direction and a reference picture index value. Additionally, the motion information for a current video block may be predicted from the motion information of a neighboring video block which may also be referred to as a reference video block. The reference video block may be a spatial neighbor within the same picture, a temporal neighbor within a different picture of the same view, but within a different access unit, or a video block within a different picture of a different view, but within the same access unit. In the case of motion information from a reference block in a different view, the motion vector may be a TMV derived from a reference block in an interview reference picture (i.e., a reference picture in the same access unit as the current picture, but from a different view), or a DMV derived from a DV.

Typically, for motion information prediction, a list of candidate motion information from various reference blocks is formed in a defined manner, e.g., such that the motion information from various reference blocks are considered for inclusion in the list in a defined order. After forming the candidate list, video encoder 20 may assess each candidate to determine which provides the best rate and distortion characteristics that best match a given rate and distortion profile selected for encoding the video. Video encoder 20 may perform a rate-distortion optimization (RDO) procedure with respect to each of the candidates, selecting the one of the motion information candidates having the best RDO results. Alternatively, video encoder 20 may select one of the candidates stored in the list that best approximates the motion information determined for the current video block.

In any event, video encoder 20 may specify the selected candidate using an index identifying the selected one of the candidates in the candidate list of motion information. Video encoder 20 may signal this index in the encoded bitstream for use by video decoder 30. For coding efficiency, the candidates may be ordered in the list such that the candidate motion information most likely to be selected for coding the current video block is first, or otherwise is associated with the lowest magnitude index value.

Techniques for motion information prediction may include a merge mode, skip mode, and an advance motion vector prediction (AMVP) mode. In general, according to merge mode and/or skip mode, a current video block inherits the motion information, e.g., motion vector, prediction direction, and reference picture index, from another, previously-coded neighboring block, e.g., a spatially-neighboring block in the same picture, or a block in a temporal or interview reference picture. When implementing the merge/skip mode, video encoder 20 constructs a list of merging candidates that are the motion information of the reference blocks in a defined matter, selects one of the merging candidates, and signals a candidate list index identifying the selected merging candidate to video decoder 30 in the bitstream.

Video decoder 30, in implementing the merge/skip mode, receives this candidate list index, reconstructs the merging candidate list according to the defined manner, and selects the one of the merging candidates in the candidate list indicated by the index. Video decoder 30 may then instantiates the selected one of the merging candidates as a motion vector for the current PU at the same resolution as the motion vector of the selected one of the merging candidates, and pointing to the same reference picture as the motion vector for the selected one of the merging candidates. Accordingly, at the decoder side, once the candidate list index is decoded, all of the motion information of the corresponding block of the selected candidate may be inherited such as—e.g., motion vector, prediction direction, and reference picture index. Merge mode and skip mode promote bitstream efficiency by allowing the video encoder 20 to signal an index into the merging candidate list, rather than all of the motion information for inter-prediction of the current video block.

When implementing AMVP, video encoder 20 constructs a list of candidate motion vector predictors (MVPs) in a defined matter, selects one of the candidate MVPs, and signals a candidate list index identifying the selected MVP to video decoder 30 in the bitstream. Similar to merge mode, when implementing AMVP, video decoder 30 reconstructs the list of candidate MVPs in the defined matter, decodes the candidate list index from the encoder, and selects and instantiates one of the MVPs based on candidate list index.

However, contrary to the merge/skip mode, when implementing AMVP, video encoder 20 also signals a reference picture index and prediction direction, thus specifying the reference picture to which the MVP specified by the candidate list index points. Further, video encoder 20 determines a motion vector difference (MVD) for the current block, where the MVD is a difference between the MVP and the actual motion vector that would otherwise be used for the current block. For AMVP, in addition to the reference picture index, reference picture direction and candidate list index, video encoder 20 signals the MVD for the current block in the bitstream. Due to the signaling of the reference picture index and prediction vector difference for a given block, AMVP may not be as efficient as merge/skip mode, but may provide improved fidelity of the coded video data.

Figure 4:
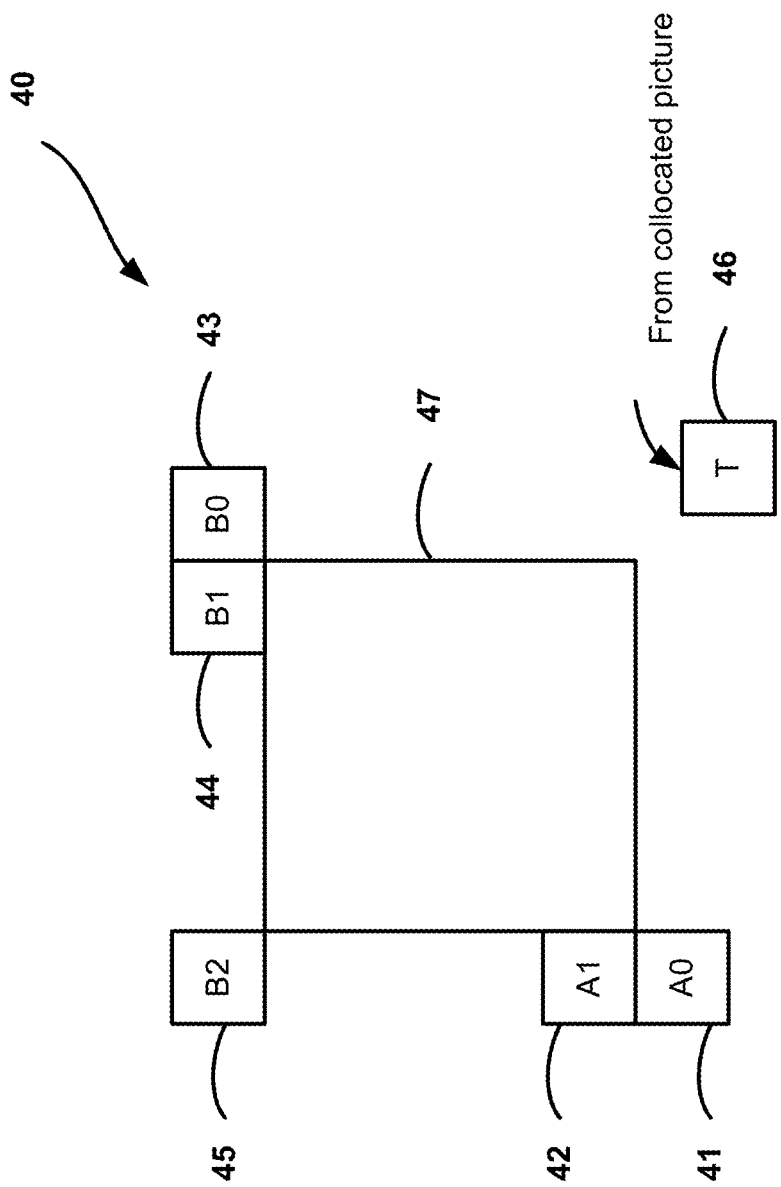
FIG. 4 is a conceptual diagram illustrating an example relationship neighboring blocks to a current block for prediction of the motion information of the current block.

FIG. 4 shows an example of a current video block 47, five spatial neighboring blocks (41, 42, 43, 44 and 45), and a temporal reference block 46 from another picture but in the same view as the current picture. Temporal reference block 46 may, for example, be a co-located block in a picture of a different temporal instance but the same view as current video block 47. In some examples, current video block 47 and reference video blocks 41-46 may be as generally defined in the HEVC standard currently under development. Reference video blocks 41-46 are labeled A0, A1, B0, B1, B2 and T in accordance with the HEVC standard currently under development. Video encoder 20 and video decoder 30 may predict the motion information, including a TMV, of current video block 47 based on the motion information of reference video blocks 41-46 according to a motion information prediction mode, e.g., a merge/skip mode or AMVP mode. As described in greater detail below, the TMVs of video blocks may be used with DMVs for advanced residual prediction according to the techniques of this disclosure.

As illustrated in FIG. 4, video blocks 42, 44, 43, 41, and 45 may be left, above, above-right, below-left, and above-left, respectively, relative to current video block 47. However, the number and locations of neighboring blocks 41-45 relative to current video block 47 illustrated in FIG. 4 are merely examples. In other locations, the motion information of a different number of neighboring blocks and/or of blocks at different locations, may be considered for inclusion in a motion information prediction candidate list for current video block 47.

The spatial relationship of each of spatially-neighboring blocks 42, 44, 43, 41, and 45 to current video block 47 may be described as follows. A luma location (xP, yP) is used to specify the top-left luma sample of the current block relative to the top-left sample of the current picture. Variables nPSW and nPSH denote the width and the height of the current block for luma. The top-left luma sample of spatially-neighboring block 42 is xP−1, yP+nPSH−1. The top-left luma sample of spatially-neighboring block 44 is xP+nPSW−1, yP−1. The top-left luma sample of spatially-neighboring block 43 is xP+nPSW, yP−1. The top-left luma sample of spatially-neighboring block 41 is xP−1, yP+nPSH. The top-left luma sample of spatially-neighboring block 45 is xP−1, yP−1. Although described with respect to luma locations, the current and reference blocks may include chroma components.

Each of spatially-neighboring blocks 41-45 may provide a spatial motion information candidate for predicting the motion information, e.g., TMV, of current video block 47. A video coder, e.g., video encoder 20 (FIG. 1) or video decoder 30 (FIG. 1), may consider the motion information of the spatially-neighboring reference blocks in a predetermined order, e.g., a scan order. In the case of 3D-HEVC, for example, the video decoder may consider the motion information of the reference blocks for inclusion in a merging candidate list for the merge mode in the following order: 42, 44, 43, 41, and 45. In the illustrated example, spatially-neighboring blocks 41-45 are to the left of and/or above, current video block 47. This arrangement is typical, as most video coders code video blocks in raster scan order from the top-left of a picture. Accordingly, in such examples, spatially-neighboring blocks 41-45 will typically be coded prior to current video block 47. However, in other examples, e.g., when a video coder codes video blocks in a different order, spatially-neighboring blocks 41-45 may be located to the right of and/or below current video block 47.

Temporal reference block 46 is located within a temporal reference picture coded prior, although not necessarily immediately prior in coding order, to the current picture of current video block 47. Additionally, the reference picture of block 46 is not necessarily prior to the picture of current video block 47 in display order. Reference video block 46 may be generally co-located in the reference picture relative to the location of current video block 47 in the current picture. In some examples, reference video block 46 is located to the right of and below the position of current video block 47 in the current picture, or covers the center position of current video block 47 in the current picture.

Figure 5:
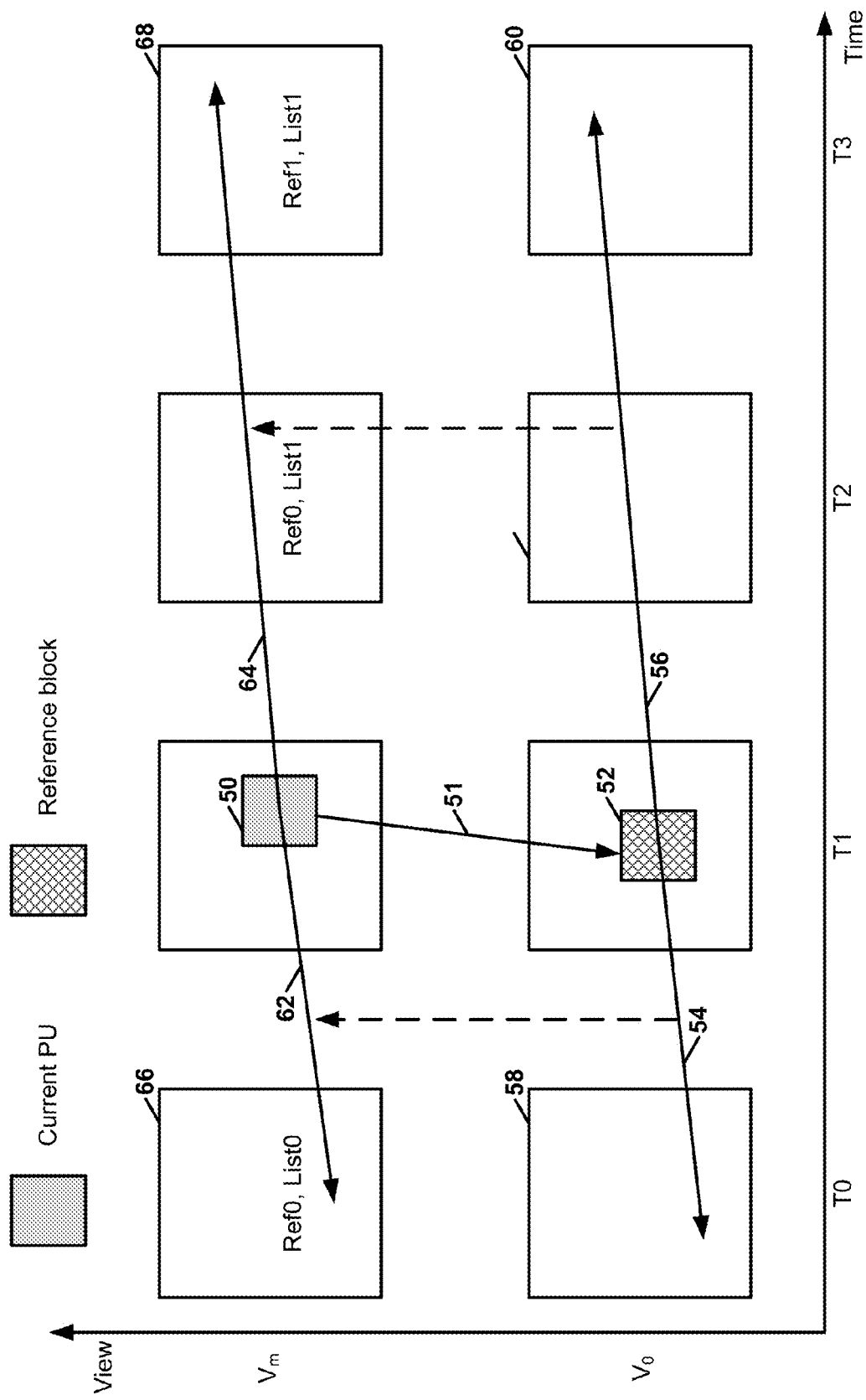
FIG. 5 is a conceptual diagram illustrating an example of derivation of an inter-view predicted motion vector candidate and an inter-view disparity motion vector candidate for prediction of the motion information of the current block.

FIG. 5 is a conceptual diagram illustrating an example of derivation of an inter-view predicted motion vector candidate (IPMVC) and an inter-view disparity motion vector candidate (IDMVC) for prediction of the motion information of a current video block 50, e.g., according to a merge/skip mode or an AMVP mode. When inter-view prediction is enabled, video encoder 20 and/or video decoder 30 may add a new motion vector candidate, IPMVC or IDMVC to the motion information candidate list for current video block 50. The IPMVC may predict a TMV for current video block 50, which video encoder 20 and/or video decoder 30 may use for ARP of current video block 50 or another video block according to the techniques of this disclosure, as described in greater detail below. The IDMVC may predict a DMV for current video block 50, which video encoder 20 and/or video decoder 30 may use for ARP of current video block 50 or another video block according to the techniques of this disclosure, as described in greater detail below.

In the example of FIG. 5, current block 50 is in current view Vm. Video encoder 20 and/or video decoder 30 may locate a corresponding or reference block 52 in reference view V0 using a disparity vector (DV) 51. The video coder may determine DV 51 based on camera parameters, or according to any of the techniques described herein. For example, the video coder may determine DV 51 for current video block 50 including based on a DV of a neighboring block, e.g., using Neighboring Block Based Disparity Vector Derivation (NBDV).

If reference block 52 is not intra-coded and not inter-view predicted, and its reference picture, e.g., reference picture 58 or reference picture 60, has a picture order count (POC) value equal to that of one entry in the same reference picture list of current video block 50, video encoder 20 and/or video decoder 30 may derive its motion information (prediction direction, reference pictures, and motion vectors), after converting the reference index based on POC, to be the IPMVC for current video block 50. In the example of FIG. 5, reference video block 52 is associated with TMV 54 pointing to a first reference picture 58 in the reference view V0 that is specified a first reference picture list (RefPicList0), and TMV 56 pointing to a second picture 60 in the reference view V0 that is specified in a second reference picture list (RefPicList1). The inheritance of TMVs 54 and 56 by current video block 50 is illustrated by the dashed arrows in FIG. 5. Based on the motion information of reference video block 52, the video coder derives the IPMVC for current video block 50 to be at least one of a TMV 62 pointing to a first reference picture 66 in the current view Vm that is specified in a first reference picture list (RefPicList0), e.g., with the same POC in the first reference picture list as reference picture 58, and TMV 64 pointing to a second picture 68 in the current view Vm that is specified in a second reference picture list (RefPicList1), e.g., with the same POC as reference picture 60. Video encoder 20 and/or video decoder 30 may use TMV 62 and/or TMV 64 for ARP of current video block 50 or another video block according to the techniques of this disclosure, as described in greater detail below.

Video encoder 20 and/or video decoder 30 may also convert DV 51 to an IDMVC for current video block 50, and add the IDMVC to the motion information candidate list for current video block 50 in a different position from the IPMVC. Each of the IPMVC or IDMVC may be referred to as an 'inter-view candidate' in this context. In the merge/skip mode, the video coder inserts the IPMVC, if available, before all spatial and temporal merging candidates to the merge candidate list. In the merge/skip mode, the video coder inserts the IDMVC before the spatial merging candidate derived from A0 (block 41 of FIG. 4). The conversion of DV 51 to an IDMVC may be considered conversion of DV 51 to a DMV for current video block 50. Video encoder 20 and/or video decoder 30 may use the DMV for ARP of current video block 50 or another video block according to the techniques of this disclosure, as described in greater detail below.

In some situations, a video coder may derive a DV for a current video block. For example, as described above with reference to FIG. 5, video encoder 20 and/or video decoder 30 may derive DV 51 for current video block 50. In some examples, a video coder may use Neighboring Blocks Based Disparity Vector (NBDV) derivation to derive the DV for the current video block.

Proposals for 3D-HEVC use a texture-first coding order for all of the views. In other words, for each of the plurality of views in the bitstream, the texture component of is coded, e.g., encoded or decoded, prior to any depth component for the view. In some cases, e.g., for inter-view prediction, a DV is needed to code a video block in a texture component of a view in a particular access unit. However, in texture-first coding, the corresponding depth component of the current video block is not available for determining the DV for the current video block. NBDV may be employed by a video coder, and is proposed for 3D-HEVC, to derive a DV for a current video block in such situations. In the current 3D-HEVC design, the DV derived from NBDV could be further refined by retrieving the depth data from reference view's depth map pointed by the DV from NBDV process.

A DV is used for an estimator of the displacement between two views. Because neighbouring blocks share almost the same motion/disparity information in video coding, the current video block can use the motion vector information in neighbouring blocks as a good predictor of its motion/disparity information. Following this idea, NBDV uses the neighbouring disparity information for estimating the DVs in different views.

According to NBDV, a video coder identifies several spatial and temporal neighbouring blocks. Two sets of neighbouring blocks are utilized. One set is from spatial neighbouring blocks and the other set is from temporal neighbouring blocks. The video coder then checks each of the spatial and temporal neighbouring blocks in a pre-defined order determined by the priority of the correlation between the current block and the candidate (neighbouring) block. When the video coder identifies a DMV, i.e., a motion vector that points from the neighbouring candidate block to an inter-view reference picture (in the same access unit, but in a different view), in the motion information of the candidates, the video coder converts the DMV to a DV, and returns the associated view order index. For example, the video coder may set a horizontal component of the DV for the current block equal to a horizontal component of the DMV and may set the vertical component of the DV to 0.

3D-HEVC firstly adopted the NBDV method proposed in Zhang et al. "3D-CE5.h: Disparity vector generation results," Joint Collaborative Team on Video Coding Extension Development of ITU-T SG 16 WP 3 and ISO/IEC JTC 1/SC 29/WG 11, 1st Meeting: Stockholm, SE, 16-20 Jul. 2012, Doc. JCT3V-A0097 (MPEG number m26052), hereinafter "JCT3V-A0097." JCT3V-A0097 may be downloaded from the following link:

http://phenix.int-evry.fr/jet2/doc_end_user_current_document.php?id=89. The entire content of JCT3V-A0097 is incorporated herein by reference.

In some designs of 3D-HEVC, when the video coder performs the NBDV process, the video coder checks disparity motion vectors in the temporal neighboring blocks, disparity motion vectors in the spatial neighboring blocks, and then implicit disparity vectors (IDVs) in order. An IDV may be a disparity vector of a spatially- or temporally-neighboring PU that is coded using inter-view prediction. IDVs may also be referred to as derived disparity vectors. An IDV may be generated when a PU employs inter-view prediction, i.e., the candidate for AMVP or merge modes is derived from a reference block in the other view with the help of a disparity vector. Such a disparity vector is called IDV. An IDV may be stored to the PU for the purpose of DV derivation. For instance, even though the block is coded with motion prediction, a derived DV for the block is not discarded for the purpose of coding a following video block. Thus, when the video coder identifies a DMV or an IDV, the video coder may return the identified DMV or IDV.

Implicit disparity vectors (IDVs) were included with a simplified NBDV in Sung et al., "3D-CE5.h: Simplification of disparity vector derivation for HEVC-based 3D video coding," Joint Collaborative Team on Video Coding Extension Development of ITU-T SG 16 WP 3 and ISO/IEC JTC 1/SC 29/WG 11, 1st Meeting: Stockholm, SE, 16-20 Jul. 2012, Doc. JCT3V-A0126 (MPEG number m26079), hereinafter "JCT3V-A0126." JCT3V-A0126 may be downloaded from the following link:

http://phenix.int-evry.fr/jet2/doc_end_user/current_document.php?id=142. The entire content of JCT3V-A0126 is incorporated herein by reference.

Further development of the NBDV for 3D-HEVC occurred in Kang et al., "3D-CE5.h: Improvement for disparity vector derivation," Joint Collaborative Team on Video Coding Extension Development of ITU-T SG 16 WP 3 and ISOilEC JTC 1/SC 29/WG 11, 2nd Meeting: Shanghai, CN, 13-19 Oct. 2012, Doc. JCT3V-B0047 (MPEG number m26736), hereinafter "JCT3V-B0047." JCT3V-B0047 may be downloaded from the following link:

http://phenix.it-sudparis.eu/jet2/doc_end_user/current_document.php?id=236. The entire content of JCT3V-B0047 is incorporated herein by reference. In JCT3V-B0047, the NBDV for 3D-HEVC was further simplified by removing the IDVs stored in the decoded picture buffer, but coding gain is also improved with the random access point (RAP) picture selection. The video coder may convert the returned disparity motion vector or IDV to a disparity vector and may use the disparity vector for inter-view prediction and inter-view residual prediction. Random access refers to a decoding of a bitstream starting from a coded picture that is not the first coded picture in the bitstream. The insertion of random access pictures or random access points into a bitstream at regular intervals may enable random access. Example types of random access pictures include Instantaneous Decoder Refresh (IDR) pictures, Clean Random Access (CRA) pictures, and Broken Link Access (BLA) pictures. Hence. IDR pictures, CRA pictures and BLA pictures are collectively referred to as RAP pictures. In some examples. RAP pictures may have NAL unit types are equal to BLA_W_LP, BLA_W_RADL, BLA_N_LP, IDR_W_RADL, IDR_N_LP. RSV_I-RAP_VCL22, RSV_IRAP_VCL23, or CRA_NUT.

Techniques for CU-based DV derivation for 3D-HEVC were proposed in Kang et al. "CE2.h: CU-based disparity vector derivation in 3D-HEVC," Joint Collaborative Team on Video Coding Extension Development of ITU-T SG 16 WP 3 and ISO/IEC JTC 1/SC 29/WG 11, 4th Meeting: Incheon, KR, 20-26 Apr. 2013, Doc. JCT3V-D0181 (MPEG number m29012), hereinafter "JCT3V-D0181." JCT3V-D0181 may be downloaded from the following link:

http://phenix.it-sudparis.eu/jet3/v/doc_end_user/current_document.php?id=866. The entire content of JCT3V-D0181 is incorporated herein by reference.

When the video coder identifies a DMV or an IDV, the video coder may terminate the checking process. Thus, once the video coder finds a DV for the current block, the video coder may terminate the NBDV process. When the video coder is unable to determine a DV for the current block by performing the NBDV process (i.e., when there is no DMV or IDV found during the NBDV process), the NBDV is marked as unavailable. In other words, it can be considered that the NBDV process returns an unavailable disparity vector.

If the video coder is unable to derive a DV for the current block (i.e., if no disparity vector is found) by performing the NBDV process, the video coder may use a zero DV as the DV for the current PU. The zero DV is a DV having both horizontal and vertical components equal to 0. Thus, even when the NBDV process returns an unavailable result, other coding processes of the video coder that require a DV may use a zero disparity vector for the current block. In some examples, if the video coder is unable to derive a DV for the current block by performing the NBDV process, the video coder may disable inter-view residual prediction for the current block. However, regardless of whether the video coder is able to derive a DV for the current block by performing the NBDV process, the video coder may use inter-view prediction for the current block. That is, if no DV is found after checking all the pre-defined neighboring blocks, a zero disparity vector may be used for inter-view prediction while inter-view residual prediction may be disabled for the corresponding CU.

Figure 6:
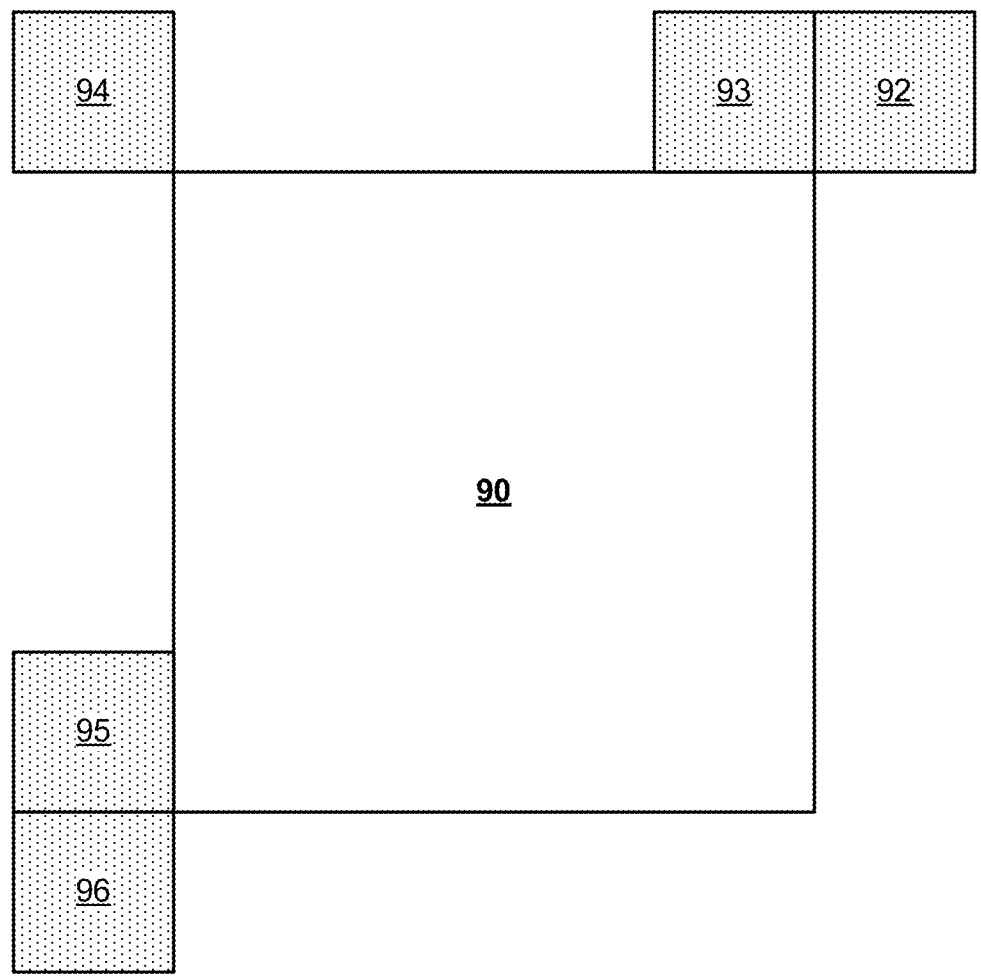
FIG. 6 is a conceptual diagram illustrating example spatial neighboring blocks, from which a disparity vector for a current video block may be derived using Neighboring Block Based Disparity Vector Derivation (NBDV), relative to the current video block.

FIG. 6 is a conceptual diagram illustrating example spatial neighboring blocks, from which a DV for a current video block may be derived using NBDV, relative to the current video block 90. The five spatial neighbouring blocks illustrated in FIG. 6 are the below-left block 96, the left block 95, above-right block 92, the above block 93, and the above-left block 94 relative to the current video block. The spatial neighbouring blocks may be the below-left, left, above-right, above, and above-left blocks of a CU covering current video block. It should be noted that these spatial neighbouring blocks for NBDV may be the same as the spatial neighbouring blocks used by the video coder for motion information prediction for the current video block such as according to the MERGE/AMVP modes in HEVC. In such cases, no additional memory access by the video coder may be required for NBDV, as the motion information of the spatial neighbouring blocks is already considered for motion information prediction for the current video block.

For checking temporal neighbouring blocks, a video coder constructs a candidate picture list. In some examples, the video coder may treat up to two reference pictures from current view, i.e., the same view as the current video block, as candidate pictures. The video coder may first insert the co-located reference picture into the candidate picture list, followed by the rest of candidate pictures in the ascending order of reference picture index. When the reference pictures with the same reference index in both reference picture lists are available, the video coder may insert the one in the same reference picture list as the co-located picture prior to the other reference picture from the other reference picture list. In some examples, the video coder may identify three candidate regions for deriving the temporal neighbouring blocks from each of the candidate pictures in the candidate picture list. The three candidate regions may be defined as follows:

CPU: A co-located region of the current PU or current CU.

CLCU: A largest coding unit (LCU) covering the co-located region of the current block.

BR: A bottom-right 4×4 block of the CPU.

If the PU that covers the candidate region specifies a DMV, the video coder may determine the DV of the current video unit based on the disparity motion vector of the PU.

As discussed above, in addition to DMVs derived from spatial and temporal neighboring blocks, a video coder may check for IDVs. In the proposed NBDV process for 3D-HTM 7.0, the video coder checks DMVs in the temporal neighboring blocks, then DMVs in the spatial neighboring blocks, and then the IDVs, in order. Once, the DMV or IDV is found, the process is terminated.

When the video coder checks a neighboring PU (i.e. a spatially- or temporally-neighboring PU), the video coder may check first whether the neighboring PU has a disparity motion vector. If none of the neighboring PUs has a disparity motion vector, the video coder may determine whether any of the spatially-neighboring PUs has an IDV. If one of the spatially-neighboring PUs has an IDV and the IDV is coded as merge/skip mode, the video coder may terminate the checking process and may use the IDV as the final disparity vector for the current PU.

As indicated above, a video coder may apply an NBDV process to derive a DV for a current block (e.g., a CU. PU, etc.). The disparity vector for the current block may indicate a location in a reference picture (i.e., a reference component) in a reference view. In some 3D-HEVC designs, the video coder is allowed to access depth information for the reference view. In some such 3D-HEVC designs, when the video coder uses the NBDV process to derive the DV for the current block, the video coder may apply a refinement process to further refine the disparity vector for the current block. The video coder may refine the DV for the current block based on the reference picture's depth map. The video coder may use a similar refinement process to refine a DMV for backward view synthesis prediction. In this way, the depth can be used to refine the DV or DMV to be used for backward view synthesis prediction. This refinement process may be referred to herein as NBDV refinement ("NBDV-R"), the NBDV refinement process, or depth-oriented NBDV (Do-NBDV).

When the NBDV process returns an available disparity vector (e.g., when the NBDV process returns a variable that indicates that the NBDV process was able to derive a disparity vector for the current block based on a disparity motion vector or an IDV of a neighboring block), the video coder may further refine the disparity vector by retrieving depth data from the reference view's depth map. In some examples, the refinement process includes the following two steps:

1) Locate a corresponding depth block by the derived DV in the previously coded reference depth view, such as the base view; the size of the corresponding depth block is the same as that of current PU.

2) Select one depth value from four corner pixels of the corresponding depth block and convert it to the horizontal component of the refined DV. The vertical component of the DV is unchanged.

The refined DV may be used for inter-view prediction for the current video block, while the unrefined DV may be used for inter-view residual prediction for the current video block. In addition, the refined DV is stored as the motion vector of one PU if it is coded with backward view synthesis prediction (BVSP) mode, which is described in greater detail below. In proposed NBDV process for 3D-HTM 7.0, the depth view component of the base view will be always accessed regardless the value of view order index derived from the NBDV process.

A Backward View Synthesis Prediction (BVSP) approach was proposed in Tian et al., "CE1.h: Backward View Synthesis Prediction using Neighboring Blocks," Joint Collaborative Team on Video Coding Extension Development of ITU-T SG 16 WP 3 and ISO/IEC JTC I/SC 29/WG 11. 3rd Meeting: Geneva, CH, 17-23 Jan. 2013, Doc. JCT3V-C0152 (MPEG number m27909), hereinafter "JCT3V-C0152." JCT3V-C0152 may be downloaded from the following link: http://phenix.int-evry.fr/jet3v/doc_end_user/current_document.phn?id=594. The entire content of JCT3V-C0152 is incorporated herein by reference.

JCT3V-C0152 was adopted in the 3rd JCT-3V meeting. The basic idea of this BSVP is the same as the block-based VSP in 3D-AVC. Both of these two techniques use the backward-warping and block-based VSP to avoid transmitting the motion vector differences and use more precise motion vectors. Implementation details are different due to different platforms. In the following paragraphs, we also use the term BVSP to indicate one or both of the backward-warping VSP approach in 3D-HEVC or the block-based VSP in 3D-AVC.

In 3D-HTM, texture first coding is applied in common test conditions. Therefore, the corresponding non-base depth view is unavailable when decoding one non-base texture view. Therefore, the depth information is estimated and used to perform BVSP.

In general, when a video coder performs BVSP to synthesize a reference texture picture, the video coder processes blocks (e.g., video units) in a dependent texture picture. The dependent texture picture and the synthesized texture picture are in the same access unit, but are in different views. When the video coder processes a block (i.e., a current block) of the dependent texture picture, the video coder may perform an NBDV process to identify a DV of the current block. That is, in order to estimate the depth information for a block, a video coder may first derive a DV from neighboring blocks.

Furthermore, when the video coder performs BVSP to synthesize the reference texture picture, the video coder may use the DV of the current block to identify a reference block in a reference depth picture. In other words, the video coder may then use the derived DV to obtain a depth block from a reference view. For instance, the DV identified by the NBDV process may be denoted as (dvx, dvy) and the current block position may be denoted as (blockx, blocky). Furthermore, in this example, the video coder may fetch a depth block at (blockx+dvx, blocky+dvy) in the depth image of the reference view. In this example, the fetched depth block has the same size of the current PU. The dependent texture picture and the reference depth picture are in the same access unit, but are in different views. The video coder may then perform a backward warping process to determine, based on sample values of the current block and sample values of the identified reference block of the reference picture, sample values of the synthesized picture. In other words, the video coder, in this example, may use the fetched depth block to perform backward warping for the current PU.

As indicated above, when the video coder performs BVSP, the video coder may perform an NBDV process to identify a DV for a current block. Furthermore, when the video coder performs BVSP, the video coder may use a refinement process similar to that described elsewhere in this disclosure to refine the DMV derived using the NBDV process. When the video coder performs the DV refinement process, the video coder may refine the DV based on depth values in a depth map in a reference view. In other words, the depth can be used to refine the DV or DMV to be used for BVSP. The refined DV may be stored as the motion vector of one PU if the refined DV is coded with BVSP mode.

In some versions of 3D-HEVC, texture first coding is applied. In texture first coding, a video coder codes (e.g., encodes or decodes) a texture view component prior to coding the corresponding depth view component (i.e., the depth view component having the same POC value and view identifier as the texture view component). Therefore, a non-base view depth view component is unavailable for use in coding a corresponding non-base view texture view component. In other words, when a video coder codes a non-base texture view component, the corresponding non-base depth view component is unavailable. Therefore, the depth information may be estimated and used to perform BVSP.

Figure 7:
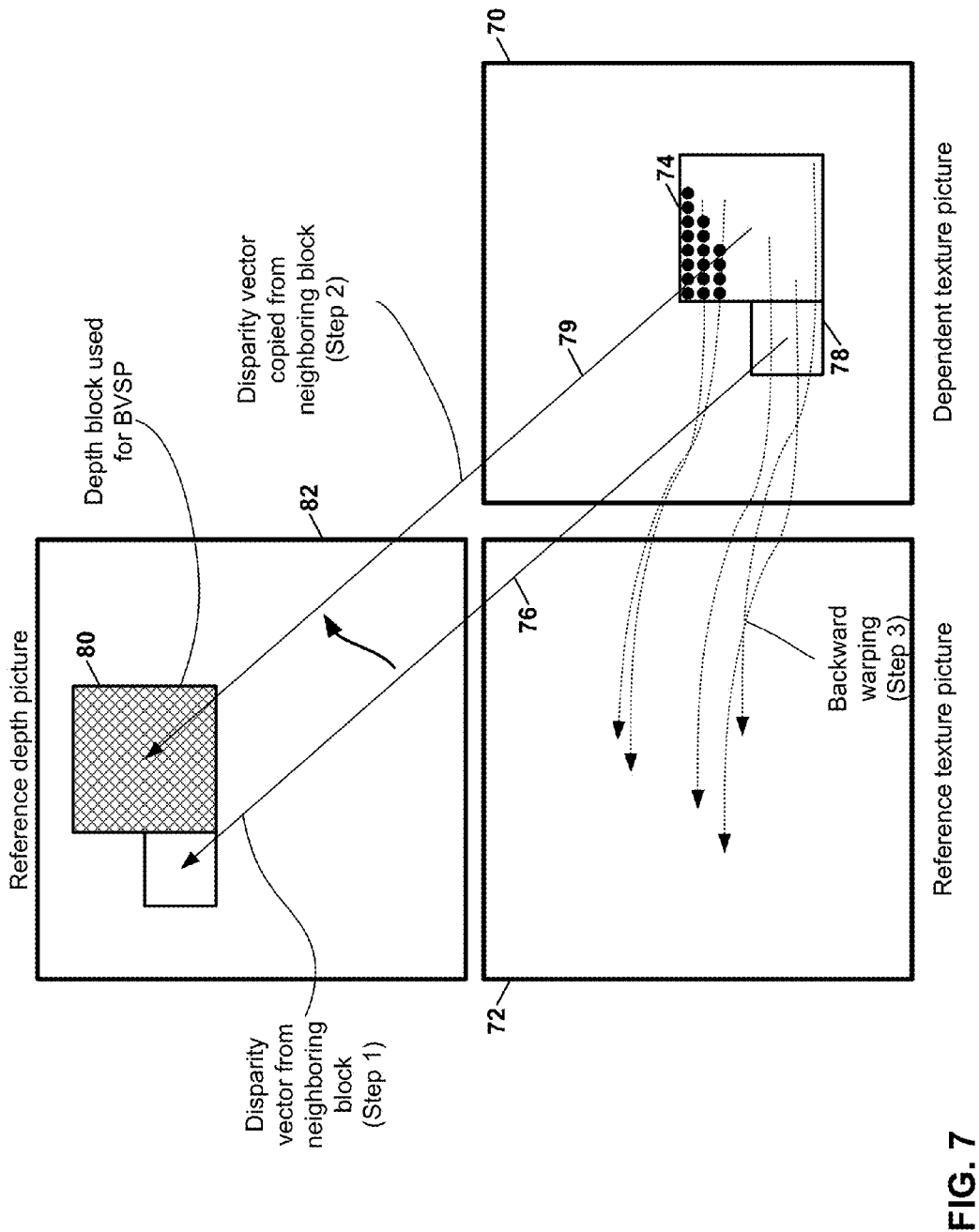
FIG. 7 is a conceptual diagram illustrating an example of location of a depth block from a reference view, and use of the located depth block in the reference view for Backward View Synthesis Prediction (BVSP).

FIG. 7 is a conceptual diagram illustrating depth block derivation from a reference view to perform BVSP prediction. In the example of FIG. 7, a video coder is coding a current texture picture 70. Current texture picture 70 is labeled a "dependent texture picture" because current texture picture 70 is dependent on a synthesized reference texture picture 72. In other words, the video coder may need to synthesize reference texture picture 72 in order to decode current texture picture 70. Reference texture picture 72 and current texture picture 70 are in the same access unit but are in different views.

In order to synthesize reference texture picture 72, the video coder may process blocks (i.e., video units) of current texture picture 70. In the example of FIG. 7, the video coder is processing a current block 74. When the video coder processes current block 74, the video coder may perform the NBDV process to derive a DV for current block 74. For instance, in the example of FIG. 7, the video coder identifies a DV 76 of a block 78 that neighbors current video block 74. The identification of DV 76 is shown as Step 1 of FIG. 7. Furthermore, in the example of FIG. 7, the video coder determines, based on DV 76, a DV 78 of current block 74. For instance, DV 78 may be a copy of DV 76. Copying DV 76 is shown as Step 2 of FIG. 7.

The video coder may identify, based on DV 78 of current block 74, a reference video block 80 in a reference depth picture 82. Reference depth picture 82, current texture picture 70, and reference texture picture 72 may each be in the same access unit. Reference depth picture 82 and reference texture picture 72 may be in the same view. The video coder may determine, based on texture sample values of current block 74 and depth sample values of reference depth block 80, texture sample values of reference texture picture 72. The process of determining the texture sample values may be referred to as backward warping. Backward warping is shown as Step 3 of FIG. 7. In this way, FIG. 7 illuminates the three steps how a depth block from the reference view is located and then used for BVSP prediction.

The introduced BVSP mode is treated as a special inter-coded mode and a flag of indicating the usage of BVSP mode should be maintained for each PU. Rather than signaling the flag in the bitstream, a new merging candidate (BVSP merging candidate) for the merge mode is added to the merging candidate list, and the flag is dependent on whether the decoded merge candidate index corresponds to a BVSP merging candidate. The BVSP merging candidate is defined as follows:

1. Reference picture index for each reference picture list: −1
2. Motion vector for each reference picture list: the refined disparity vector The inserted position of BVSP merging candidate is dependent on the spatial neighbouring blocks:

1. If any of the five spatial neighbouring blocks is coded with the BVSP mode, i.e., the maintained flag of the neighbouring block is equal to 1, the video coder treats the BVSP merging candidate as the corresponding spatial merging candidate, and inserts the BVSP candidate into the merge candidate list. In some example, the video coder inserts the BVSP merging candidate into the merge candidate list only once.
2. Otherwise (none of the five spatial neighbouring blocks are coded with the BVSP mode), the video coder may insert the BVSP merging candidate into the merge candidate list just before the temporal merging candidates.

In some examples, during the combined bi-predictive merging candidate derivation process, a video coder should check additional conditions to avoid including the BVSP merging candidate.

For each BVSP coded PU with its size denoted by N×M, a video coder may further partition the PU into several sub-regions with the size equal to K×K (wherein K may be equal to 4). For each sub-region, the video coder may derive a separate DMV, and each sub-region may be predicted from one block located by the derived DMV in the inter-view reference picture. In other words, the size of a motion-compensation unit for BVSP coded PUs may be set to K×K. In common test conditions, K is set to 4.

For each sub-region (4×4 block) within one PU coded with BVSP mode, the video coder may locate a corresponding 4×4 depth block in the reference depth view with the refined DV mentioned above. The video coder may select the maximum value of the sixteen depth pixels in the corresponding depth block. The video coder may convert the maximum value to the horizontal component of a DMV, and may set the vertical component of the DMV is set to 0.

Figure 8:
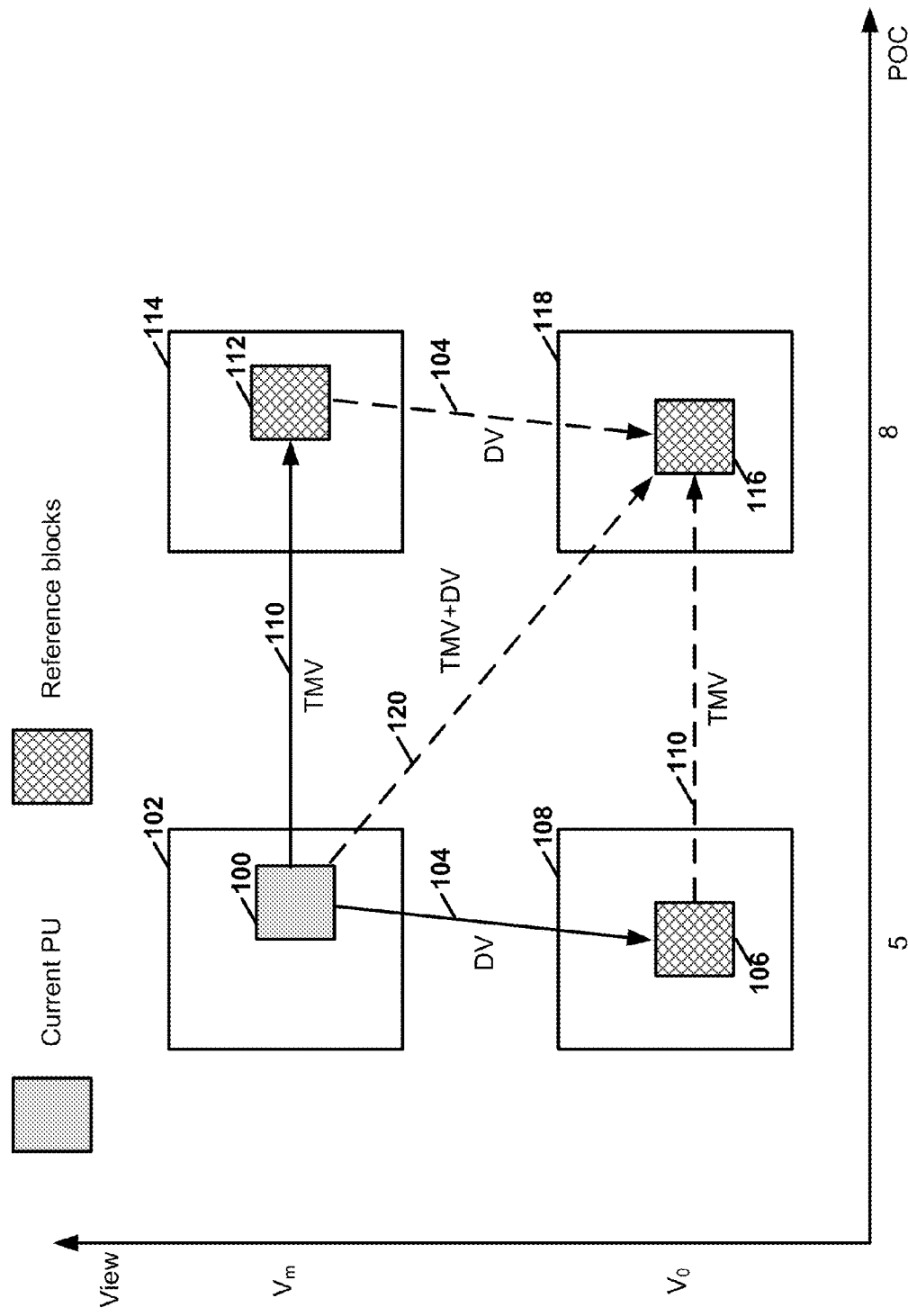
FIG. 8 is a conceptual diagram illustrating an example prediction structure for temporal Advanced Residual Prediction (ARP) of a temporally-predicted video block.

FIG. 8 is a conceptual diagram illustrating an example prediction structure for current proposals for temporal Advanced Residual Prediction (ARP) of a temporally-predicted video block. ARP applied to CUs with partition mode equal to Part_2N×2N was adopted in the 4th JCT3V meeting, as proposed in Zhang et al., "CE4: Advanced residual prediction for multiview coding," Joint Collaborative Team on Video Coding Extension Development of ITU-T SG 16 WP 3 and ISO/IEC JTC 1/SC 29/WG 11, 4th Meeting: Incheon, KR, 20-26 Apr. 2013, Doc. JCT3V-D0177 (MPEG number m29008), hereinafter "JCT3V-D0177." JCT3V-D0177 may be downloaded from the following link: htt:// phenix.it-sudoaris.eu/jet3v/doc_end_user/current_document.phv?id=862. The entire content of JCT3V-D0177 is incorporated herein by reference.

As shown in FIG. 8, the video coder invokes or identifies the following blocks in the prediction of the residual for a current video block 100 in a current picture 102 of the current, e.g., dependent, view Vm.

1. Current video block 100 (in view $V_m$): Curr
2. An inter-view reference video block 106 in an inter-view reference picture 108 of a reference/base view ($V_0$ in FIG. 8): Base. The video coder derives inter-view reference video block 106 based on DV 104 of current video block 100 (Curr). The video coder may determine DV 104 using NBDV, as described above.
3. A temporal reference video block 112 in a temporal reference picture 114 in the same view ($V_m$) as the current video block 100 (Curr): CurrTRef. The video coder derives temporal reference video block 112 based on the TMV 110 of the current video block 100. The video coder may determine TMV 100 using any of the techniques described herein.
4. A temporal reference video block 116 in a temporal reference picture 118 in the reference view, i.e., the same view as inter-view reference video block 106 (Base): BaseTRef. A video coder derives temporal reference video block 116 in the reference view using TMV 110 of current video block 100 (Curr). A vector 120 of TMV+DV may identify temporal reference video block 116 (BaseTRef) relative to current video block 100 (Curr).

When a video encoder temporally inter predicts current video block 100 based on temporal reference video block 112, which the video coder identifies using TMV 110, the video encoder determines the pixel-by-pixel differences between current video block 100 and temporal reference video block 112 as a residual block. Absent ARP, the video coder would transform, quantize, and entropy encode the residual block. A video decoder would entropy decode an encoded video bitstream, perform inverse quantization and transformation to derive the residual block, and apply the residual block to a reconstruction of reference video block 112 to reconstruct current video block 100.

Using ARP, the video coders determine a residual predictor block that predicts the values of the residual block, i.e., predicts the difference between current video block 100 (Curr) and temporal reference video block 112 (CurrTRef). A video encoder may then only need to encode a difference between the residual block and the residual predictor block, reducing the amount of information included in the encoded video bitstream for encoding current video block 100. In the temporal ARP example of FIG. 8, the predictor for the residual of current video block 100 is determined based on blocks in the reference/base view ($V_0$) that correspond to current video block 100 (Curr) and temporal reference video block 112 (CurrTRef), and are identified by DV 104. The difference between these corresponding blocks in the reference view may be a good predictor of the residual, i.e., the difference between current video block 100 (Curr) and temporal reference video block 112 (CurrTRef). In particular, the video coders identify inter-view reference video block 106 (Base) and a temporal reference video block 116 (BaseTRef) in the reference view, and determine the residual predictor block based on the difference between inter-view reference video block 106 and temporal reference video block 116 (BaseTRef−Base), wherein the subtraction operation applies to each pixel of the denoted pixel arrays. In some examples, a video coder may apply a weighting factor, w, to the residual predictor. In such examples, the final predictor of the current block, i.e., the reference block summed with the residual predictor block, may be denoted as: CurrTRef+w*(BaseTRef−Base).

Figure 9:
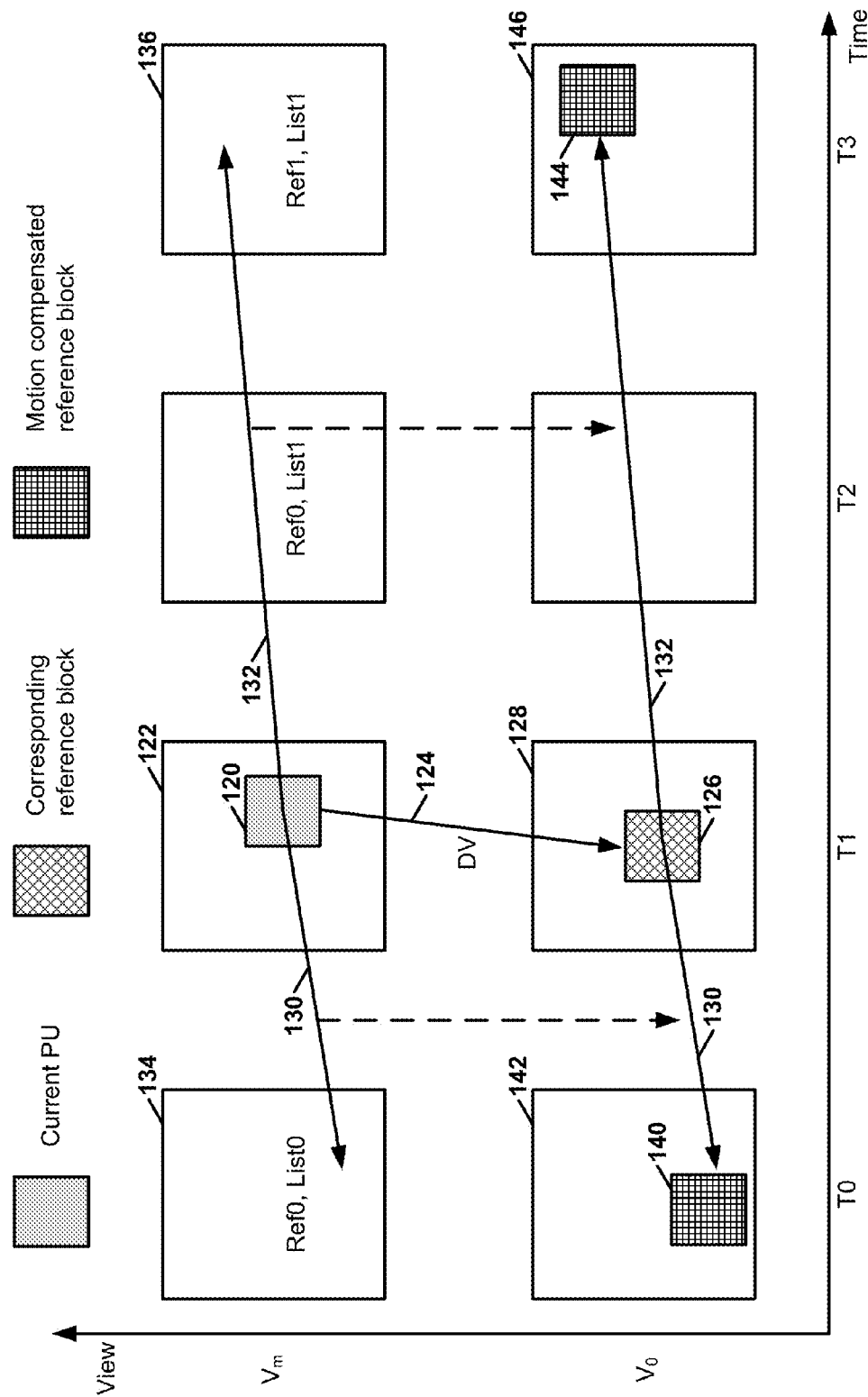
FIG. 9 is a conceptual diagram illustrating an example bi-directional prediction structure for temporal ARP.

FIG. 9 is a conceptual diagram illustrating an example bi-directional prediction structure for temporal ARP of a current video block 120 in a current view (Vm). The above descriptions and FIG. 8 illustrate uni-directional prediction.

When extending ARP to the case of bi-directional prediction, the video coder may apply the above techniques to one or both of the reference picture lists in order to identify a residual predictor block for current video block 120. In particular, the video coder may check one or both of the reference lists for current video block 100 to determine if one of them contains a TMV usable for temporal ARP. In the example illustrated by FIG. 9, current video block 120 is associated with a TMV 130 pointing to a first temporal reference picture 134 in a first reference picture list (RefPicList0), and a TMV 132 pointing to a second temporal reference picture 136 is a second reference picture list (RefPicList1).

In some examples, a video coder will check the reference picture lists according to a checking order to determine whether one of them includes a TMV usable for temporal ARP, and need not check a second list according to the checking order if a first list includes such a TMV. In some examples, a video coder will check both reference picture lists and, if both lists include a TMV, determine which TMV to use, e.g., based on an comparison of the resulting residual predictors produced using the TMVs relative to the residual of the current video block. Notably, according to current proposals for ARP, when the current block uses an inter-view reference picture (in a different view) for one reference picture list, the residual prediction process is disabled.

As illustrated in FIG. 9, the video coder may use a DV 124 identified for current video block 120, e.g., according to NBDV, to identify a corresponding inter-view reference video block 126 (Base) in an inter-view reference picture 128 that is in a different, reference view ($V_0$), but is in the same access unit as the current picture 122. The video coder may also use TMVs 130 and 132 for current video block 120 to identify the temporal reference blocks (BaseTRef) for the inter-view reference video block 126 (Base) in various temporal reference pictures of the reference view in both reference picture lists, e.g., RefPicList0 and RefPicList1. In the example of FIG. 9, the video coder identifies temporal reference video block (BaseTRef) 140 in temporal reference picture 142 in a first reference picture list, e.g., RefPicList0, and temporal reference video block (BaseTRef) 144 in temporal reference picture 146 in a second reference picture list, e.g., RefPicList1, based on TMVs 130 and 132 of the current video block 120.

The use of TMVs 130 and 132 of the current video block 120 in the reference view is illustrated by dashed arrows in FIG. 9. In FIG. 9, temporal reference video blocks 140 and 144 in the reference view are referred to as motion compensated reference blocks due to their identification based on TMVs 130 and 132. A video coder may determine a residual predictor block for current video block 120 based on a difference between temporal reference video block 140 and inter-view reference video block 126, or based on a difference between temporal reference video block 144 and inter-view reference video block 126.

The main procedures of the proposed temporal ARP at the decoder side can be described (with reference to FIG. 9) as follows:
1. A video decoder obtains a DV 124 as specified in the current 3D-HEVC, e.g., using NBDV, pointing to a target reference view ($V_0$). Then, in the picture 128 of the reference view within the same access unit, the video decoder identifies the corresponding inter-view reference video block 126 (Base) by DV 124.
2. The video decoder re-uses the motion information, e.g., TMV 130, 132, of current video block 120 to derive the motion information for corresponding inter-view reference video block 126. The video decoder may apply motion compensation for the corresponding inter-view reference video block 126 based on TMV 130, 132 of current video block 120 and derived reference picture 142, 146 in the reference view for reference video block 126, to identify a motion compensated temporal reference video block 140, 144 (BaseTRef) and determine the residual predictor block by determining BaseTRef–Base. The relationship among current block, corresponding block (Base) and motion compensated block (BaseTRef) is shown in FIGS. 8 and 9. In some examples, the reference picture in the reference view ($V_0$) which has the same POC (Picture Order Count) value as the reference picture of current view ($V_m$) is selected as the reference picture of the corresponding block.
3. The video decoder may apply a weighting factor w to the residual predictor block to get a weighted residual predictor block, and add the values of the weighted residual block to the predicted samples to reconstruct the current video block 100.

In proposals for ARP, three weighting factors may be used, i.e., 0, 0.5 and 1. The one leading to minimal rate-distortion cost for the current CU is selected as the final weighting factor, and the corresponding weighting factor index (0, 1 and 2 which correspond to weighting factor 0, 1, and 0.5, respectively) is transmitted in the bitstream at the CU level. All PU predictions in one CU share the same weighting factor. When the weighting factor is equal to 0, ARP is not used for the current CU.

Aspects of ARP for 3D-HEVC are described in Zhang et al., "3D-CE4: Advanced residual prediction for multiview coding." Joint Collaborative Team on Video Coding Extension Development of ITU-T SG 16 WP 3 and ISO/IEC JTC I/SC 29/WG 11, 3rd Meeting: Geneva, CH, 17-23 Jan. 2013. Doc. JCT3V-C0049 (MPEG number m27784), hereinafter "JCT3V-C0049." JCT3V-C0049 may be downloaded from the following link: http://phenix.int-evry.fr/jet3v/doc_en-d_user/current_document.php?id=487. The entire content of JCT3V-C0049 is incorporated herein by reference.

In JCT3V-C0049, the reference pictures of different PUs coded with non-zero weighting factors may be different from PU to PU (or current video block to current video block). Therefore, different pictures from the reference view may need to be accessed to generate the motion-compensated block (BaseTRef), e.g., temporal reference video blocks 116, 140 and 144 in FIGS. 8 and 9, of the corresponding inter-view reference video block in the reference view (Base), e.g., inter-view reference video blocks 106 and 126 in FIGS. 8 and 9.

Further simplification of ARP through reference picture selection via motion vector scaling was proposed in JCT3V-D0177. For example, it was proposed that a video coder scale the motion vectors of the current PU towards a fixed picture before performing motion compensation for the residual generation process when the weighting factor is unequal to 0. In JCT3V-D0177, the fixed picture is defined as the first reference picture of each reference picture list if it is from the same view. When the decoded motion vector does not point to the fixed picture, it is firstly scaled by the video coder, and then used by the video coder to identify CurrTRef and BaseTRef for the current video block. Such a reference picture used for ARP may be referred to as a target ARP reference picture. There may be two target ARP reference pictures, corresponding to RefPicList0 and RefPicList1, respectively, which may be denoted as the L0 target ARP reference picture and L1 target ARP reference picture, respectively.

According to JCT3V-C0049, a video coder applies a bi-linear filter during an interpolation process of the corresponding block (Base) and its prediction block (BaseTRef), but applies a conventional 8/4-tap filter for an interpolation process of the current video block (Curr), e.g., PU, and the prediction block (CurrTRef) of the current video block. It was proposed in JCT3V-D0177 that video coder always employ bi-linear filters for such interpolation processes regardless of whether the block is in base view or non-base view when ARP is applied.

Additionally, according to existing proposals for ARP, the reference view for ARP is identified by the view order index returned from the NBDV process. As described above, a video coder may use the NBDV process determine the DV, e.g., DV 104 or 124, used to identify the corresponding inter-view reference video block (Base), e.g., inter-view reference video blocks 106 and 126 in FIGS. 8 and 9. According to existing proposals for ARP, when the reference picture of one video block (PU) in one reference picture list is from a different view then the target reference view for ARP, as identified by the view order index returned from the NBDV process, ARP is disabled for this reference picture list.

There may be problems associated with the existing proposals for ARP in 3D-HEVC. For example, according to existing proposals, ARP only predicts the residual generated from temporal prediction, when the current motion vector of a current video block refers to a reference picture in the same view. Therefore, when the current motion vector of a current video block refers to an inter-view reference picture, ARP is not applicable, although the syntax element(s) related to ARP are still transmitted.

As another example, a derived DV, e.g., as derived according to an NBDV process, may be less accurate as compared to explicit DMVs, which are typically chosen by rate distortion optimization (RDO). Additionally, as a decoding process, motion prediction, including inter-view prediction, happens after DV generation, and ARP happens after the motion prediction. Therefore more accurate TMVs or DMVs that could be used to identify different blocks which are not considered in current ARP are available when ARP is performed by a video coder. Nevertheless, as described above with reference to FIGS. 8 and 9, existing proposals for temporal ARP use the DV derived through NBDV to identify the corresponding inter-view reference video block.

This disclosure provides techniques that may address problems associated with existing proposals for ARP, including those discussed above, and may thereby improve the coding efficiency of ARP. For example, a video coder, e.g., video encoder 20 and/or video decoder 30, implementing the techniques of this disclosure to code a current video block using ARP, may identify a DMV from a current view of the current video block to a reference view, and determine a residual predictor block for the current video block based on the identification of the DMV. In some examples, the DMV is a DMV used for inter-view prediction of the current video block, and the video coder may perform inter-view ARP for encoding the current video block. In other examples, the DMV is a DMV of a temporal reference video block in the same view as the current video block. In such examples, the DMV may be used in temporal ARP for the current video block in place of the DV derived by NBDV for the current video block.

Figure 10:
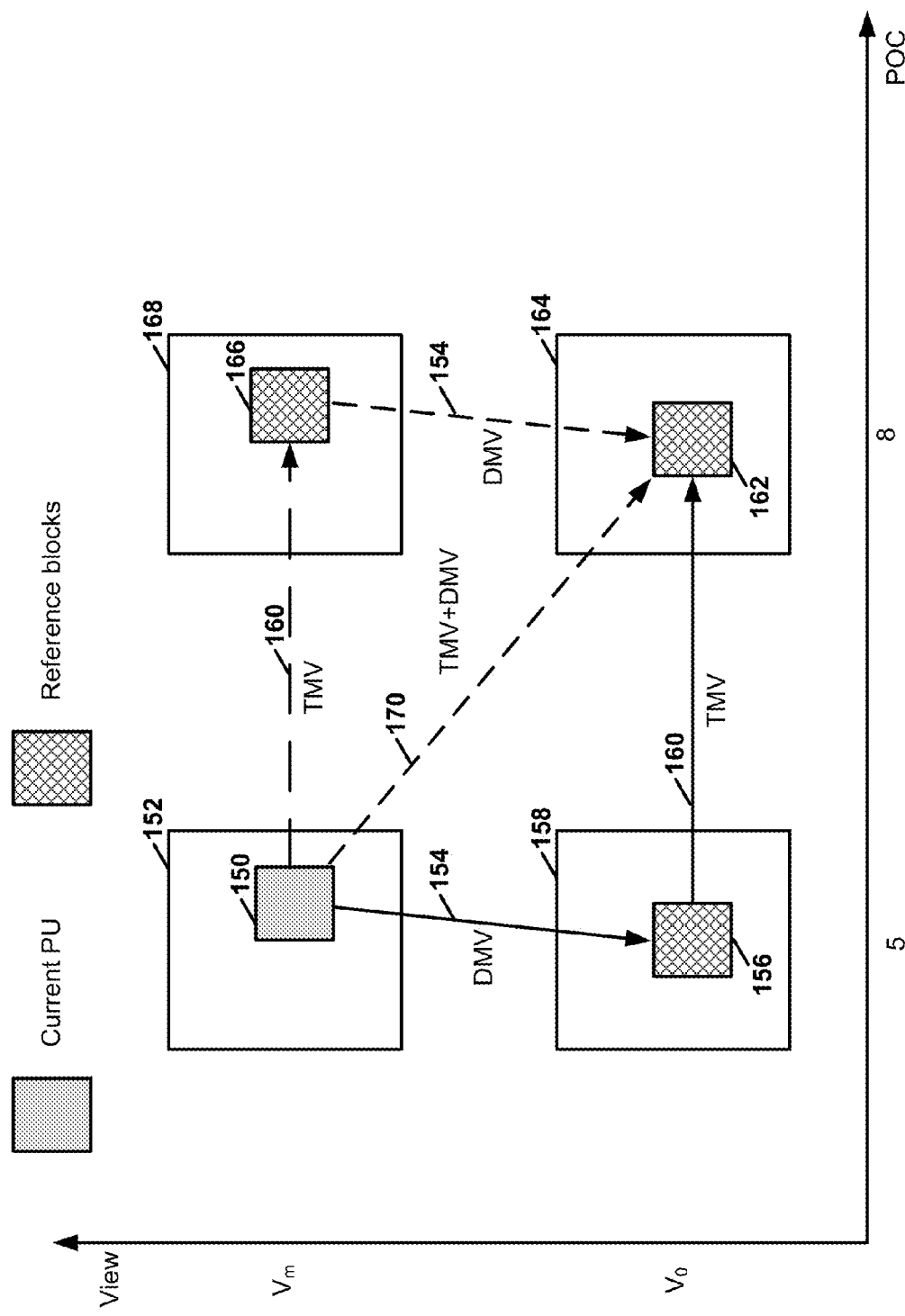
FIG. 10 is a conceptual diagram an example prediction structure for inter-view ARP of an inter-view predicted video block according to the techniques described in this disclosure.

FIG. 10 is a conceptual diagram an example prediction structure for inter-view ARP of an inter-view predicted video block according to the techniques described in this disclosure. According to the example technique illustrated in FIG. 10, a video coder, e.g., video encoder 20 and/or video decoder 30, may use an inter-view residual calculated in a different access unit to predict the residual of the current block, which is inter-view predicted. In contrast to proposals for ARP in which ARP is not performed when the motion vector of the current block is a DMV, and is only performed when the motion vector for the current video block is a TMV, the example technique of FIG. 10 uses the DMV to perform ARP.

In particular, the example technique of FIG. 10 may be performed by a video coder, e.g., video encoder 20 or video decoder 30, when the motion vector of the current video block 150 (Curr) in a current picture 152 is a DMV 154, and the inter-view reference video block 156 (Base) in an inter-view reference picture 158 in the reference view (V0) contains at least one TMV 160. In some examples, DMV 154 may be a DV that was converted to a DMV to act as an IDMVC for motion information prediction of current video block 150.

The video coder identifies the inter-view reference video block 156 (Base) in the inter-view reference picture 158 using the DMV 154 for current video block 150. The video coder uses a TMV 160 and associated reference picture, e.g., a temporal reference picture 164 in the reference view ($V_0$), of inter-view reference video block 156 together with the DMV to identify a temporal reference video block 162 (BaseTRef) in temporal reference picture 164 in the reference view ($V_0$). The identification of temporal reference video block 162 (BaseTRef) based on TMV 160 and DMV 154 is represented by dashed vector 170 (TMV+DMV). The video coder also uses TMV 160 to identify a temporal reference block 166 (CurrTRef) in a temporal reference picture 168 in the current view ($V_m$). Temporal reference video block 162 (BaseTRef) in the reference view ($V_0$) and temporal reference video block 166 (CurrTRef) in the current view ($V_m$) may be within the same access unit, i.e., temporal reference picture 164 in the reference view ($V_0$) and temporal reference picture 168 in the current view ($V_m$) may be in the same access unit.

The video coder, e.g., video encoder 20 and/or video decoder 30, may then calculate the inter-view residual predictor block in a different access unit from current video block 150 based on the pixel-by-pixel difference between these two latter blocks, i.e., the difference between temporal reference video block 166 in the current view and temporal reference video block 164 in the reference view, or CurrTRef−BaseTRef. The difference signal, denoted as the inter-view residual predictor, can be used to predict the residual of current video block 150. The prediction signal of current video block 150 may be the sum of the inter-view predictor, i.e., the inter-view reference video block 156 (Base), and the predicted inter-view residual in a different access unit determined based on the difference between temporal reference video block 166 in the current view and temporal reference video block 164 in the reference view. In some examples, a weighting factor w is applied to the predicted inter-view residual in the different access unit. In such examples, the prediction signal of current video block 150 may be: Base+w*(CurrTRef−BaseTRef).

In some examples, the video coder may determine a target reference picture in a target access unit for inter-view ARP, e.g., similar to the determination of a target reference picture for temporal ARP, as discussed above. In some examples, as discussed above with reference to JCT3V-D0177, the target reference picture for each reference picture list is the first reference picture in the reference picture list. In other examples, the target reference picture, e.g., target POC, for one or both reference picture lists may be signaled from video encoder 20 to video decoder 30, e.g., on a PU, CU, slice, picture, or other basis. In other examples, the target reference picture for each reference picture list is the temporal reference picture in the reference picture list which has the smallest POC difference compared to current block and smaller reference picture index. In other examples, the target reference picture for two reference picture lists is the same.

If the picture containing the temporal reference video block in the reference view indicated by TMV 160 is in a different access unit (time instance) then the target ARP reference picture, the video coder may scale TMV 160 to the target reference picture, e.g., target reference picture 164, to identify temporal reference video block 162 (BaseTRef) in the reference view for inter-view ARP. In such examples, the video coder locates temporal reference video block 162 in the access unit containing the target ARP reference picture. The video coder may scale TMV 160 by POC scaling. In addition, the scaled TMV is used to identify the temporal reference video block (CurrTRef) 166 in current view which is located in the target ARP reference picture.

In some examples, the video coder scales TMV 160 to the LX (X being 0 or 1) target reference picture, where LX corresponds to the RefPicListX of the PU that includes the TMV. In some examples, the video coder may scale TMVs from either or both of RefPicList0 or RefPicList 1 to the L0 or L1 target reference picture, respectively. In some examples, the video coder scales TMV 160 to the LX target reference picture, wherein X satisfies the condition that DMV 154 of current video block 150. e.g., the current PU, corresponds to RefPicListX.

Similarly, in some examples, the video coder scales DMV 154 to a target reference view for ARP prior to identifying inter-view reference video block 156 in reference picture 158 in the target reference view. The video coder may scale DMV 154 by view order difference scaling. The target reference view may be predetermined and known by video encoder 20 and video decoder 30, or may be signaled from video encoder 20 to video decoder 30, e.g. on a PU, CU, slice, picture, or other basis.

In some examples of inter-view ARP, the video coder, e.g., video encoder 20 and/or video decoder 30, may derive the prediction signal for current block 150 using the same prediction structure and identified reference video blocks 156, 164 and 168 illustrated in FIG. 10, but determine the residual predictor block based on the difference between the reference blocks 156 and 162 in the reference view, rather than the reference blocks 162 and 166 in the different access unit. In such examples, the video coder may apply a weighting factor to other sample arrays, e.g., the difference between the reference blocks 156 and 162 in the reference view, and accordingly derive the prediction signal for current video block 150 as follows: CurrTRef+w*(Base−BaseTRef). In some examples of inter-view ARP, the video coder may use various interpolation filters, including bilinear filters, to derive reference video blocks 156, 162 and 166 if they are aligned with fractional pixel positions.

Although FIG. 10 illustrates inter-view ARP examples in which the temporal reference video blocks in the current and reference views are identified using the TMV and associated reference picture of the inter-view reference video block, in other examples other TMVs and associated reference pictures may be used to identify the temporal reference video blocks in the current and reference views. For example, if the DMV of the current video block is from a first reference picture list (e.g., RefPicList0 or RefPicList1) of the current video block, a video coder may use a TMV and associated reference picture from a second reference picture list (e.g., the other of RefPicList0 or RefPicList1) of the current video block. In such examples, the video coder may identify the temporal reference video block in the current view in the reference picture associated with the TMV, or scale the TMV to a target access unit and target reference picture for ARP to identify the temporal reference video block in the current view. In such examples, the video coder may identify the temporal reference video block in the reference view in a reference picture that is in the same access unit as the reference picture in which the temporal reference video block in the current view was located. In other examples, rather than the TMV of the inter-view reference video block or the TMV of the other reference picture list of the current video block, a video coder may similarly use a TMV and associated reference picture derived from the motion information of spatial or temporal neighboring video blocks of the current video block to identify the temporal reference video blocks in the current and reference views for ARP.

FIG. 10 illustrated an example of inter-view ARP according to the present disclosure. As discussed above, according to existing proposals for temporal ARP, a DV of the current video block, e.g., derived by NBDV, is used to identify the inter-view reference video block in the reference view. According to the techniques of this disclosure, the accuracy of the temporal residual predictor calculated in a reference view for temporal ARP may be increased by replacing the DV with a DMV of the temporal reference block in the current view (CurrTRef) if it contains at least one DMV.

Figure 11:
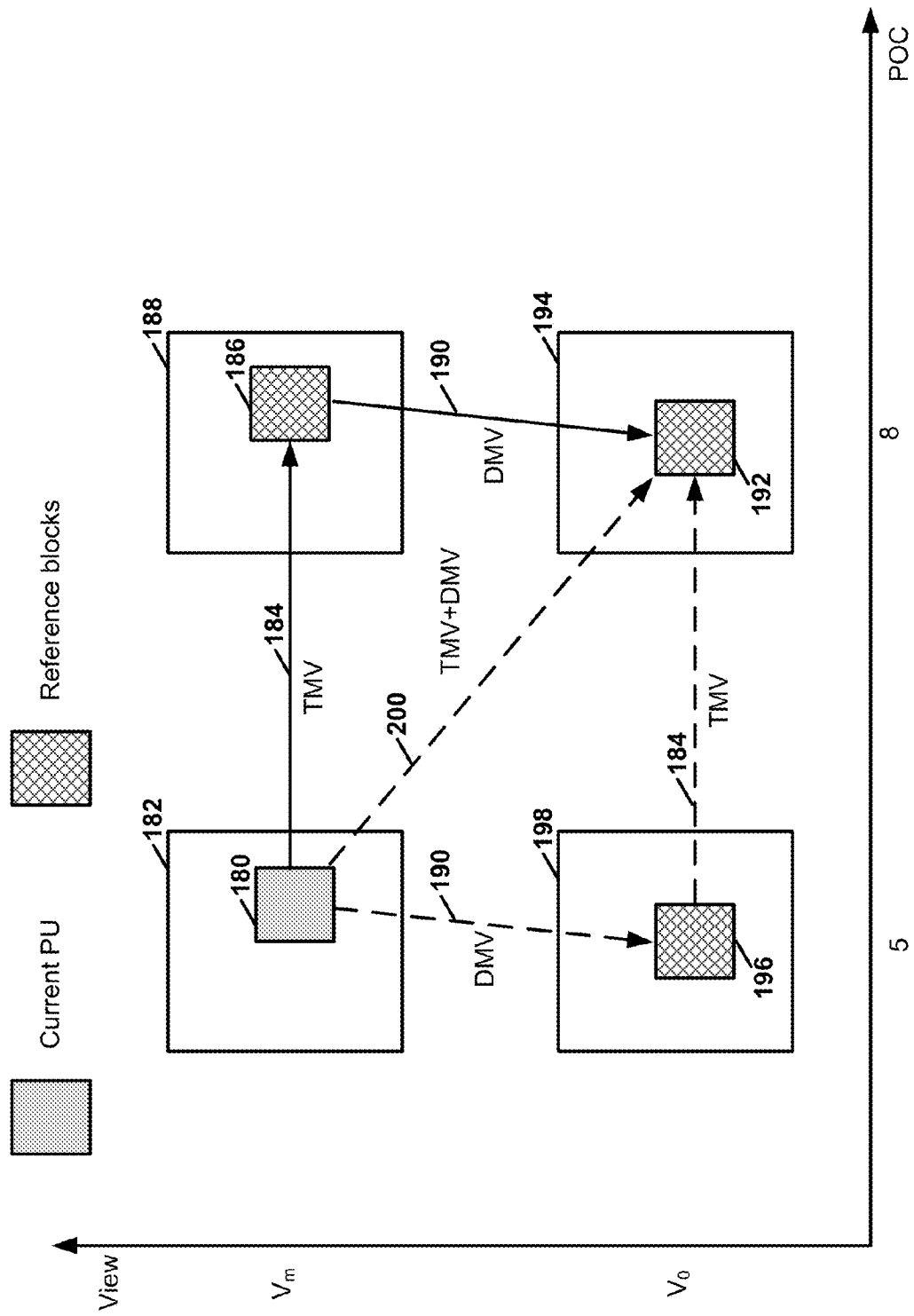
FIG. 11 is a conceptual diagram an example prediction structure for temporal ARP of a temporally-predicted video block using a disparity motion vector (DMV) according to the techniques described in this disclosure.

FIG. 11 is a conceptual diagram an example prediction structure for temporal ARP of a temporally-predicted current video block 180 in a current picture 182 using a DMV 190 of the temporal reference block in the current view (CurrTRef) according to the techniques described in this disclosure. According to the example of FIG. 11, a video coder, e.g., video encoder 20 and/or video decoder 30 temporally-predicts current video block 180 using a TMV 184 that identifies a temporal reference video block 186 in a temporal reference picture 188. The video coder determines whether temporal reference video block 186 contains at least one DMV, e.g., DMV 190, used to inter-view predict temporal reference video block 186. In some examples, DMV 190 may be an IDMVC used for motion information prediction of temporal reference video block 186.

The video coder may use DMV 190 instead of a DV of current video block 180 for identification of any one or both of: an inter-view reference video block 196 (Base) within a reference picture 198 in the reference view (V0), or a temporal reference video block 194 (BaseTRef) in temporal reference picture 194 in the reference view (V0). The identification of temporal reference video block 194 based on TMV 184 and DMV 190 is illustrated by vector 200, which is labeled TMV+DMV. In some examples, when the video coder uses a DMV to replace the DV from NBDV for temporal ARP, the video coder may also replace the view order index returned from the NBDV process with a view order index associated with the selected DMV. Additionally, in some examples, a video coder may not select a DMV associated with temporal reference video block 186 for temporal ARP of current video block 180 if the DMV derived using BVSP mode to replace the DV from NBDV. The video coder may determine the temporal residual predictor block for current video block 180 using the identified reference video blocks 186, 192 and 196, as described above with reference to blocks 106, 112 and 116 in FIG. 8.

In some examples, if the decoded TMV 184 of current video block 180 points to a reference picture in a different access unit (time instance) then the target ARP reference picture, the video coder may scale TMV 184 to the target ARP reference picture 188, and locate temporal reference video block 186 (CurrTRef) in the target ARP reference picture by scaled TMV 184, e.g., using POC scaling. In such examples, the video coder may derive DMV 190 in temporal reference video block 186 (CurrTRef) as identified by scaled TMV 184. In some examples, when the video coder scales TMV 184 to identify temporal reference video block 186 (CurrTRef) in picture 188 belonging to the same access unit as that of the target ARP picture, another temporal reference video block identified by TMV 184 without scaling, namely CurrTempRef, may be identified. In such examples, the video coder may use a DMV from this temporal reference video block (CurrTempRef), if available, to replace the DV for temporal ARP of current video block 180. In some examples, the video coder only identifies and uses CurrTempRef is when there is no DMV associated with temporal reference video block 186 (CurrTRef). In some examples, other DMVs of coded blocks may be used to replace the DV from NBDV.

Figure 12:
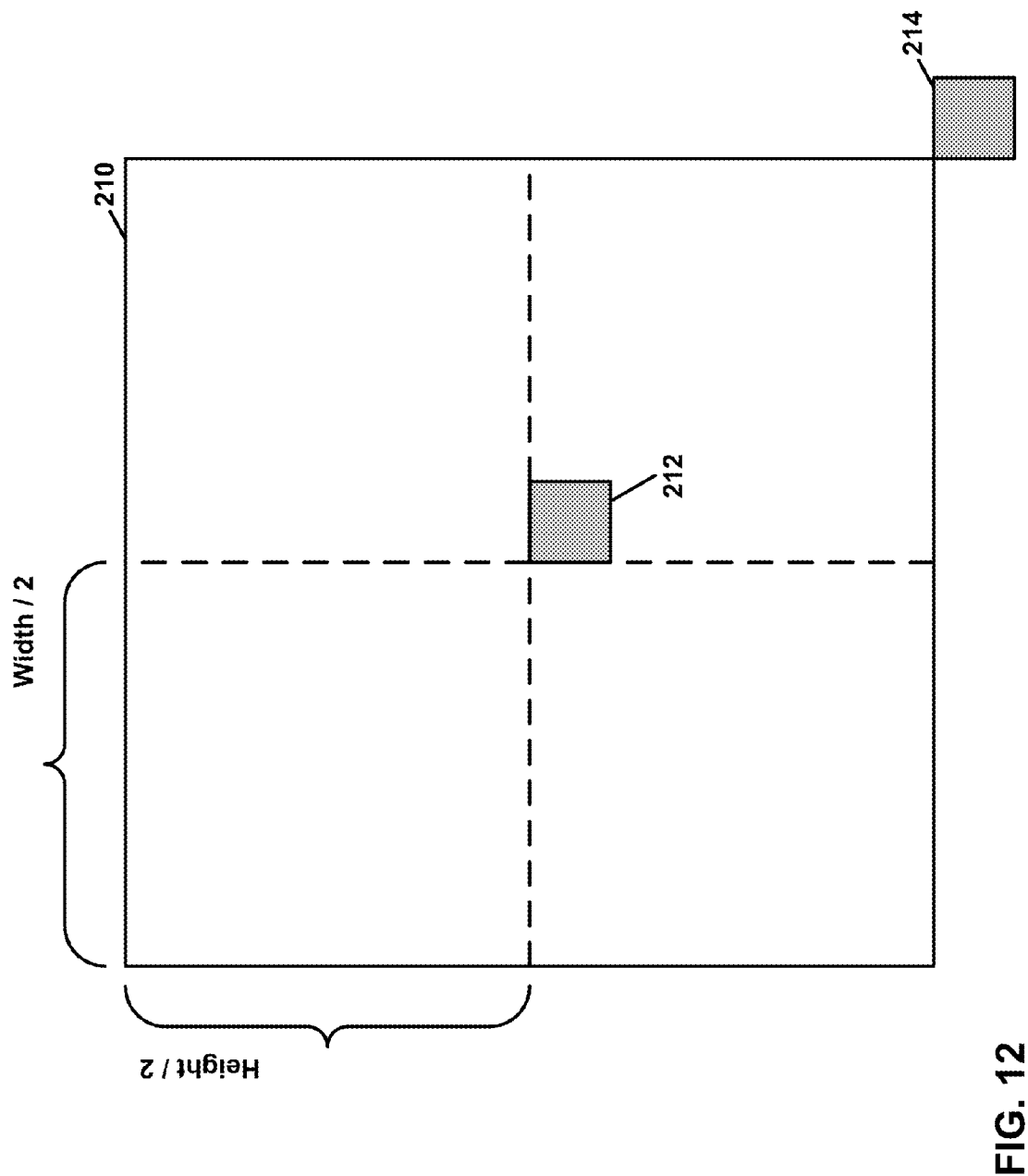
FIG. 12 is a conceptual diagram illustrating example techniques for identification of a temporal motion vector (TMV) or DMV in or adjacent a video block according to the techniques described in this disclosure.
Figures 13A, 13B, 13C, 13D:
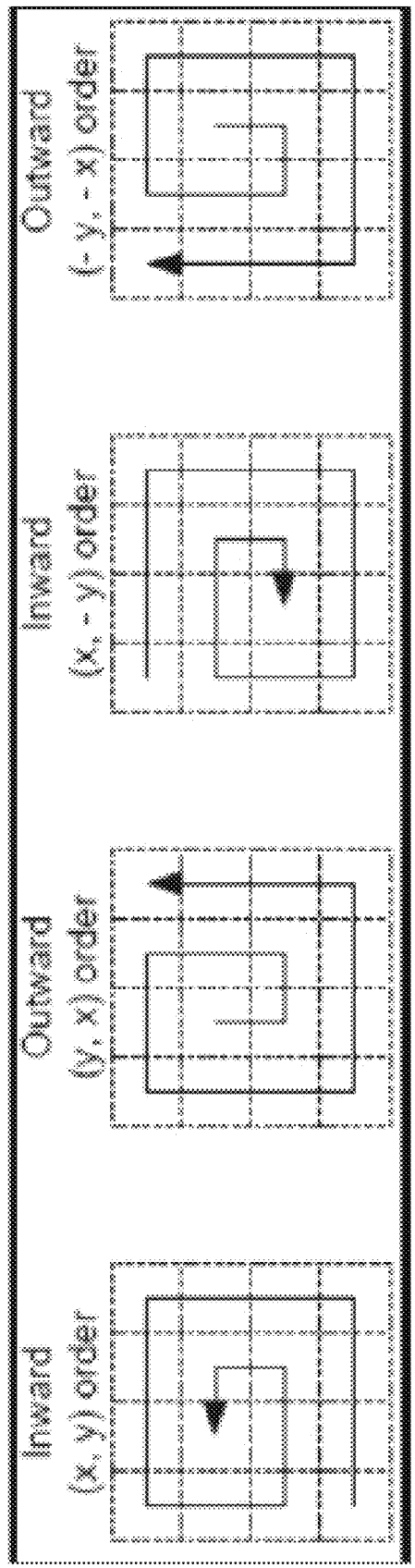
FIGS. 13A-13D are conceptual diagrams illustrating example scan orders for identifying TMVs or DMVs according to the techniques of this disclosure.

FIG. 12 is a conceptual diagram illustrating example techniques for identification of a TMV or DMV in or adjacent a video block according to the techniques described in this disclosure. As discussed above with respect to FIGS. 10 and 11, a video coder, e.g., video encoder 20 and/or video decoder 30, identifies TMVs and DMVs to implement inter-view ARP and temporal ARP according to the techniques described in this disclosure. In some examples, the video coder identifies the TMVs and DMVs in or adjacent to a current video block, or an inter-view or temporal reference video block, which may be a region within a reference picture with the same size as the current video block, e.g., current PU, of width×height.

FIG. 12 illustrates a block 210 of width×height. Block 210 may be a current video block, or an inter-view or temporal reference video block, which may be a region within a reference picture with the same size as the current video block. FIG. 12 also illustrates a block 212 adjacent or including the center position of block 210, and a block 214 adjacent or including a bottom-right position of block 210.

In some examples, for temporal or inter-view ARP, the video coder considers, e.g., only considers, the motion vector, e.g., TMV or DMV and the associated reference index associated with a PU or other block containing the center position of the block, e.g., block 212 within block 210. In some examples, the video coder considers, e.g., only considers, the motion information (including motion vectors and reference indices) of two blocks containing the bottom-right (with coordination relative to the top-left corner pixel of (width, height)), and center (with a coordination relative to the top-left corner of (width/2, height/2)) pixels of block 210. With reference to FIG. 12, blocks 214 and 212, respectively, may be examples of blocks containing the bottom-right and center pixels of block 210. Blocks 212 and 214 may be N×N, which may be the largest block granularity that can contain up to one motion vector corresponding to each reference picture list, e.g., N×N can be 4×4. Blocks 212 and 214 may be checked for the DMV or TMV for ARP in any order.

In some examples, assuming that the current video block, e.g., current PU, has a coordinate of (x,y) and the vector used to identify the reference video block (v[0], v[1]) is from a motion vector (TMV or DMV), the video coder may convert the DMV as v[i]=(mv[i]+2)>>2, for i equal to 0 or 1 respectively, or v[i]=mv[i]>>2. In such examples, the video coder may identify blocks 212 and 214 respectively as the block, e.g., 4×4 block, covering the pixel with coordination of (x+v[0]+width/2, y+v[1]+height/2) and the block covering the pixel with coordination (x+v[0]+width, y+v[1]+height). In some examples, the video coder may identify one or both of the center block 212 and bottom-right block 214 by coordination shifted with (−1, −1), which corresponds to (x+v[0]+width/2−1, y+v[1]+height/2−1) and (x+v[0]+width−1, y+v[1]+height−1) respectively.

In some examples, the video coder may check blocks 212 and 214 for an available TMV or DMV according to a checking order. In some examples, the video coder may check the center block 212 first, and use the DMV or TMV associated with the center block for ARP, if such a motion vector is available. In such examples, the video coder may check bottom-right block 214 for a TMV or DMV for ARP if such a motion vector was not available from center block 212.

In some examples, the video coder may check the reference picture lists for blocks 212, 214 for an appropriate motion vector for ARP in a checking order. For example, the video coder may check RefPicList0, and use the DMV or TMV associated with RefPicList0, if such a motion vector is available. In such examples, the video coder may check RefPicList1 for a TMV or DMV for ARP if such a motion vector was not available from RefPicList0.

In some examples, the video coder may consider, e.g., only consider, the motion vectors associated with the PUs containing the center and one or more of the four corner positions of the block. The video coder may consider the PUs in an order based on a priority and, once a motion vector is found, may not consider the other PUs. The priority of these different positions may be, in one example, defined as: center, top-left, top-right, bottom-left and bottom-right of the block.

In some examples, the video coder may be configured to consider all the motion information associated with the block. In some examples, the video coder may not check additional motion vectors once a TMV or DMV for ARP is found within block 210. A priority for checking PUs within block 210 for motion vectors may be, for example, raster scan order or spiral scan. Examples of spiral scan orders for scanning a block, e.g., a 4×4 block, for motion vectors are depicted in FIGS. 13A-13D.

In some examples, when checking a block 210 for a TMV for ARP, a video coder may only consider TMVs pointing to a reference picture in the same access unit as the target ARP reference picture. In some examples, when checking a reference block 210 for a DMV for ARP, a video coder may only consider DMVs pointing to an inter-view reference picture in a same view as that indicated by the DMV or DV for the current video block. In some examples, the video coder first extends block 210 to a block associated with a PU, and looks for a TMV or a DMV within the extended block to be the TMV or DMV for ARP. In some examples, if no TMV or DMV is found in block 210, the video coder performs ARP using a zero motion vector, or does not perform ARP. In some examples, when a video coder uses a zero motion vector to identify the two temporal reference video blocks in current and reference view, the video coder may use the target reference picture for RefPicListX, wherein X may be 0 or 1 and indicates which list was invoked for inter-view prediction, e.g., which list included the DMV.

As discussed above, e.g., with reference to FIG. 12, a video coder may identify a TMV or a DMV in a given block containing only up to two sets of motion information, e.g., a 4×4 block within block 210. One set of motion information corresponds to a first reference picture list, e.g., Reference Picture List 0 (RefPicList0) for the given block, and the other corresponds to a second reference picture list, e.g., Reference Picture List 1 (RefPicList1) for the given block. Each set of motion information includes a motion vector and a reference index.

In some examples, a video coder only considers the motion information corresponding to RefPicList0 for identifying a TMV or DMV for ARP of a current video block. In other examples, a video coder only considers the motion information corresponding to RefPicList1 for identifying a TMV or DMV for ARP of a current video block. In other examples, the video coder considers the motion information corresponding to RefPicListX first. If the motion information corresponding to RefPicListX does not include a suitable TMV or DMV for ARP, the video coder considers the motion information corresponding to RefPicListY (with Y equal to 1−X).

In some examples, X is equal to 0. In some examples, X is equal to 1. In some examples, X is equal to Z, wherein the Z corresponds to the reference picture list in which the motion vector (TMV or DMV) of the current video block was included. For example, if the motion vector belonging to the current video block, e.g., current PU, is corresponding to RefPicList0, Z is 0. If the motion vector belonging to the current video block, e.g., current PU, is corresponding to RefPicList1, Z is 1. In some examples, the video coder only the motion information corresponding to RefPicListZ.

Another example technique for improving the accuracy of temporal ARP, e.g., the accuracy of the temporal residual calculated in a reference view, by replacing the DV of the current video block includes replacing the DV. e.g., derived by NBDV, with a DV derived through a co-located depth block of a temporal reference block of the current block (CurrTRef). A video coder, e.g., video encoder 20 and/or video decoder 30 may derive the DV through a co-located depth block of a temporal reference block of the current block (CurrTRef) using techniques similar to or the same as those used to derive a DV for a current video block for BVSP, as described above with respect to FIG. 7.

The video coder may use the DV derived through the co-located depth block of the temporal reference block of the current block (CurrTRef) instead of the DV of the current, e.g., derived by NBDV, for the derivation of any one or both of the reference blocks in the reference view used for ARP. For example, the video coder may use the DV derived through the co-located depth block of the temporal reference block of the current block (CurrTRef) to identify one or both of the inter-view reference block of the current block in the reference view (Base), or the temporal reference block in the reference view (BaseTRef). The video coder may identify the temporal reference block in the reference view (BaseTRef) by adding the TMV of current block to the DV derived through the co-located depth block of the temporal reference block of the current block (CurrTRef).

As discussed above, in some examples, if the decoded TMV of current block points to a reference picture in a different access unit (time instance) than the target ARP reference picture, the video coder may scale the TMV to the target ARP reference picture, and locate CurrTRef by the scaled TMV. In such examples, the video coder derives the DV from the co-located depth block of the temporal reference block of the current block (CurrTRef) as identified by the scaled TMV. Additionally, as discussed above, in some examples when a TMV is scaled to identify the CurrTRef in a picture belonging to the same access unit as that of the target ARP picture, the video coder may identify another temporal reference block identified by the TMV without scaling, namely CurrTempRef, may be identified, and a DV derived from the co-located depth block of CurrTempRef, if available maybe used to replace the DV. In some examples, the video coder need only identify and use CurrTempRef when it is unable to derive a through a co-located depth block of a temporal reference block of the current block (CurrTRef).

The video coder, e.g., video encoder 20 and/or video decoder 30, may derive a DV from the co-located depth block of the temporal reference block of the current block (CurrTRef) in any of a variety of ways. In some examples, the video coder uses only one sample within the co-located depth block directly, and converts the associated depth value to the DV for temporal ARP. In some examples, the single sample of the co-located depth block used to derive the DV for temporal ARP is the pixel located at the center of the co-located depth block, e.g., at (W/2, H/2) relative to the top-left sample of one depth block with a size of W×H.

In some examples, the video coder uses several selective samples within the co-located depth block to determine one representative depth value, e.g., via a mathematic function. In one example, the video coder selects four corner depth samples. In another example, the video coder selects the depth samples within the co-located depth block based on the neighboring depth samples of the depth block. For example, when neighboring depth samples show a horizontal edge, the video coder may select only the two corner pixels at the first row. In some examples, all the depth samples within the co-located depth block may be used to determine one representative depth value via a mathematic function. In some examples, the video coder may determine a representative depth value based on selected (or all) depth values from the co-located depth block by, for example, determining a maximum, average, or median of the selected depth values, or applying some other function to the selected depth values.

In some examples, a video coder may apply the above-described temporal ARP techniques involving the DV derived through the co-located depth block of the temporal reference block of the current block (CurrTRef) when decoding of a texture view independent of the associated depth view is not required. When decoding of a texture view independent of the associated depth view is required, a video coder may apply other ARP techniques described herein, such as those described with respect to FIGS. 10 and 11.

When both temporal and inter-view ARP are enabled, the weighting factor signaling condition for ARP may be changed from checking if all reference pictures are inter-view reference pictures to simply checking if the current picture is a random access picture (IRAP, with a NAL unit type from 15 through 22, inclusive: i.e. BLA_W_LP, BLA_W_RADL, BLA_N_LP, IDR_W_RADL, IDR_N_LP, or CRA_NUT). Therefore, in some examples, a video encoder, e.g., video encoder 20, signals the weighting factor if the current CU is an inter-coded CU which does not belong to an IRAP picture. In such examples, when a picture is a random access picture, the video encoder never transmits the weighting factor. In other examples, video encoder 20 additionally signals the weighting factor is for inter-coded CUs belonging to an IRAP picture, if at least one of its reference pictures (which can only be inter-view reference picture) has an inter-view reference picture in any of its reference picture lists. In such examples, the video coders may perform ARP of the inter-view residual prediction for pictures within the access unit.

For examples in which a video encoder. e.g., video encoder 20, signals the weighting factor if the current CU is an inter-coded CU which does not belong to an IRAP picture, the syntax table of coding_unit is changed, as highlighted below. Additions relative to 3D-HEVC Test Model 4 are underlined, and deletions are shown with the text removed quoted and within brackets as follows [REMOVED: "the text removed"].

| coding_unit( x0, y0, log2CbSize , ctDepth) { | Descriptor |
|---|---|
|   if( transquant_bypass_enable_flag ) { | |
|     cu_transquant_bypass_flag | ae(v) |
|   } | |
|   if( slice_type != I ) | |

| coding_unit( x0, y0, log2CbSize , ctDepth) { | Descriptor |
|---|---|
|   skip_flag[ x0 ][ y0 ] | ae(v) |
|   if( skip_flag[ x0 ][ y0 ] ) { | |
|     prediction_unit( x0, y0, log2CbSize ) | |
|     if ( iv_res_pred_flag && [REMOVED: "TempRefPicInListsFlag"] <br>( nal_unit_type > = BLA_W_LP && nal_unit_type < = <u>RSV_IRAP_VCL23</u> ) ) | |
|       iv_res_pred_weight_idx | ae(v) |
|     if ( icEnableFlag ) | |
|       ic_flag | ae(v) |
|   } | |
|   else { | |
|   nCbS = ( 1 << log2CbSize ) | |
|   if( slice_type != I ) | |
|     pred_mode_flag | ae(v) |
|   if( ( PredMode[ x0 ][ y0 ] ! = MODE_INTRA \|\| log2CbSize = = Log2MinCbSize ) && <br>    !predPartModeFlag) | |
|     part_mode | ae(v) |
|   if( PredMode[ x0 ][ y0 ] = = MODE_INTRA ) { | |
|     if( PartMode = = PART_2N×2N && pcm_enabled_flag && <br>    log2CbSize >= Log2MinIPCMCUSize && <br>    log2CbSize <= Log2MaxIPCMCUSize ) | |
|     pcm_flag | ae(v) |
|   if( pcm_flag ) { | |
|     num_subsequent_pcm | tu(3) |
|     NumPCMBlock = num_subsequent_pcm + 1 | |
|     while( !byte_aligned( ) ) | |
|       pcm_alignment_zero_bit | f(1) |
|     pcm_sample( x0, y0, log2CbSize) | |
|   } else { | |
|     pbOffset = ( PartMode = = PART_N×N ) ? ( nCbS / 2 ) : 0 | |
|     log2PbSize = log2CbSize − ( PartMode = = PART_N×N ? 1 : 0 ) | |
|     for( j = 0; j <= pbOffset; j = j + pbOffset ) | |
|       for( i = 0; i <= pbOffset; i = i + pbOffset ) { | |
|         if( vps_depth_modes_flag[ nuh_layer_id ] ) | |
|           depth_mode_parameters( x0 + i , y0+ j ) | |
|         if( depth_intra_mode[ x0 + i ][y0 + j ] = = INTRA_DEP_NONE ) | |
|           prev_intra_luma_pred_flag[ x0 + i ][ y0+ j ] | ae(v) |
|       } | |
|     for( j = 0; j <= pbOffset; j = j + pbOffset ) | |
|       for( i = 0; i <= pbOffset; i = i + pbOffset ) { | |
|         if( depth_intra_mode[ x0 + i ][ y0 + j ] = = INTRA_DEP_NONE) | |
| { | |
|         if( prev_intra_luma_pred_flag[ x0 + i ][ y0+ j ] ) | |
|           mpm_idx[ x0 + i ][ y0+ j ] | ae(v) |
|         else | |
|           rem_intra_luma_pred_mode[ x0 + i ][ y0+ j ] | ae(v) |
|       } | |
|     } | |
|     if ( !SdcFlag[ x0 ][ y0 ] ) | |
|       intra_chroma_pred_mode[ x0 ][ y0 ] | ae(v) |
|   } | |
|   } else { | |
|     if( PartMode = = PART_2N×2N ) { | |
|       if( iv_res_pred_flag && ( nal_unit_type > = BLA_W_LP && <br><u>nal_unit_type < = RSV_TRAP_VCL23</u> )) | |
|         iv_res_pred_weight_idx | ae(v) |
|       prediction_unit( x0, y0, nCbS, nCbS ) | |
|     } else if( PartMode = = PART_2N×N ) { | |
| ... | |
| } | |

In addition, the variable TempRefPicInListsFlag and related derivation process of TempRefPicInListsFlag is removed as shown below:

H.8.3.7 Derivation Process for the Alternative Target Reference Index for TMVP in Merge Mode This process is invoked when the current slice is a P or B slice.

The variables AltRefIdxL0 and AltRefIdxL1 are set equal to −1 [REMOVED: ", TempRefPicInListsFlag is set equal to 0"] and the following applies for X in the range of 0 to 1, inclusive:

When X is equal to 0 or the current slice is a B slice the following applies: zeroIdxLtFlag=RefPicListX[0] is a short-term reference picture ?0:1 for (i=1; i<=num_ref_idx_lX_active_minus1 && AltRefIdxLX==−1; i++)

if ((zeroIdxLtFlag && RefPicListX[i] is a short-term reference picture)||

(!zeroIdxLtFlag && RefPicListX[i] is a long-term reference picture))

AltRefIdxLX=i

[REMOVED:
"TempRefPicInListsFlag=TempRefPicInListsFlag||!
zeroIdxLtFlag||(AltRefIdxLX!=−1)"]

Existing proposals for temporal ARP disable ARP when NBDV does not return an available DV for the current video block. However, as discussed above, this disclosure provides techniques for ARP that do not rely on a DV derived by NBDV. Accordingly, in some examples according to this disclosure, instead of always disabling ARP when NBDV does not return an available DV, a video coder may enable ARP in at least some situations in which NBDV does not return an available DV. For example, a video coder, e.g., video encoder 20 and/or video decoder 30, may enable temporal ARP if a temporal reference video block (CurrTRef) covers at least one DMV. As another example, a video coder may enable temporal ARP if the temporal reference video block (CurrTRef) covers at least one DMV and the corresponding block is not coded with BVSP mode. In such examples, the video coder may apply temporal ARP using the DMV to replace the DV, e.g., as described above with respect to FIG. 11. As another example, a video coder may enable inter-view ARP, e.g., as described above with respect to FIG. 10, if the current reference picture is an inter-view reference picture. One or more constraints may be given at the video decoder so that when NBDV does not return an available DV, and one or more of the above conditions are not true, the weighting factor, w, for ARP shall be set to 0.

Figure 14:
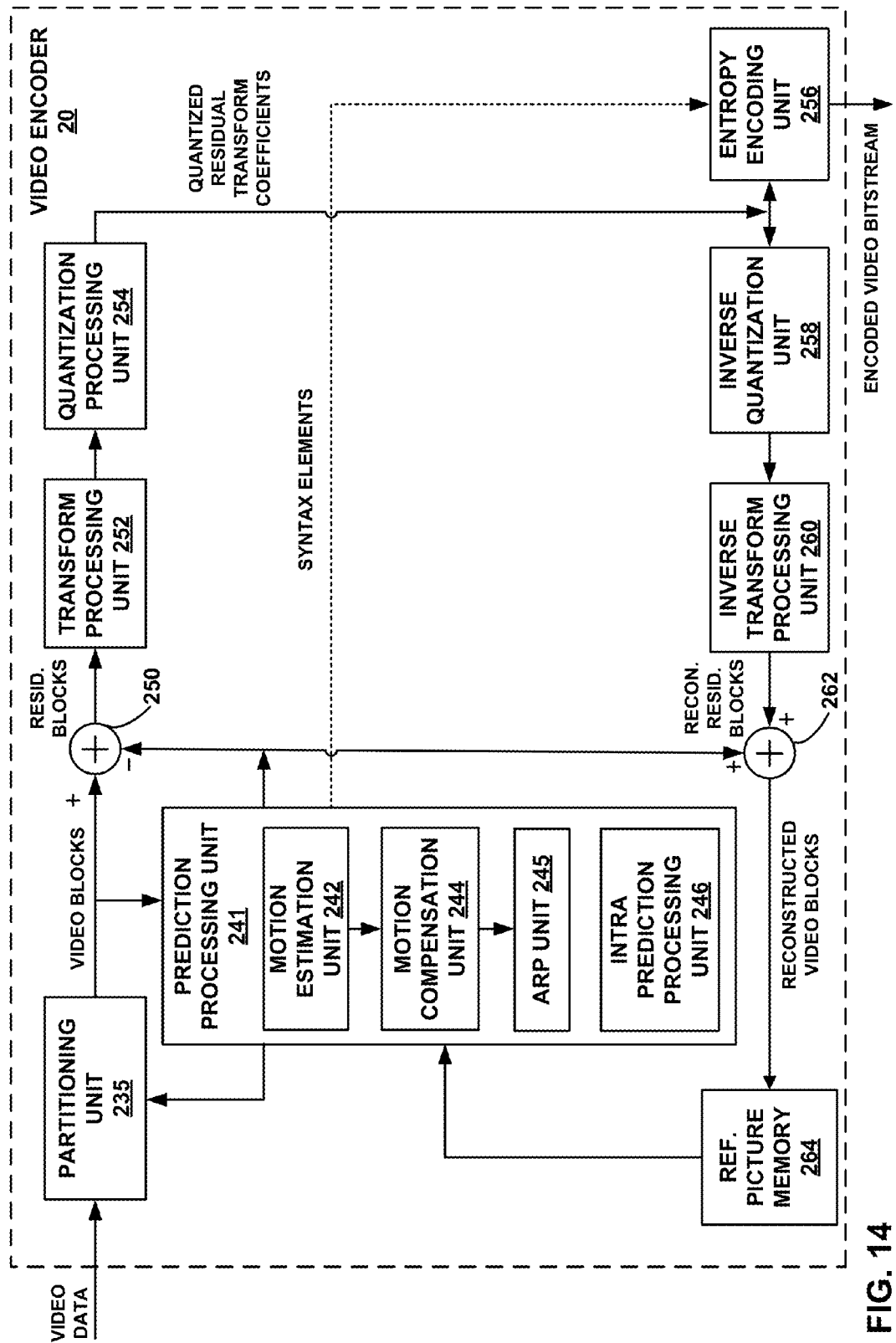
FIG. 14 is a block diagram illustrating an example video encoder that may implement the techniques described in this disclosure.

FIG. 14 is a block diagram illustrating an example video encoder 20 that may implement the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal or inter-view prediction to reduce or remove redundancy in video within adjacent frames or pictures of a video sequence. Intra-mode (I mode) may refer to any of several spatial based compression modes. Inter-modes, such as uni-directional prediction (P mode) or bi-prediction (B mode), may include to any of several temporal-based compression modes.

In the example of FIG. 14, video encoder 20 includes a partitioning unit 235, prediction processing unit 241, reference picture memory 264, summer 250, transform processing unit 252, quantization processing unit 254, and entropy encoding unit 256. Prediction processing unit 241 includes motion estimation unit 242, motion compensation unit 244, advanced residual prediction (ARP) unit 254, and intra prediction processing unit 246. For video block reconstruction, video encoder 20 also includes inverse quantization processing unit 258, inverse transform processing unit 260, and summer 262. A deblocking filter (not shown in FIG. 14) may also be included to filter block boundaries to remove blockiness artifacts from reconstructed video. If desired, the deblocking filter would typically filter the output of summer 262. Additional loop filters (in loop or post loop) may also be used in addition to the deblocking filter.

In various examples, a unit of video encoder 20 may be tasked to perform the techniques of this disclosure. Also, in some examples, the techniques of this disclosure may be divided among one or more of the units of video encoder 20. For example, ARP unit 245 may perform the techniques of this disclosure, alone, or in combination with other units of video encoder, such as motion estimation unit 242 and motion compensation unit 244.

As shown in FIG. 14, video encoder 20 receives video data, and partitioning unit 235 partitions the data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Prediction processing unit 241 may select one of a plurality of possible coding modes, such as one of a plurality of intra coding modes or one of a plurality of inter coding modes, for the current video block based on error results (e.g., coding rate and the level of distortion). Prediction processing unit 241 may provide the resulting intra- or inter-coded block to summer 250 to generate residual block data and to summer 262 to reconstruct the encoded block for use as a reference picture.

Intra prediction unit 246 within prediction processing unit 241 may perform intra-predictive coding of the current video block relative to one or more neighboring blocks in the same frame or slice as the current block to be coded to provide spatial compression. Motion estimation unit 242 and motion compensation unit 244 within prediction processing unit 241 perform inter-predictive coding of the current video block relative to one or more predictive blocks in one or more reference pictures, e.g., to provide temporal compression.

Motion estimation unit 242 may be configured to determine the inter-prediction mode for a video slice according to a predetermined pattern for a video sequence. Motion estimation unit 242 and motion compensation unit 244 may be highly integrated, but are illustrated separately for conceptual purposes. Motion estimation, performed by motion estimation unit 242, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 264. For example, video encoder 20 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

Motion estimation unit 242 calculates a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 264. Motion estimation unit 242 sends the calculated motion vector to entropy encoding unit 256 and motion compensation unit 246.

Motion compensation, performed by motion compensation unit 244, may involve fetching or generating the predictive block based on the motion vector determined by motion estimation, possibly performing interpolations to sub-pixel precision. Upon receiving the motion vector for the PU of the current video block, motion compensation unit 244 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 250 represents the component or components that perform this subtraction operation. Motion compensation unit 244 may also generate syntax elements associated with the video blocks and the video slice for use by video decoder 30 in decoding the video blocks of the video slice.

Intra-prediction processing unit 246 may intra-predict a current block, as an alternative to the inter-prediction performed by motion estimation unit 242 and motion compensation unit 244, as described above. In particular, intra-prediction processing unit 246 may determine an intra-prediction mode to use to encode a current block. In some examples, intra-prediction processing unit 246 may encode a current video block using various intra-prediction modes, e.g. during separate encoding passes, and intra-prediction module 246 (or prediction processing unit 241, in some examples) may select an appropriate intra-prediction mode to use from the tested modes. For example, intra-prediction processing unit 246 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 246 may calculate ratios from the distortions and rates for the various encoded blocks to determine which intra-prediction mode exhibits the best rate-distortion value for the block.

In any case, after selecting an intra-prediction mode for a block, intra-prediction processing unit 246 may provide information indicative of the selected intra-prediction mode for the block to entropy encoding unit 256. Entropy encoding unit 256 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 241 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 252. Transform processing unit 252 transforms the residual video data into residual transform coefficients using a transform, such as a discrete cosine transform (DCT) or a conceptually similar transform. Transform processing unit 252 may convert the residual video data from a pixel domain to a transform domain, such as a frequency domain.

Transform processing unit 252 may send the resulting transform coefficients to quantization processing unit 254. Quantization processing unit 254 quantizes the transform coefficients to further reduce bit rate. The quantization process may reduce the bit depth associated with some or all of the coefficients. The degree of quantization may be modified by adjusting a quantization parameter. In some examples, quantization processing unit 254 may then perform a scan of the matrix including the quantized transform coefficients. Alternatively, entropy encoding unit 256 may perform the scan.

Following quantization, entropy encoding unit 256 entropy encodes the quantized transform coefficients. For example, entropy encoding unit 256 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 256, the encoded video bitstream may be transmitted to video decoder 30, or archived for later transmission or retrieval by video decoder 30. Entropy encoding unit 256 may also entropy encode the motion vectors and the other syntax elements for the current video slice being coded.

Inverse quantization processing unit 258 and inverse transform processing unit 260 apply inverse quantization and inverse transformation, respectively, to reconstruct the residual block in the pixel domain for later use as a reference block of a reference picture. Motion compensation unit 244 may calculate a reference block by adding the residual block to a predictive block of one of the reference pictures within one of the reference picture lists. Motion compensation unit 244 may also apply one or more interpolation filters to the reconstructed residual block to calculate sub-integer pixel values for use in motion estimation. Summer 262 adds the reconstructed residual block to the motion compensated prediction block produced by motion compensation unit 244 to produce a reference block for storage in reference picture memory 264. The reference block may be used by motion estimation unit 242 and motion compensation unit 244 as a reference block to inter-predict a block in a subsequent video frame or picture.

Video encoder 20, e.g., ARP unit 245 of video encoder 20, may perform any of the ARP techniques, e.g., inter-view or temporal ARP techniques described herein. For example, if prediction processing unit 241 and/or motion estimation unit 242 inter-view predicts a current video block, e.g. predicts the current video block based on a reference block from a reference picture in a different, reference view than the current video block using a DMV, ARP unit 245 may identify the DMV associated with the current video block for the inter-view prediction of the current video block. In some examples, the DMV may be a DV converted to an IDMVC for motion information prediction of the current video block.

Based on the DMV, ARP unit 245, alone or with motion compensation unit 244, may also identify the inter-view reference video block (Base), and a TMV of the inter-view reference video block, which may have been previously determined by motion estimation unit 242 during the prediction of the inter-view reference video block (Base). Based on the TMV, ARP unit 245, alone or with motion compensation unit 244, may identify a temporal reference video block in the in the reference view (BaseTRef) and a temporal reference video block in the current view (CurrTRef). ARP unit 245 may determine the inter-view residual predictor for the current video block based on the difference (CurrTRef−BaseTRef) between the temporal reference video block in the current view and the temporal reference video block in the in the reference view. ARP unit 245 may apply a weighting factor w to the difference (CurrTRef−BaseTRef), and may determine the inter-view predictor block for the current video block to be Base+w*(CurrTRef−BaseTRef), as described herein, e.g., with respect to FIG. 10.

As another example, if prediction processing unit 241 and/or motion estimation unit 242 temporally predicts a current video block, e.g., predicts the current video block based on a reference block from a reference picture in a different access unit than, but the same view as the current video block using a TMV, ARP unit 245 may identify the TMV. Based on the TMV, ARP unit 245, alone or with motion compensation unit 244, may also identify the temporal reference video block (CurrTRef), and a DMV of the temporal reference video block, which may have been previously determined by motion estimation unit 242 during the prediction of the temporal reference video block (CurrTRef). Based on the DMV, ARP unit 245, alone or with motion compensation unit 244, may identify a temporal reference video block in the in the reference view (BaseTRef) and an inter-view reference video block in the reference view (Base). ARP unit 245 may determine the temporal residual predictor for the current video block based on the difference (Base−BaseTRef) between the reference video blocks in the reference view. ARP unit 245 may apply a weighting factor w to the difference (Base−BaseTRef), and may determine the temporal predictor block for the current video block to be CurrTRef+w*(Base−BaseTRef), as described herein, e.g., with respect to FIG. 11.

In either of the above examples, ARP unit 245, motion compensation unit 244, and/or any component of prediction processing unit 241 or video encoder 20, may provide the inter-view predictor block to summer 250, which determines the residual to be encoded in the encoded video bitstream for the current video block. Additionally, ARP unit 245 may scale TMVs and DMVs, or perform any of the functions described herein for ARP according to the techniques of this disclosure.

In this manner, video encoder 20 may be configured to implement the example ARP techniques of this disclosure to encode a video block. For example, video encoder 20 may be an example of a video encoder configured to perform a method of inter-view advanced residual prediction for encoding video data that comprises identifying a DMV for a current video block, wherein the current video block is in a current view, and wherein the DMV is used for inter-view prediction of the current video block based on an inter-view reference video block in a reference view and in the same access unit as the current video block. The method further comprises identifying a temporal motion vector (TMV) and associated reference picture of the inter-view reference video block, identifying a temporal reference video block in the associated reference picture in the reference view based on the TMV of the inter-view reference video block, and identifying a temporal reference video block in the current view based on the TMV of the inter-view reference video block in the reference view. The temporal reference video block in the current view and the temporal reference video block in the reference view are in the same access unit. The method further comprises determining a residual predictor block for the current video block based on a difference between the temporal reference video block in the current view and the temporal reference video block in the reference view, and encoding an encoded video bitstream that encodes the video data to identify the DMV and a residual block for the current video block, wherein the residual block identified by the encoded video bitstream comprises a difference between the inter-view reference video block and the residual predictor block for the current video block.

Video encoder 20 may also be an example of a video coder that comprises a memory configured to store an encoded video bitstream that encodes the video data, and one or more processors. The one or more processors of the video coder, e.g., video encoder 20, may be configured to identify a DMV for a current video block, wherein the current video block is in a current view, and wherein the DMV is used for inter-view prediction of the current video block based on an inter-view reference video block in a reference view and in the same access unit as the current video block. The one or more processors are further configured to identify a temporal motion vector (TMV) and associated reference picture of the inter-view reference video block, identify a temporal reference video block in the associated reference picture in the reference view based on the TMV of the inter-view reference video block, and identify a temporal reference video block in the current view based on the TMV of the inter-view reference video block in the reference view. The temporal reference video block in the current view and the temporal reference video block in the reference view are in the same access unit. The one or more processors are further configured to determine a residual predictor block for the current video block based on a difference between the temporal reference video block in the current view and the temporal reference video block in the reference view, and code the encoded video bitstream to identify the DMV and a residual block for the current video block, wherein the residual block identified by coding the encoded video bitstream comprises a difference between the inter-view reference video block and the residual predictor block for the current video block.

Figure 15:
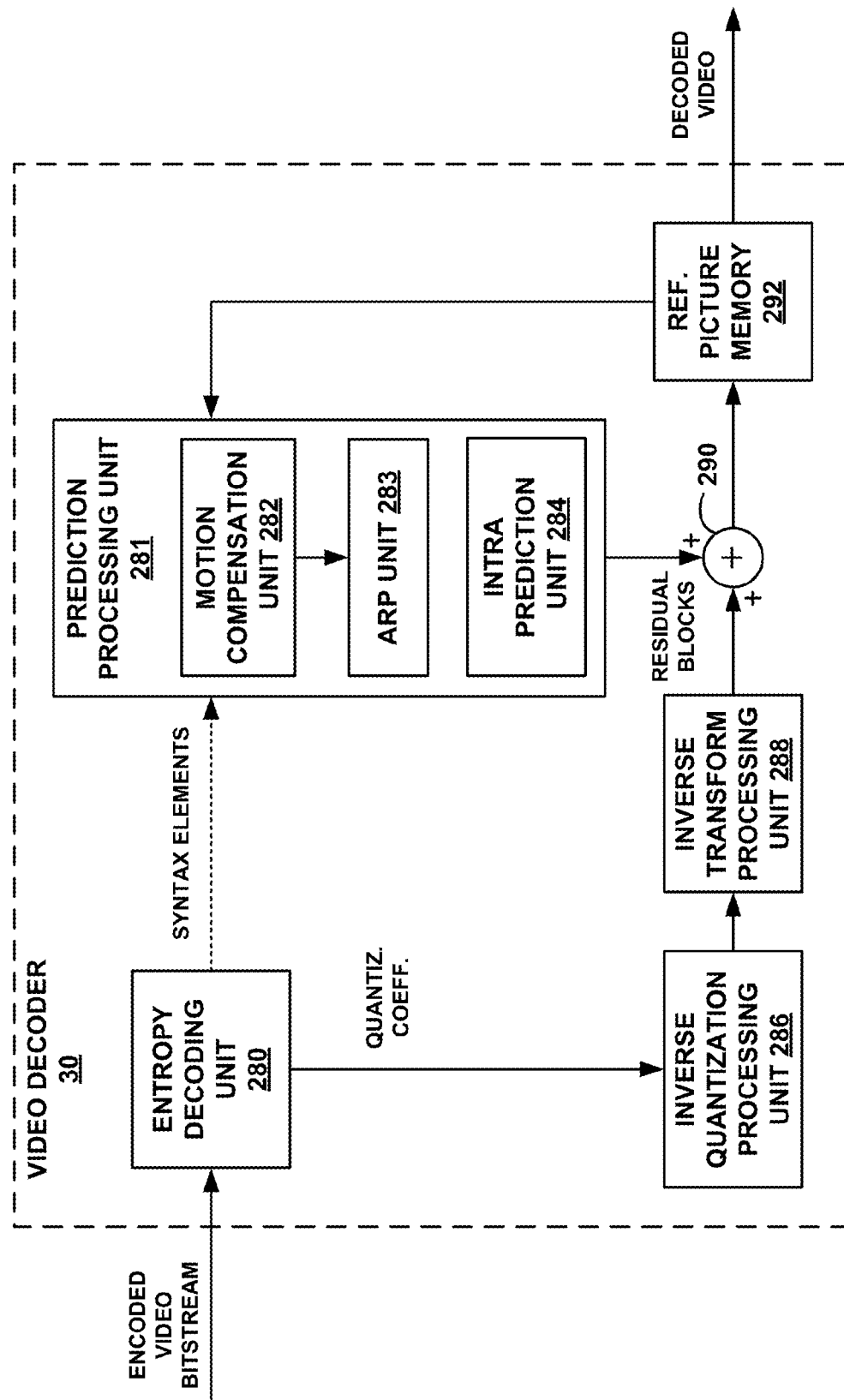
FIG. 15 is a block diagram illustrating an example video decoder that may utilize the techniques described in this disclosure.

FIG. 15 is a block diagram illustrating an example video decoder 30 that may implement the techniques described in this disclosure. In the example of FIG. 15, video decoder 30 includes an entropy decoding unit 280, prediction processing unit 281, inverse quantization processing unit 286, inverse transformation unit 288, summer 290, and reference picture memory 292. Prediction processing unit 281 includes motion compensation unit 282, ARP unit 283, and intra prediction unit 284. Video decoder 30 may, in some examples, perform a decoding pass generally reciprocal to the encoding pass described with respect to video encoder 20 from FIG. 14.

In various examples, a unit of video decoder 30 may be tasked to perform the techniques of this disclosure. Also, in some examples, the techniques of this disclosure may be divided among one or more of the units of video decoder 30. For example, ARP unit 283 may perform the techniques of this disclosure, alone, or in combination with other units of video encoder, such as motion compensation unit 282.

During the decoding process, video decoder 30 receives an encoded video bitstream that represents video blocks of an encoded video slice and associated syntax elements from video encoder 20. Entropy decoding unit 280 of video decoder 30 entropy decodes the bitstream to generate quantized coefficients, motion vectors, and other syntax elements. Entropy decoding unit 280 forwards the motion vectors and other syntax elements to prediction processing unit 281. Video decoder 30 may receive the syntax elements at the video slice level and/or the video block level.

When the video slice is coded as an intra-coded (I) slice, intra prediction unit 284 of prediction processing unit 281 may generate prediction data for a video block of the current video slice based on a signaled intra prediction mode and data from previously decoded blocks of the current frame or picture. When the video frame is coded as an inter-coded (i.e., B or P) slice, motion compensation unit 282 of prediction processing unit 281 produces predictive blocks for a video block of the current video slice based on the motion vectors and other syntax elements received from entropy decoding unit 280. The predictive blocks may be produced from one of the reference pictures within one of the reference picture lists.

Video decoder 30 may construct the reference frame lists, RefPicList0 and RefPicList1, using default construction techniques or any other technique based on reference pictures stored in reference picture memory 292.

Motion compensation unit 282 determines prediction information for a video block of the current video slice by parsing the motion vectors and other syntax elements, and uses the prediction information to produce the predictive blocks for the current video block being decoded. For example, motion compensation unit 282 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 282 may also perform interpolation based on interpolation filters. Motion compensation unit 282 may use interpolation filters as used by video encoder 20 during encoding of the video blocks to calculate interpolated values for sub-integer pixels of reference blocks. In this case, motion compensation unit 282 may determine the interpolation filters used by video encoder 20 from the received syntax elements and use the interpolation filters to produce predictive blocks.

Inverse quantization processing unit 286 inverse quantizes, i.e., dequantizes, the quantized transform coefficients provided in the bitstream and decoded by entropy decoding unit 280. The inverse quantization process may include use of a quantization parameter calculated by video encoder 20 for each video block in the video slice to determine a degree of quantization and, likewise, a degree of inverse quantization that should be applied. Inverse transform processing unit 288 applies an inverse transform, e.g., an inverse DCT, an inverse integer transform, or a conceptually similar inverse transform process, to the transform coefficients in order to produce residual blocks in the pixel domain.

After motion compensation unit 282 generates the predictive block for the current video block based on the motion vectors and other syntax elements, video decoder 30 forms a decoded video block by summing the residual blocks from inverse transform processing unit 288 with the corresponding predictive blocks generated by motion compensation unit 282. Summer 290 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 292, which stores reference pictures used for subsequent motion compensation. Reference picture memory 292 also stores decoded video for later presentation on a display device, such as display device 32 of FIG. 1.

Video decoder 30, e.g., ARP unit 283 of video decoder 30, may perform any of the ARP techniques, e.g., inter-view or temporal ARP techniques described herein. For example, if, based on syntax elements recovered from the encoded video bitstream by entropy decoding unit 280, prediction processing unit 281 and/or motion compensation unit 282 inter-view predicts a current video block using a DMV, ARP unit 283 may identify the DMV associated with the current video block for the inter-view prediction of the current video block.

In some examples, the DMV may be a DV converted to an IDMVC for motion information prediction of the current video block.

Based on the DMV, ARP unit 283, alone or with motion compensation unit 282, may also identify the inter-view reference video block (Base), and a TMV of the inter-view reference video block, which may have been previously determined by motion compensation unit 282 during the prediction of the inter-view reference video block (Base). Based on the TMV, ARP unit 283, alone or with motion compensation unit 282, may identify a temporal reference video block in the in the reference view (BaseTRef) and a temporal reference video block in the current view (CurrTRef). ARP unit 283 may determine the inter-view residual predictor for the current video block based on the difference (CurrTRef−BaseTRef) between the temporal reference video block in the current view and the temporal reference video block in the in the reference view. ARP unit 283 may apply a weighting factor w to the difference (CurrTRef−BaseTRef), and may determine the inter-view predictor block for the current video block to be Base+w*(CurrTRef−BaseTRef), as described herein, e.g., with respect to FIG. 10.

As another example, if, based on syntax elements recovered from the encoded video bitstream by entropy decoding unit 280, prediction processing unit 281 and/or motion compensation unit 282 temporally predicts a current video block using a TMV, ARP unit 283 may identify the TMV. Based on the TMV, ARP unit 283, alone or with motion compensation unit 282, may also identify the temporal reference video block (CurrTRef), and a DMV of the temporal reference video block, which may have been previously determined by motion compensation unit 282 during the prediction of the temporal reference video block (CurrTRef). Based on the DMV, ARP unit 283, alone or with motion compensation unit 282, may identify a temporal reference video block in the in the reference view (BaseTRef) and an inter-view reference video block in the reference view (Base). ARP unit 283 may determine the temporal residual predictor for the current video block based on the difference (Base−BaseTRef) between the reference video blocks in the reference view. ARP unit 283 may apply a weighting factor w to the difference (Base−BaseTRef), and may determine the temporal predictor block for the current video block to be CurrTRef+w* (Base−BaseTRef), as described herein, e.g., with respect to FIG. 11.

In either of the above examples, ARP unit 283, motion compensation unit 282, and/or any component of prediction processing unit 281 or video decoder 30, may provide the inter-view predictor block to summer 290, which sums the inter-view predictor block with the decoded residual received from inverse transform processing unit 288 to reconstruct the current video block. Additionally, ARP unit 283 may scale TMVs and DMVs, or perform any of the functions described herein for ARP according to the techniques of this disclosure.

In this manner, video decoder 30 may be configured to implement the example ARP techniques of this disclosure to decode a video block. For example, video decoder 30 may be an example of a video decoder configured to perform a method of inter-view advanced residual prediction for decoding video data that comprises decoding an encoded video bitstream that encodes the video data to identify a disparity motion vector (DMV) and a residual block for a current video block, wherein the current video block is in a current view, and wherein the DMV is used for inter-view prediction of the current video block based on an inter-view reference video block in a reference view and in a same access unit as the current video block. The method further comprises identifying a temporal motion vector (TMV) and associated reference picture of the inter-view reference video block, identifying a temporal reference video block in the associated reference picture in the reference view based on the TMV of the inter-view reference video block, and identifying a temporal reference video block in the current view based on the TMV of the inter-view reference video block in the reference view. The temporal reference video block in the current view and the temporal reference video block in the reference view are in the same access unit. The method further comprises determining a residual predictor block for the current video block based on a difference between the temporal reference video block in the current view and the temporal reference video block in the reference view, and applying the residual predictor block and the residual block identified from the encoded video bitstream to the inter-view reference video block to reconstruct the current video block.

Video decoder 30 may also be an example of a video coder that comprises a memory configured to store an encoded video bitstream that encodes the video data, and one or more processors. The one or more processors of the video coder, e.g., video decoder 30, may be configured to identify a DMV for a current video block, wherein the current video block is in a current view, and wherein the DMV is used for inter-view prediction of the current video block based on an inter-view reference video block in a reference view and in a same access unit as the current video block. The one or more processors are further configured to identify a temporal motion vector (TMV) and associated reference picture of the inter-view reference video block, identify a temporal reference video block in the associated reference picture in the reference view based on the TMV of the inter-view reference video block, and identify a temporal reference video block in the current view based on the TMV of the inter-view reference video block in the reference view. The temporal reference video block in the current view and the temporal reference video block in the reference view are in the same access unit. The one or more processors are further configured to determine a residual predictor block for the current video block based on a difference between the temporal reference video block in the current view and the temporal reference video block in the reference view, and code the encoded video bitstream to identify the DMV and a residual block for the current video block, wherein the residual block identified by coding the encoded video bitstream comprises a difference between the inter-view reference video block and the residual predictor block for the current video block.

Figure 16:
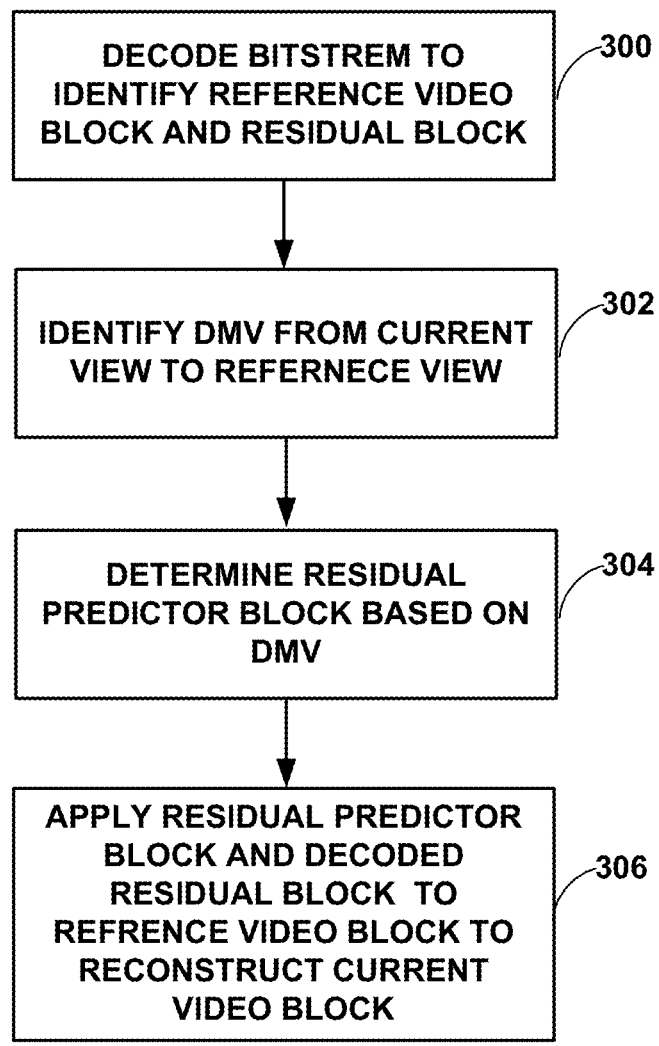
FIG. 16 is a flow diagram illustrating an example ARP method for decoding a video block according to the techniques described in this disclosure.

FIG. 16 is a flow diagram illustrating an example ARP method for decoding a video block according to the techniques described in this disclosure. The example method of FIG. 16 may be performed by a video decoder, such as video decoder 30, which may include an ARP unit 283.

According to the example method of FIG. 16, video decoder 30 decodes an encoded video bitstream to identify a reference video block and a residual block for the current video block (300). For example, motion compensation unit 282 may identify the reference video block based on a motion vector indicated by syntax decoded by entropy decoding unit 280, and inverse transform processing unit 288 may provide the decoded residual block to summer 290. Video decoder 30, e.g., ARP unit 283, identifies a DMV from a current view of the current video block to a reference view (302).

Video decoder 30, e.g., ARP unit 283, may then determine a residual predictor block for decoding the current video block based on the DMV (304). For example, if the current video block is inter-view predicted, video decoder 30 may determine an inter-view residual predictor block based on the DMV of the current video block using inter-view ARP techniques, e.g., as described with respect to FIG. 10. If the current video block is temporally predicted, video decoder 30 may determine a temporal residual predictor block based on the DMV of a temporal reference video block using temporal ARP techniques, e.g., as described with respect to FIG. 1I. Video decoder 30. e.g., ARP unit 283 and/or summer 290, may apply the residual predictor block and the decoded residual block to the reference video block to reconstruct the current video block (306).

Figure 17:
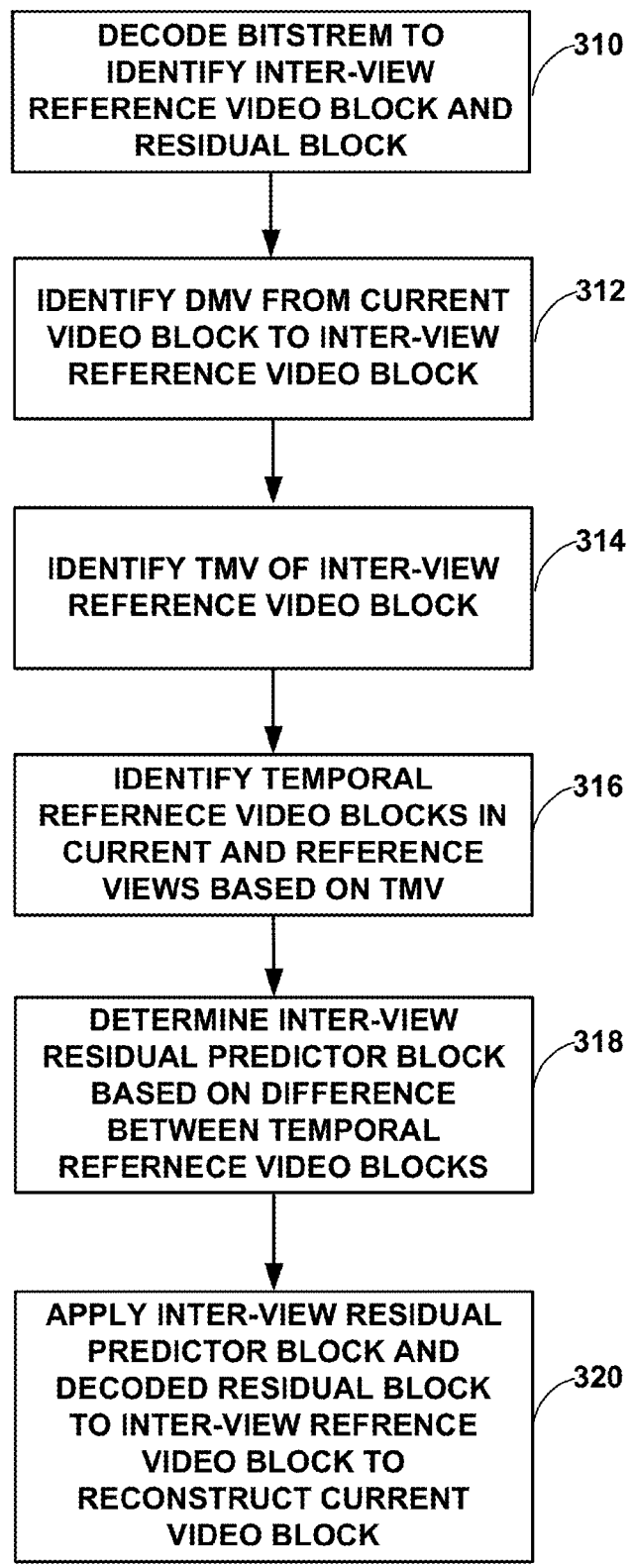
FIG. 17 is a flow diagram illustrating an example inter-view ARP method for decoding an inter-view predicted video block according to the techniques described in this disclosure.

FIG. 17 is a flow diagram illustrating an example inter-view ARP method for decoding an inter-view predicted video block according to the techniques described in this disclosure. The example method of FIG. 17 may be performed by a video decoder, such as video decoder 30, which may include an ARP unit 283.

According to the example method of FIG. 17, video decoder 30 decodes an encoded video bitstream to identify a DMV used for inter-view prediction of the current video block, and a residual block (310). Video decoder 30, e.g., ARP unit 283, identifies the inter-view reference video block (Base) based on the DMV (312). Video decoder 30, e.g., ARP unit 283, also identifies a TMV and associated reference picture of the inter-view reference video block (Base) (314).

Video decoder 30, e.g., ARP unit 283, may then identify temporal reference video blocks in the current and reference views (CurrTRef and BaseTRef, respectively) based on the TMV, e.g., using the techniques described above with respect to FIG. 10 (316). Video decoder 30, e.g., ARP unit 283, may then determine an inter-view residual predictor block for the current video block based on the difference between these temporal reference video blocks (CurrTRef−BaseTRef) (318). Video decoder, e.g., ARP unit 283 and/or summer 290, may apply the inter-view residual predictor block and the decoded residual block to the interview reference video block (Base) to reconstruct the current video block (Curr) (320).

Figure 18:
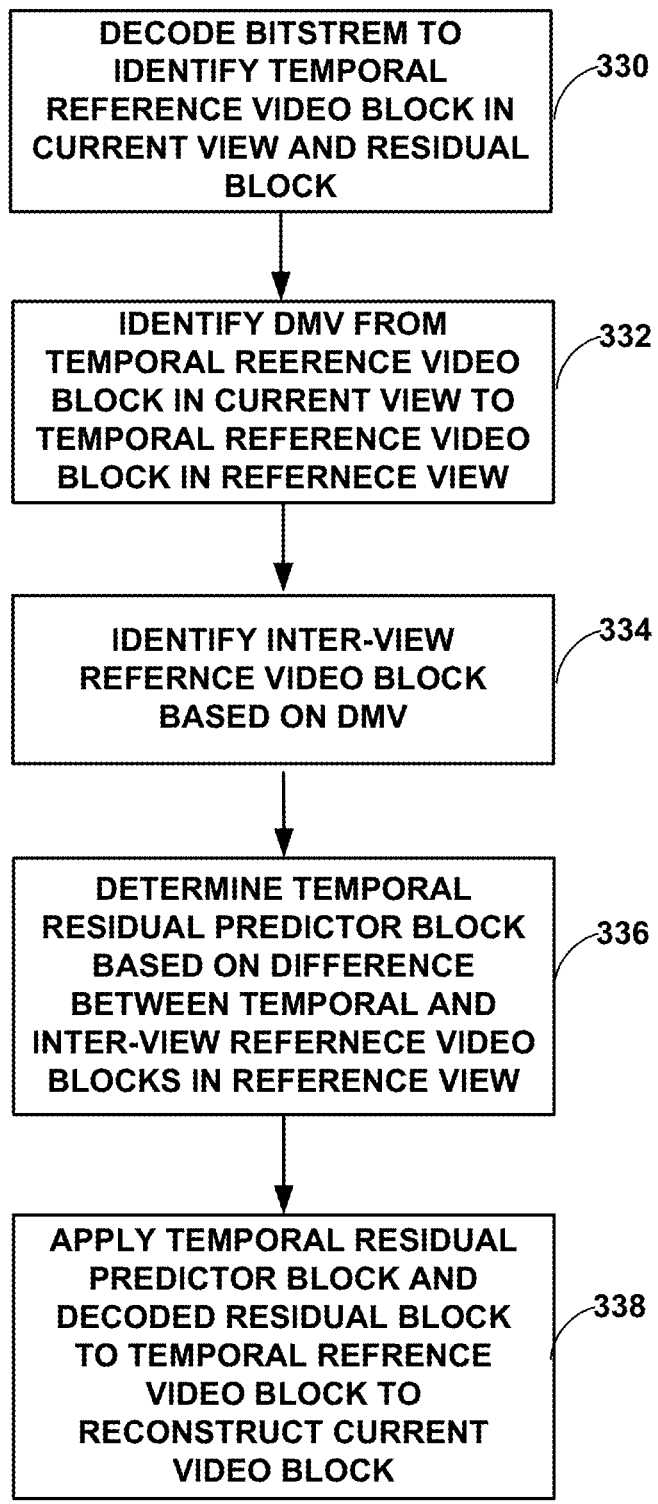
FIG. 18 is a flow diagram illustrating an example temporal ARP method for decoding a temporally-predicted video block according to the techniques described in this disclosure.

FIG. 18 is a flow diagram illustrating an example temporal ARP method for decoding a temporally-predicted video block according to the techniques described in this disclosure. The example method of FIG. 18 may be performed by a video decoder, such as video decoder 30, which may include an ARP unit 283.

According to the example method of FIG. 18, video decoder 30 decodes the encoded video bitstream to identify a temporal reference video block (CurrTRef) in the current view and a residual block for reconstructing the current video block (330). Video decoder 30, e.g., motion compensation unit 282, may identify the temporal reference video block (CurrTRef) in the current view using a TMV associated with the current video block as determined from the decoded video bitstream. Video decoder 30, e.g., ARP unit 283, may identify a DMV of the temporal reference video block (CurrTRef), which may in turn identify a temporal reference video block in the reference view (BaseTRef) (332).

Video decoder 30, e.g., ARP unit 283, may also identify an inter-view reference video block in the reference view (Base) based on the DMV of the temporal reference video block (CurrTRef) in the current view (334). Video decoder 30, e.g., ARP unit 283, may then determine the temporal residual predictor block for the current video block based on the difference between these reference video blocks in the reference view (Base−BaseTRef) (336). Video decoder, e.g., ARP unit 283 and/or summer 290, may apply the temporal residual predictor block and the decoded residual block to the temporal reference video block (CurrTRef) to reconstruct the current video block (Curr) (338).

Figure 19:
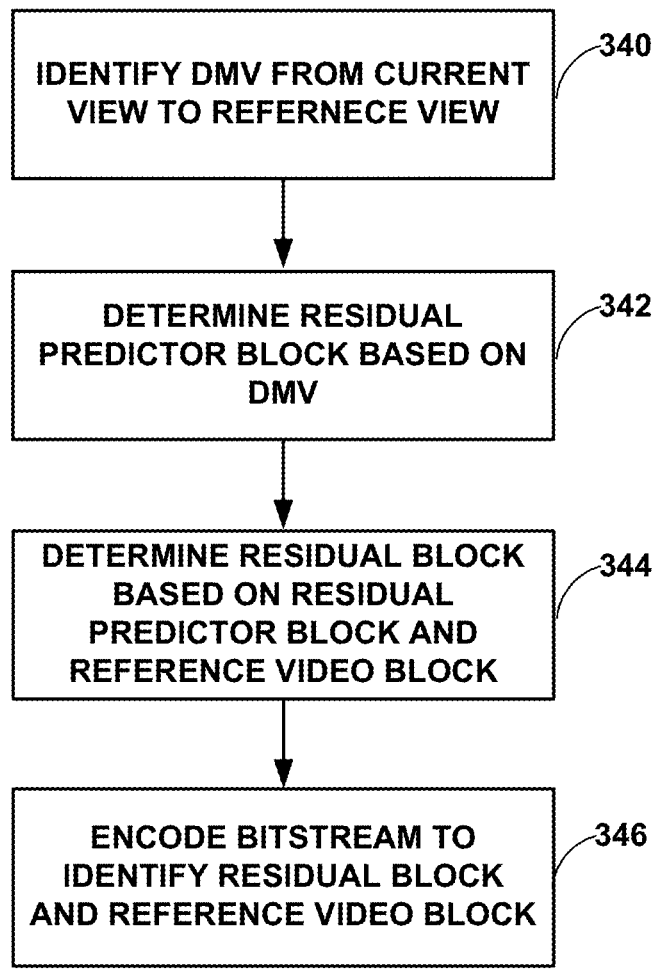
FIG. 19 is a flow diagram illustrating an example ARP method for encoding a video block according to the techniques described in this disclosure.

FIG. 19 is a flow diagram illustrating an example ARP method for encoding a video block according to the techniques described in this disclosure. The example method of FIG. 19 may be performed by a video encoder, such as video encoder 20, which may include an ARP unit 245.

According to the example method of FIG. 19, video encoder 20, e.g. ARP unit 245, identifies a DMV from a current view of a current video block to a reference view (340). Video encoder 20, e.g., ARP unit 245, may then determine a residual predictor block for encoding the current video block based on the DMV (342). For example, if the current video block is inter-view predicted, video encoder 20 may determine an inter-view residual predictor block based on the DMV of the current view block using inter-view ARP techniques, e.g. as described with respect to FIG. 10. If the current video block is temporally predicted, video encoder 20 may determine a temporal residual predictor block based on the DMV of a temporal reference video block in the current view using temporal ARP techniques, e.g., as described with respect to FIG. 11. In either case video encoder 20, e.g., ARP unit 245 and summer 250 may determine a residual block for the current video block based on a difference between the current video block and the predictor block for the current video block, which may be the sum of the reference video block and the residual predictor block for the current video block (344). Video encoder 20 may encode the video bitstream to identify this residual block and the reference video block (346).

Figure 20:
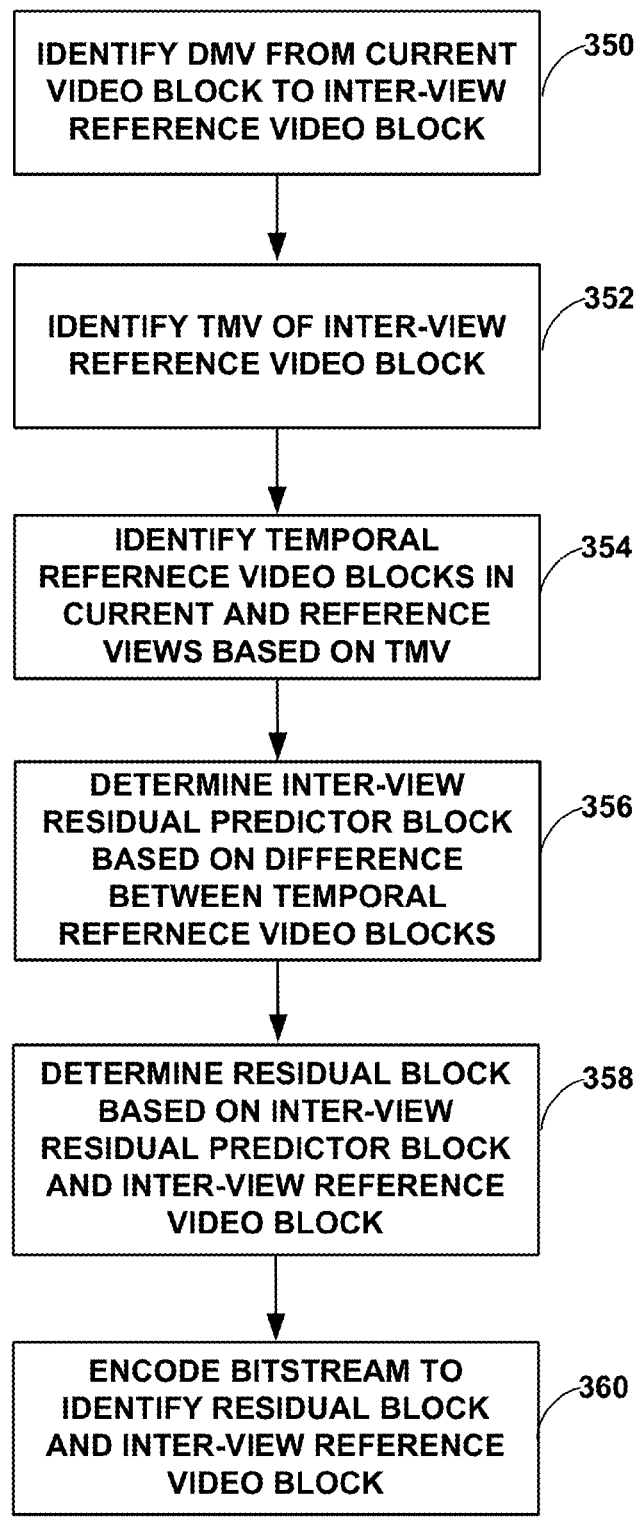
FIG. 20 is a flow diagram illustrating an example inter-view ARP method for encoding an inter-view predicted video block according to the techniques described in this disclosure.

FIG. 20 is a flow diagram illustrating an example inter-view ARP method for encoding an inter-view predicted video block according to the techniques described in this disclosure. The example method of FIG. 20 may be performed by a video encoder, such as video encoder 20, which may include an ARP unit 245.

According to the example method of FIG. 20, video encoder 20, e.g. ARP unit 245, identifies the DMV from current video block (Curr) to the inter-view reference video block (Base) (350). Video encoder 20, e.g., ARP unit 245, also identifies a TMV and associated reference picture of the inter-view reference video block (Base) (352). Video encoder 20, e.g., ARP unit 245, may then identify temporal reference video blocks in the current and reference views (CurrTRef and BaseTRef, respectively) based on the TMV, e.g., using the techniques described above with respect to FIG. 10 (354).

Video encoder 30, e.g., ARP unit 245, may then determine an inter-view residual predictor block for the current video block based on the difference between these temporal reference video blocks (CurrTRef−BaseTRef) (318). Video encoder 20, e.g., ARP unit 245 and summer 250 may determine a residual block for the current video block based on a difference between the current video block and the predictor block for the current video block, which may be the sum of the inter-view reference video block (Base) and the residual predictor block for the current video block (358). Video encoder 20 may encode the video bitstream to identify this residual block and the inter-view reference video block (360).

Figure 21:
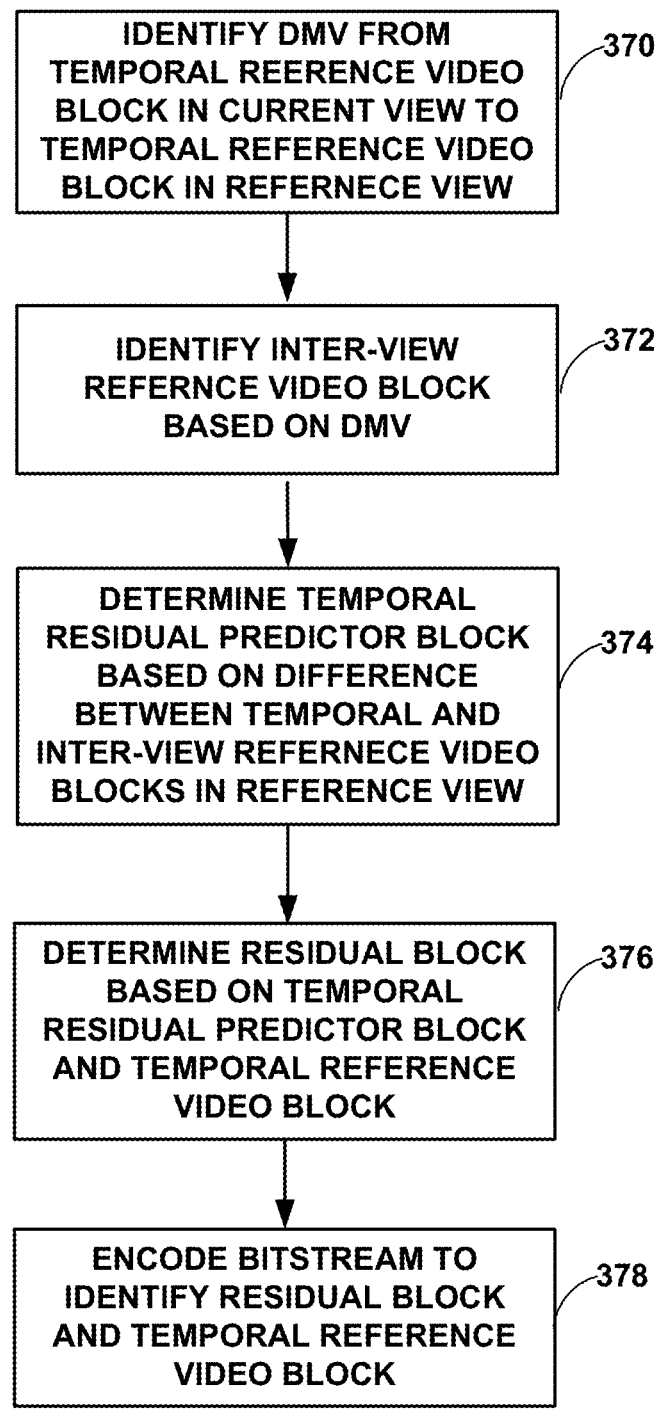
FIG. 21 is a flow diagram illustrating an example temporal ARP method for encoding a temporally-predicted video block according to the techniques described in this disclosure.

FIG. 21 is a flow diagram illustrating an example temporal ARP method for encoding a temporally-predicted video block according to the techniques described in this disclosure. The example method of FIG. 21 may be performed by a video encoder, such as video encoder 20, which may include an ARP unit 245.

According to the example method of FIG. 21, video encoder 20, e.g. ARP unit 245, identifies a temporal reference video block (CurrTRef) in the current view, e.g., using a TMV associated with the current video block. Video encoder 20, e.g., ARP unit 245, may then identify a DMV of the temporal reference video block (CurrTRef), which may in turn identify a temporal reference video block in the reference view (BaseTRef) (370). Based on the DMV of the temporal reference video block (CurrTRef) in the current view, video encoder 20, e.g., ARP unit 245, may also identify an inter-view reference video block in the reference view (Base) (372).

Video encoder 20, e.g., ARP unit 245, may then determine the temporal residual predictor block for the current video block based on the difference between these reference video blocks in the reference view (Base−BaseTRef) (374). Video encoder 20, e.g., ARP unit 245 and summer 250 may determine a residual block for the current video block based on a difference between the current video block and the predictor block for the current video block, which may be the sum of the temporal reference video block (CurrTRef) and the residual predictor block for the current video block (376). Video encoder 20 may encode the video bitstream to identify this residual block and the inter-view reference video block (378).

Figure 22:
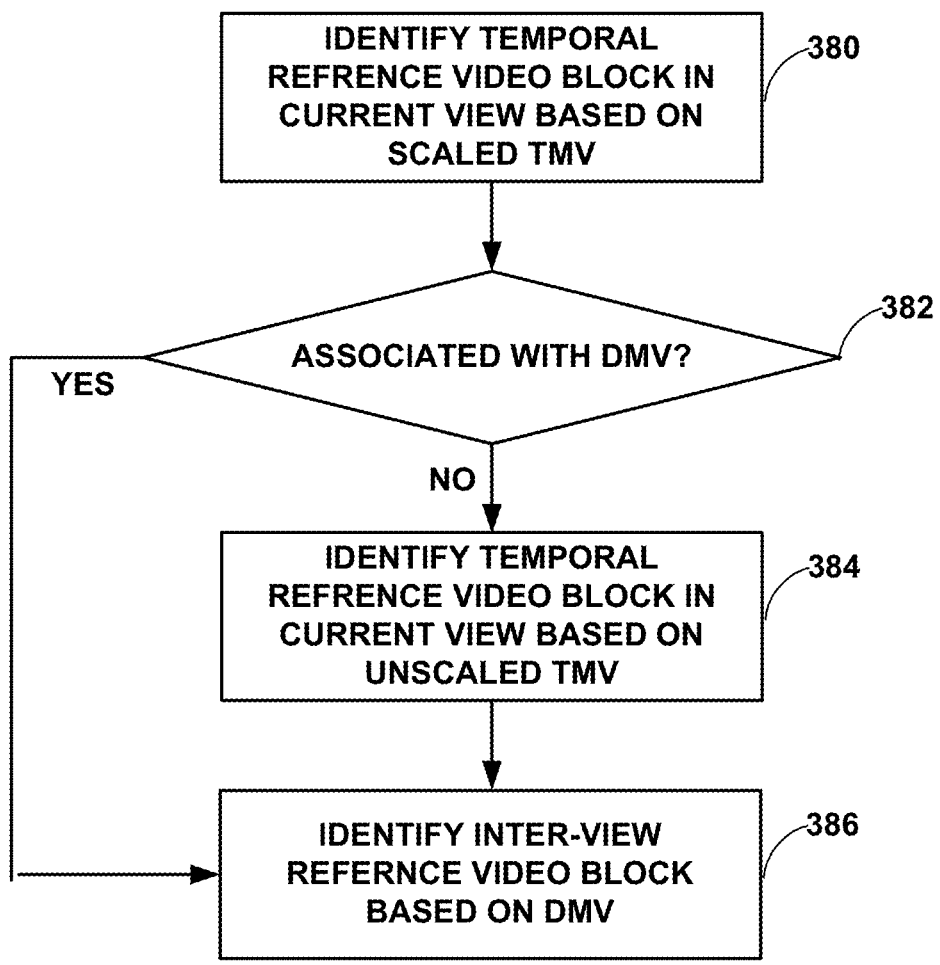
FIG. 22 is a flow diagram illustrating an example method for identifying a DMV for temporal ARP according to the techniques described in this disclosure.

FIG. 22 is a flow diagram illustrating an example method for identifying a DMV for temporal ARP according to the techniques described in this disclosure. The example method of FIG. 22 may be performed by a video coder, such as video encoder 20 and/or video decoder 30, which may include an ARP unit 245, 283.

According to the example method of FIG. 22, the video coder identifies a temporal reference video block in the current view (CurrTRef) based on a scaled TMV (380). The video coder then determines of the identified temporal reference video block is associated with a DMV (382). If the temporal reference video block is associated with a DMV, the video coder identifies an inter-view reference video block based on the DMV (388). If the temporal reference video block is not associated with a DMV, the video coder identifies another temporal reference video block in the current view based on the TMV absent scaling (384), and identifies the inter-view reference video block based on a DMV of the temporal reference video block in the current view that was identified based on the TMV absent scaling (388).

Figure 23:
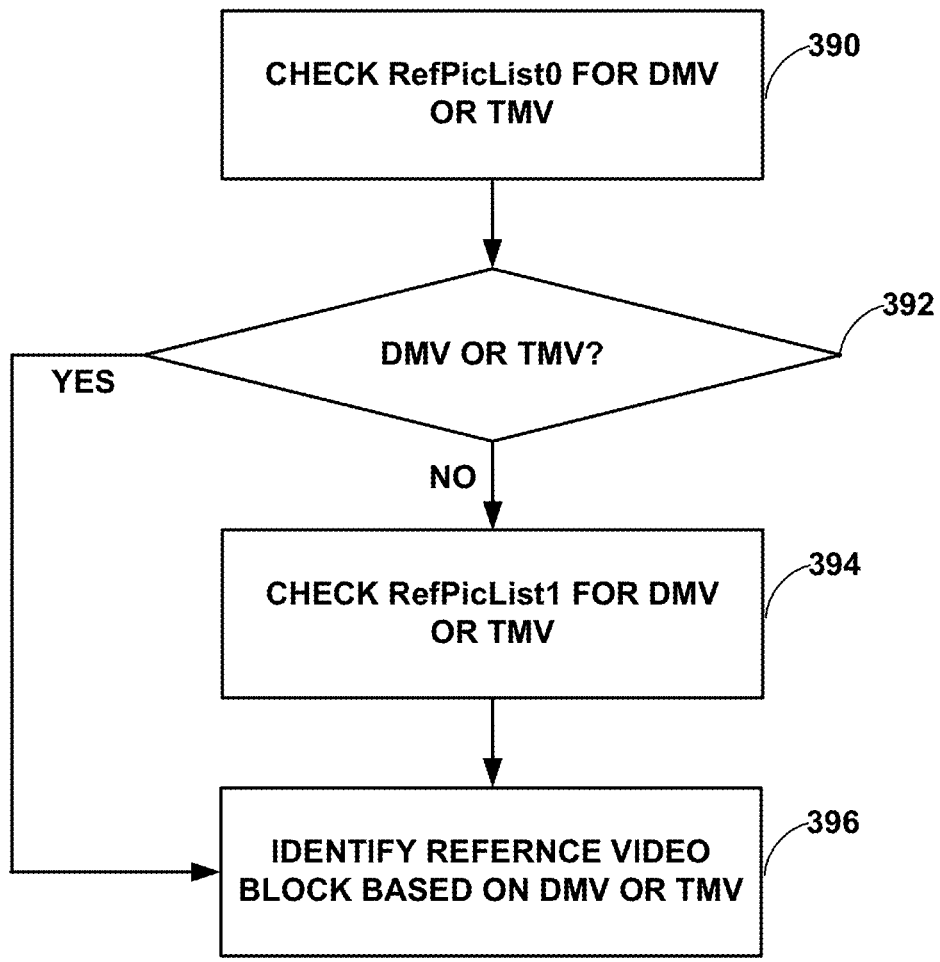
FIG. 23 is a flow diagram illustrating an example method for identifying a TMV or DMV for ARP according to the techniques described in this disclosure.

FIG. 23 is a flow diagram illustrating an example method for identifying a DMV or TMV for ARP according to the techniques described in this disclosure. The example method of FIG. 23 may be performed by a video coder, such as video encoder 20 and/or video decoder 30, which may include an ARP unit 245, 283.

According to the example method of FIG. 23, the video coder first checks RefPicList0 for the DMV or TMV needed for ARP (390). If RefPicList0 includes the DMV or TMV, the video coder identifies a reference video block based on the DMV or TMV (396). If RefPicList0 does not include the DMV or TMV, the video coder checks RefPicList1 for the DMV or TMV (394), and may identify a reference video block based on the DMV or TMV from RefPicList1 (396). If neither reference picture list includes the DMV or TMV, the video coder may use a zero motion vector, or not perform ARP, as examples. In some examples in which the video coder uses a zero motion vector for ARP, the video coder may apply the zero motion vector to the reference picture list (direction) invoked for inter-view prediction using the DMV.

In some examples, one or more aspects of the techniques described in this disclosure may be performed by an intermediate network device such as a media aware network element (MANE), a stream adaptation processor, a splicing processor, or an editing processor. For example, such an intermediate device may be configured to generate or receive any of a variety signaling as described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A method of inter-view advanced residual prediction for decoding video data, the method comprising:
    decoding an encoded video bitstream that encodes the video data to identify a disparity motion vector (DMV) and a residual block for a current video block, wherein the current video block is in a current view, and wherein the DMV is used for inter-view prediction of the current video block based on an inter-view reference video block in a reference view and in a same access unit as the current video block;
    identifying a temporal motion vector (TMV) and associated reference picture of the inter-view reference video block;
    identifying a temporal reference video block in the associated reference picture in the reference view based on the TMV of the inter-view reference video block;
    identifying a temporal reference video block in the current view based on the TMV of the inter-view reference video block in the reference view, wherein the temporal reference video block in the current view and the temporal reference video block in the reference view are located in the same access unit;
    determining a residual predictor block for the current video block based on a difference between the temporal reference video block in the current view and the temporal reference video block in the reference view; and
    applying the residual predictor block and the residual block identified from the encoded video bitstream to the reference video block to reconstruct the current video block.

2. The method of claim 1, wherein determining the residual predictor block for the current video block based on the difference between the temporal reference video block in the current view and the temporal reference video block in the reference view comprises applying a weighting factor to the difference between the temporal reference video block in the current view and the temporal reference video block in the reference view.

3. The method of claim 1, further comprising scaling the TMV of the inter-view reference video block to a target reference picture in a target access unit for advanced residual prediction of the current video block, wherein at least one of:
    identifying the temporal reference video block in the reference view based on the TMV of the inter-view reference video block comprises identifying the temporal reference video block in the reference view based on the scaled TMV; and
    identifying the temporal reference video block in the current view based on the TMV of the inter-view reference video block comprises identifying the temporal reference video block in the reference view based on the scaled TMV.

4. The method of claim 3, further comprising:
    selecting a reference picture list; and
    selecting the target reference picture from the selected reference picture list,
    wherein selecting the reference picture list comprises one of:
        selecting the reference picture list associated with the TMV; or
        selecting the reference picture list associated with the DMV.

5. The method of claim 1, wherein the inter-view reference video block comprises a plurality of prediction units, and identifying the TMV of the inter-view reference video block comprises identifying a TMV associated with one of the plurality of prediction units that contains a center position of the inter-view reference video block.

6. The method of claim 5, further comprising determining that the prediction unit that contains the center position of the inter-view reference video block does not have a TMV, wherein identifying the TMV of the inter-view reference video block comprises identifying a zero motion vector as the TMV of the inter-view reference video block.

7. The method of claim 6, wherein identifying the associated reference picture of the inter-view reference video block comprises identifying a reference picture in the reference view which is in the same access unit as a target reference picture used in advanced residual prediction.

8. The method of claim 1, wherein the inter-view reference video block contains a first set of motion information corresponding to a first reference picture list and a second set of motion information corresponding to a second reference picture list, and identifying the TMV of the inter-view reference video block comprises:
   selecting the TMV from the first set of motion information if the first set of motion information includes a TMV; and
   selecting the TMV from the second set of motion information if the first set of motion information does not include a TMV.

9. The method of claim 8, wherein the first reference picture list comprises RefPicList0.

10. The method of claim 8, wherein an order for considering the first and second sets of motion information is independent of which of the first and second sets of motion information includes the DMV.

11. The method of claim 1, further comprising:
   applying view order difference scaling to scale the identified DMV to a target reference view for advanced residual prediction of the current video block; and
   identifying the inter-view reference video block based on the scaled DMV.

12. A method of inter-view advanced residual prediction for encoding video data, the method comprising:
   identifying a disparity motion vector (DMV) for a current video block, wherein the current video block is in a current view, and wherein the DMV is used for inter-view prediction of the current video block based on an inter-view reference video block in a reference view and in the same access unit as the current video block;
   identifying a temporal motion vector (TMV) and associated reference picture of the inter-view reference video block;
   identifying a temporal reference video block in the associated reference picture in the reference view based on the TMV of the inter-view reference video block;
   identifying a temporal reference video block in the current view based on the TMV of the inter-view reference video block in the reference view, wherein the temporal reference video block in the current view and the temporal reference video block in the reference view are located in the same access unit;
   determining a residual predictor block for the current video block based on a difference between the temporal reference video block in the current view and the temporal reference video block in the reference view; and
   encoding an encoded video bitstream that encodes the video data to identify the DMV and a residual block for the current video block, wherein the residual block identified by the encoded video bitstream comprises a difference between the inter-view reference video block and the residual predictor block for the current video block.

13. The method of claim 12, wherein determining the residual predictor block for the current video block based on the difference between the temporal reference video block in the current view and the temporal reference video block in the reference view comprises applying a weighting factor to the difference between the temporal reference video block in the current view and the temporal reference video block in the reference view.

14. The method of claim 12, further comprising scaling the TMV of the inter-view reference video block to a target reference picture in a target access unit for advanced residual prediction of the current video block, wherein at least one of:
   identifying the temporal reference video block in the reference view based on the TMV of the inter-view reference video block comprises identifying the temporal reference video block in the reference view based on the scaled TMV; and
   identifying the temporal reference video block in the current view based on the TMV of the inter-view reference video block comprises identifying the temporal reference video block in the reference view based on the scaled TMV.

15. The method of claim 14, further comprising:
   selecting a reference picture list; and
   selecting the target reference picture from the selected reference picture list,
   wherein selecting the reference picture list comprises one of:
     selecting the reference picture list associated with the TMV; or
     selecting the reference picture list associated with the DMV.

16. The method of claim 12, wherein the inter-view reference video block comprises a plurality of prediction units, and identifying the TMV of the inter-view reference video block comprises identifying a TMV associated with one of the plurality of prediction units that contains a center position of the inter-view reference video block.

17. The method of claim 12, wherein the inter-view reference video block contains a first set of motion information corresponding to a first reference picture list and a second set of motion information corresponding to a second reference picture list, and identifying the TMV of the inter-view reference video block comprises:
   selecting the TMV from the first set of motion information if the first set of motion information includes a TMV; and
   selecting the TMV from the second set of motion information if the first set of motion information does not include a TMV.

18. The method of claim 17, wherein the first reference picture list comprises RefPicList0.

19. The method of claim 17, wherein an order for considering the first and second sets of motion information is independent of which of the first and second sets of motion information includes the DMV.

20. The method of claim 12, further comprising:
   applying view order difference scaling to scale the identified DMV to a target reference view for advanced residual prediction of the current video block; and
   identifying the inter-view reference video block based on the scaled DMV.

21. An apparatus comprising a video coder configured to perform inter-view advanced residual prediction for coding video data, the video coder comprising:
- a memory configured to store an encoded video bitstream that encodes the video data; and
- one or more processors configured to:
  - identify a disparity motion vector (DMV) for a current video block, wherein the current video block is in a current view, and wherein the DMV is used for inter-view prediction of the current video block based on an inter-view reference video block in a reference view and in the same access unit as the current video block;
  - identify a temporal motion vector (TMV) and associated reference picture of the inter-view reference video block;
  - identifying a temporal reference video block in the associated reference picture in the reference view based on the TMV of the inter-view reference video block;
  - identifying a temporal reference video block in the current view based on the TMV of the inter-view reference video block in the reference view, wherein the temporal reference video block in the current view and the temporal reference video block in the reference view are located in the same access unit;
  - determine a residual predictor block for the current video block based on a difference between the temporal reference video block in the current view and the temporal reference video block in the reference view; and
  - code the encoded video bitstream to identify the DMV and a residual block for the current video block, wherein the residual block identified by coding the encoded video bitstream comprises a difference between the inter-view reference video block and the residual predictor block for the current video block.

22. The apparatus of claim 21, wherein the one or more processors are further configured to scale the TMV of the inter-view reference video block to a target reference picture in a target access unit for advanced residual prediction of the current video block, and at least one of:
- identify the temporal reference video block in the reference view based on the TMV of the inter-view reference video block comprises identifying the temporal reference video block in the reference view based on the scaled TMV; and
- identify the temporal reference video block in the current view based on the TMV of the inter-view reference video block comprises identifying the temporal reference video block in the reference view based on the scaled TMV.

23. The apparatus of claim 22, wherein the one or more processors are further configured to:
- select a reference picture list; and
- select the target reference picture from the selected reference picture list,
- wherein, to select the reference picture list, the one or more processors:
  - select the reference picture list associated with the TMV; or
  - select the reference picture list associated with the DMV.

24. The apparatus of claim 21, wherein the inter-view reference video block comprises a plurality of prediction units, and, to identify the TMV of the inter-view reference video block, the one or more processors identify a TMV associated with one of the plurality of prediction units that contains a center position of the inter-view reference video block.

25. The apparatus of claim 21, wherein the inter-view reference video block contains a first set of motion information corresponding to a first reference picture list and a second set of motion information corresponding to a second reference picture list, and wherein, to identify the TMV of the inter-view reference video block, the one or more processors:
- select the TMV from the first set of motion information if the first set of motion information includes a TMV; and
- select the TMV from the second set of motion information if the first set of motion information does not include a TMV.

26. The apparatus of claim 25, wherein the first reference picture list comprises RefPicList0.

27. The apparatus of claim 21, wherein the one or more processors are further configured to:
- apply view order difference scaling to scale the identified DMV to a target reference view for advanced residual prediction of the current video block; and
- identify the inter-view reference video block based on the scaled DMV.

28. The apparatus of claim 21, wherein the video coder comprises a video decoder, and the one or more processors are configured to:
- decode the encoded video bitstream to identify the DMV and the residual block for the current video block; and
- apply the residual predictor block and the residual block identified from the encoded video bitstream to the inter-view reference video block to reconstruct the current video block.

29. The apparatus of claim 21, wherein the video coder comprises a video encoder, and the one or more processors are configured to encode the encoded video bitstream to indicate the DMV and the residual block for the current video block to a video decoder.

30. A computer-readable storage medium having instructions stored thereon that when executed cause one or more processors of a video coder to:
- identify a disparity motion vector (DMV) for a current video block, wherein the current video block is in a current view, and wherein the DMV is used for inter-view prediction of the current video block based on an inter-view reference picture in a reference view and in the same access unit as the current video block;
- identify a temporal motion vector (TMV) and associated reference picture of the inter-view reference video block;
- identifying a temporal reference video block in the associated reference picture in the reference view based on the TMV of the inter-view reference video block;
- identifying a temporal reference video block in the current view based on the TMV of the inter-view reference video block in the reference view, wherein the temporal reference video block in the current view and the temporal reference video block in the reference view are located in the same access unit;
- determine a residual predictor block for the current video block based on a difference between the temporal reference video block in the current view and the temporal reference video block in the reference view; and
- code the encoded video bitstream to identify the DMV and a residual block for the current video block, wherein the residual block identified by coding the encoded video bitstream comprises a difference between the inter-view reference video block and the residual predictor block for the current video block.

* * * * *